(12) United States Patent
Kraus

(10) Patent No.: US 10,912,258 B2
(45) Date of Patent: Feb. 9, 2021

(54) SYSTEM AND METHOD FOR RECOMPRESSING ROUND BALES INTO SQUARE BALES

(71) Applicant: Deere & Company, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 233 days.

(21) Appl. No.: 16/137,374

(22) Filed: Sep. 20, 2018

(65) Prior Publication Data

US 2019/0098839 A1 Apr. 4, 2019

Related U.S. Application Data

(60) Provisional application No. 62/566,717, filed on Oct. 2, 2017.

(51) Int. Cl.
*A01F 15/08* (2006.01)
*A01F 15/07* (2006.01)
(Continued)

(52) U.S. Cl.
CPC .......... *A01F 15/0833* (2013.01); *A01F 15/00* (2013.01); *A01F 15/005* (2013.01);
(Continued)

(58) Field of Classification Search
CPC ........ A01F 15/00; A01F 15/005; A01F 15/02; A01F 15/04; A01F 15/046; A01F 15/07;
(Continued)

(56) References Cited

U.S. PATENT DOCUMENTS

| | | | |
|---|---|---|---|
| 858,849 | A | 7/1907 | Arnold |
| 1,121,571 | A | 12/1914 | Sheppard |

(Continued)

FOREIGN PATENT DOCUMENTS

| CA | 2104482 | 2/1995 |
|---|---|---|
| DE | 3335900 A1 | 4/1985 |

(Continued)

OTHER PUBLICATIONS

USPTO Non-Final Office Action issued in pending U.S. Appl. No. 16/137,110 dated May 14, 2020.

(Continued)

*Primary Examiner* — Jimmy T Nguyen
(74) *Attorney, Agent, or Firm* — Klintworth & Rozenblat Ip LLP

(57) ABSTRACT

An actuation system for moving a movable platen of a bale recompression system includes one or more actuators, a first scissors linkage, a second scissors linkage and a cross-member. The first scissors linkage has a first link end coupled to a frame of the bale recompression system and has a second link end coupled to the movable platen. The second scissors linkage has a third link end coupled to the frame and has a fourth link end coupled to the movable platen. The cross-member interconnects the first scissors linkage and the second scissors linkage. Actuation of the one or more actuator pivots the first link end of the first scissors linkage and the third link end of the second scissors linkage relative to the frame and translates the movable platen from a first position to a second position. The first scissors linkage and the second scissors linkage are configured to maintain a fixed orientation of the movable platen in the first position and in the second position.

18 Claims, 43 Drawing Sheets

(51) Int. Cl.
*B30B 9/30* (2006.01)
*F16C 11/04* (2006.01)
*A01F 15/00* (2006.01)
*A01F 15/02* (2006.01)
*B30B 1/00* (2006.01)
*B30B 1/08* (2006.01)

(52) U.S. Cl.
CPC ............... *A01F 15/02* (2013.01); *A01F 15/07* (2013.01); *B30B 1/006* (2013.01); *B30B 1/08* (2013.01); *B30B 9/301* (2013.01); *B30B 9/3057* (2013.01); *B30B 9/3082* (2013.01); *F16C 11/04* (2013.01)

(58) Field of Classification Search
CPC ............... A01F 15/071; A01F 15/0715; A01F 15/0833; A01F 15/0841; A01F 15/0875; A01F 15/0883; A01F 15/14; A01F 15/141; A01F 2015/0795; A01F 2015/0775; A01F 2015/183; B30B 9/3014; B30B 15/30; B30B 9/301; B30B 9/3082; B30B 9/3057; B30B 1/02; B30B 1/08; B30B 1/006; A01D 85/005; A01D 2085/007; A01D 2085/008; B65B 13/04; B65B 13/06; B65B 27/125; F16C 11/04
See application file for complete search history.

(56) References Cited

U.S. PATENT DOCUMENTS

| | | | |
|---|---|---|---|
| 3,985,072 | A | 10/1976 | Van Doorn et al. |
| 4,177,723 | A | 12/1979 | Buchele et al. |
| 4,532,758 | A | 8/1985 | Liet |
| 4,805,528 | A | 2/1989 | Rogers et al. |
| 4,982,658 | A | 1/1991 | Knudson |
| 6,152,026 | A | 11/2000 | Simpson |
| 6,289,798 | B1 | 9/2001 | Van Der Hyde |
| 7,886,660 | B1 | 2/2011 | Sherwood et al. |
| 8,122,822 | B1* | 2/2012 | Horst ............... A01D 85/002 100/3 |
| 8,833,247 | B2 | 9/2014 | Olander |
| 8,960,085 | B2 | 2/2015 | Smith et al. |
| 9,351,444 | B2 | 5/2016 | Keller |
| 9,578,811 | B2 | 2/2017 | Kraus et al. |
| 9,622,420 | B2 | 4/2017 | Kraus et al. |
| 2012/0210888 | A1 | 8/2012 | Olander |
| 2013/0220150 | A1* | 8/2013 | Preen ............... B30B 9/3032 100/245 |
| 2014/0077014 | A1 | 3/2014 | Cooper |
| 2015/0101499 | A1* | 4/2015 | Hitchcock ............... B30B 1/16 100/229 A |
| 2016/0014971 | A1 | 1/2016 | Kraus |
| 2016/0021827 | A1 | 1/2016 | Keller |
| 2017/0064980 | A1* | 3/2017 | Graus ............... B65B 63/02 |
| 2018/0093438 | A1 | 4/2018 | Roubideaux |
| 2019/0098833 | A1 | 4/2019 | Kraus |
| 2019/0098834 | A1 | 4/2019 | Kraus |
| 2019/0098838 | A1 | 4/2019 | Kraus |
| 2019/0098840 | A1 | 4/2019 | Kraus |

FOREIGN PATENT DOCUMENTS

| | | | |
|---|---|---|---|
| EP | 0447694 | A1 | 9/1991 |
| EP | 0803183 | A1 | 10/1997 |
| EP | 1745921 | A1 * | 1/2007 ............. B30B 9/306 |

OTHER PUBLICATIONS

USPTO Non-Final Office Action issued in pending U.S. Appl. No. 16/137,223 dated May 14, 2020.
USPTO Non-Final Office Action issued in pending U.S. Appl. No. 16/137,409 dated May 14, 2020.
Reshaping and Recompressing Round Biomass Bales, N. C. Lacy, K. J. Shinners, 2016 American Society of Agricultural and Biological Engineers, vol. 59(4): 795-802.
Extended European search report for application No. 18197935.2 dated Mar. 1, 2019.
Extended European search report for application No. 18197927.9 dated Mar. 1, 2019.
Extended European Search Report for application No. 18197922.0 dated Mar. 1, 2019.
Extended European Search Report for application No. 18197586.3 dated Mar. 1, 2019.
Extended European Search Report for application No. 18197608.5 dated Mar. 1, 2019.

* cited by examiner

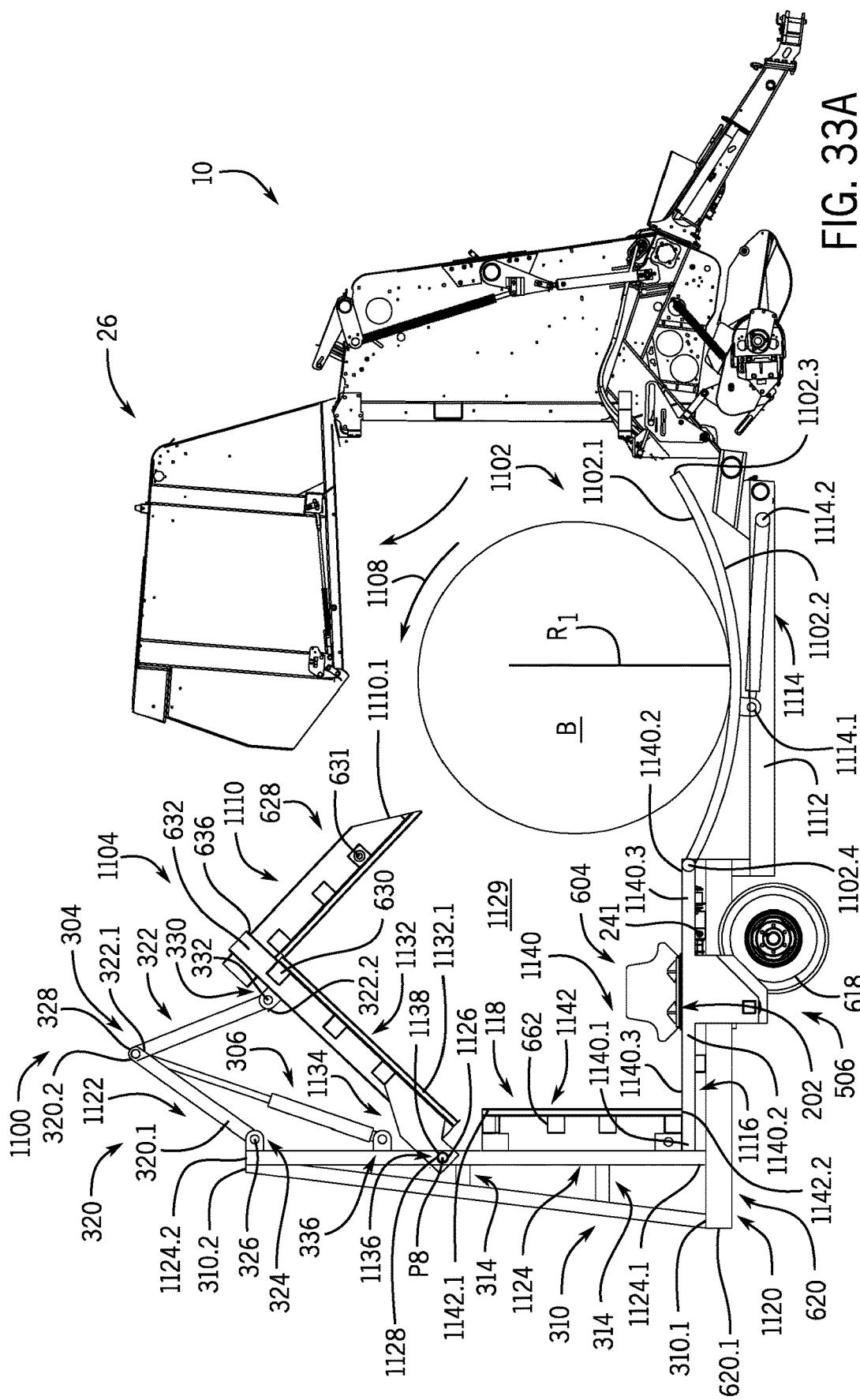

SYSTEM AND METHOD FOR RECOMPRESSING ROUND BALES INTO SQUARE BALES

CROSS-REFERENCE TO RELATED APPLICATION(S)

This application claims the benefit of U.S. Provisional Application No. 62/566,717, filed on Oct. 2, 2017, which is incorporated herein by reference.

STATEMENT OF FEDERALLY SPONSORED RESEARCH OR DEVELOPMENT

Not applicable.

FIELD OF THE DISCLOSURE

This disclosure relates to crop-packaging devices, such as round balers, and to a system and method for recompressing a round bale into a square bale.

BACKGROUND OF THE DISCLOSURE

In various settings, crops or other material may be arranged for pick-up by mechanized equipment. For example, cut material (e.g., hay) in a field may be raked or otherwise arranged into windrows in the field for further processing. Various mechanisms may then be utilized to gather such material. For example, a crop-packaging device such as a round baler may be pulled by a tractor along a windrow of cut material and may gather the material from the windrow. The material may then be passed into a packaging (e.g., baling) chamber for formation into a crop package (e.g., a bale). In various configurations, such a crop package may be generally cylindrical in shape and may be typically referred to as a "round" bale. Similarly, a baler that forms a round bale may be referred to as a "round" baler.

In certain instances, it is desirable to load one or more round bales onto a truck for transport. In these instances, due to the shape of the round bale and the rectangular shape of a bed or trailer of the truck, the number of round bales that may be transported is reduced.

SUMMARY OF THE DISCLOSURE

The disclosure provides a system and method for recompressing a round bale into a square bale for a round baler, which, for example, may allow for more efficient transportation of bales by a bed or trailer of a truck.

In one aspect the disclosure provides an actuation system for moving a movable platen of a bale recompression system. The actuation system includes one or more actuators, a first scissors linkage, a second scissors linkage and a cross-member. The first scissors linkage has a first link end coupled to a frame of the bale recompression system and has a second link end coupled to the movable platen. The second scissors linkage has a third link end coupled to the frame and has a fourth link end coupled to the movable platen. The cross-member interconnects the first scissors linkage and the second scissors linkage. Actuation of the one or more actuator pivots the first link end of the first scissors linkage and the third link end of the second scissors linkage relative to the frame and translates the movable platen from a first position to a second position. The first scissors linkage and the second scissors linkage are configured to maintain a fixed orientation of the movable platen in the first position and in the second position.

In another aspect, the disclosure provides a method for moving a movable platen of a bale recompression system. The method includes actuating, by a first actuator, a first scissors linkage to translate a side of the movable platen, and actuating, by a second actuator, a second scissors linkage to translate a second side of the movable platen. The first scissors linkage and the second scissors linkage are interconnected by a cross-member such that the side and the second side translate substantially in unison to maintain a fixed orientation of the movable platen at a first position and at a second position.

In yet another aspect, the disclosure provides a round baler. The round baler includes a baling chamber that forms a round bale and a bale recompression system to receive the round bale and to recompress the round bale into a square bale. The bale recompression system including an upper platen, a movable platen and a bottom platen that cooperate to recompress the round bale. The bale recompression system includes an actuation system for moving the movable platen to recompress the round bale. The actuation system includes one or more actuators, a first scissors linkage, a second scissors linkage and a cross member. The first scissors linkage has a first link end coupled to a frame of the bale recompression system and has a second link end coupled to the movable platen. The second scissors linkage has a third link end coupled to the frame and has a fourth link end coupled to the movable platen. The cross-member interconnects the first scissors linkage and the second scissors linkage. Actuation of the one or more actuator pivots the first link end of the first scissors linkage and the third link end of the second scissors linkage relative to the frame and translates the movable platen from a first position to a second position. The first scissors linkage and the second scissors linkage are configured to maintain a fixed orientation of the movable platen in the first position and in the second position.

The details of one or more embodiments are set forth in the accompanying drawings and the description below. Other features and advantages will become apparent from the description, the drawings, and the claims.

BRIEF DESCRIPTION OF THE DRAWINGS

FIG. 33A is a side view of an example crop-packaging device, such as a baler, having a bale recompression system with an arcuate transfer table according to various embodiments of this disclosure, with an upper platen of a first platen system in a first position and the transfer table in a first position;

Like reference symbols in the various drawings indicate like elements.

DETAILED DESCRIPTION

Figure 1:
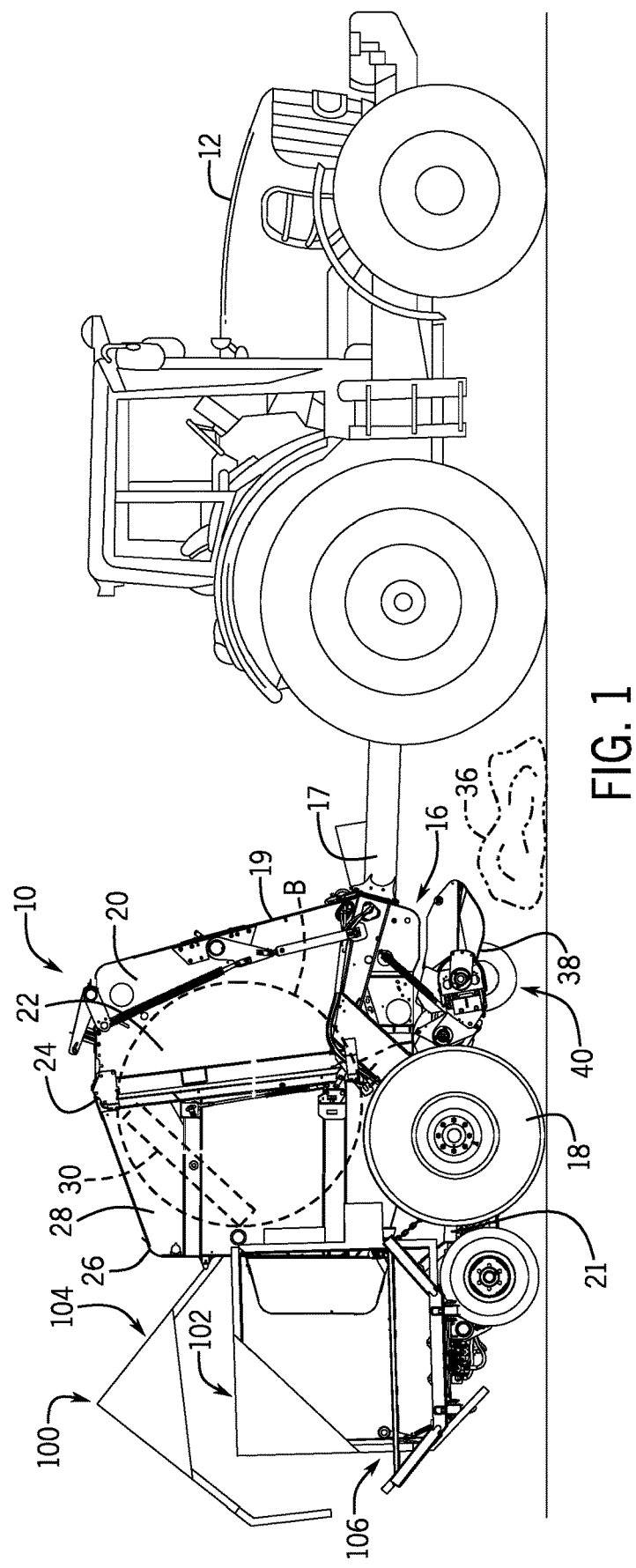
FIG. 1 is a side view of an example work vehicle in the form of an agricultural tractor, which includes an example crop-packaging device, such as a baler, having a bale recompression system according to various embodiments of this disclosure.

The following describes one or more example embodiments of the disclosed method and system for recompressing a round bale into a square bale, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As noted above, in various situations it may be useful to gather material (e.g., cut plant material) for further processing. For example, a cutting or raking operation may leave cut material (e.g., hay) arranged in windrows in a field. Balers and other equipment may then be used to gather the material from the windrows for formation into bales.

The following describes one or more example implementations of the disclosed system for recompressing a round bale into a square bale for a crop-packaging device, such as a round baler, as shown in the accompanying figures of the drawings described briefly above. It will be understood that the term "round" as used herein with respect to crop packaging (e.g., "round bale" or "round baler") refers to a crop packaging machine (or a machine that produces a crop package) that is generally cylindrical in shape. The term "square" as used herein with respect to crop packaging (e.g., "square bale" or "square baler") refers to a crop packaging machine (or a machine that produces a crop package) that is generally rectangular in shape, despite not necessarily having equal length sides. The term "square" thus may be considered synonymous with the term "rectangular" for purposes of this disclosure. For purposes of this disclosure, the term "square" may also be considered to encompass any geometric and non-geometric shapes having at least one flat side (e.g., trapezoidal, rhomboidal and other such three-dimensional rectilinear configurations as well as bulbous configurations in which a rounded portion protrudes from one or more flat sides). The following description relates to the baler that produces "round" bales. Generally, the disclosed bale recompression systems provide for recompression of a round bale into a square bale, which enables more efficient positioning of the bales into a transportation device, such as a rectangular trailer, bed of a truck, etc.

In this regard, the disclosed bale recompression system includes at least one of a first platen system and a second platen system. In this example, the first platen system is identical to the second platen system. Each of the first platen system and the second platen system include a first, upper platen and a second, bottom platen. The upper platen is movable relative to the bottom platen, via a hydraulic actuator, to recompress a round bale into a square bale. It should be noted that while the following disclosure provides the example of an upper platen movable relative to a stationary, bottom platen, the disclosure is not so limited. Rather, in certain embodiments the bottom platen may move relative to a stationary upper platen. In other embodiments, both the upper platen and the bottom platen may move together, either substantially simultaneously, or in a sequence to cooperate to recompress the bale. Moreover, while the motion of the upper platen is described herein as rotating or pivoting about a hinge, the upper platen may move linearly relative to the bottom platen to recompress the bale. In other embodiments, the upper platen and the bottom platen may be angled relative to each other, and the upper platen may be moved relative to the bottom platen to recompress the bale. Thus, while the following description refers to a recompression system having a movable platen and a stationary platen, any arrangement of platens (upper stationary, bottom movable; upper movable, bottom stationary; upper movable, bottom movable) may be employed to recompress a round bale into a square bale. In most embodiments, the bale recompression system does not include a gate, but rather, the bale recompression system receives the bale from the baler, via a bale accumulator, transfer table, rails, or other arrangement, and recompresses the round bale into a square bale.

Generally, a bale accumulator is coupled to the first platen system and the second platen system, and receives a formed round bale from a baler. In various embodiments, the bale accumulator is a crop accumulator, and includes features of the crop accumulator 20 described in commonly assigned U.S. Pat. No. 9,622,420 to Kraus et. al., titled "Agricultural Baler Platform" and incorporated herein by reference. The bale accumulator includes a pusher, which is actuatable by a hydraulic cylinder, to move the received round bale into one of the bottom platens. Alternatively, the bale accumulator or a portion of the bale accumulator may be incorporated into the bottom platen. The respective upper platen is then rotated, by the hydraulic cylinder, and cooperates with the bottom platen to recompress the round bale into a square bale. The bale recompression system may also include a banding unit to apply a wrap material to the square bale, to preserve the square bale. In certain examples, the bottom platen is rotatable relative to the baler to deposit the square bale onto a ground surface. In other examples, the pusher of the bale accumulator may push a newly received round bale toward the bottom platen to push the formed square bale off the bottom platen and onto the ground surface. By recompressing the round bales into square bales, the bales may be more efficiently shipped by a rectangular trailer, for example, as the square bales conform to the shape of the trailer.

The plate members associated with the first platen system and the second platen system each include "channels" or "ducts," which may receive a wrap material to enable the wrap material to surround the formed square bale. The channels in each plate member are generally aligned so that multiple continuous ducts are defined around the bale. An automatic strapping unit or banding unit is placed above each channel and the banding unit pushes the wrap material in the channel and the channel guides the wrap material around the bale. When the end of the wrap material fully encompasses the square bale, the banding unit captures the free end of the wrap material, pulls the slack out of wrap material wrapping it tightly to the surface of the square bale, and bonds both ends of the wrap material together. As used herein, "wrap material" may indicate one of various types of materials utilized to hold bales of compressed crop or other plant matter together or to otherwise maintain the integrity (structural or otherwise) of the bales. Wrap material may include, for example, twine or similar material, net wrap, plastic or other sheeting (i.e., "sheet wrap"), banding, straps, and so on. In certain instances, wrap material may be provided in spools or rolls, including spools of twine, rolls of net wrap, rolls of plastic sheeting, and so on.

As noted above, with reference to FIG. 1, the bale recompression system described herein may be employed with respect to a variety of crop-packaging devices, such as a baler 10. The baler 10 is configured to be towed by a tractor 12, and in this example is a "round" baler. The baler 10 may have a main frame 16 supported on a pair of ground wheels 18. The main frame 16 includes a draft tongue 17 at a first end 19 having a rear end joined to the main frame 16 and a forward end defined by a clevis arrangement (not shown) adapted for being coupled to a drawbar (not shown) of the tractor 12. A pair of upright side walls 20 may be fixed to the main frame 16 to define forward regions of opposite side walls of a bale forming (or baling) chamber 22. Mounted for pivoting vertically about a horizontal pivot arrangement 24 located at an upper rear location of the side walls 20 is a discharge gate 26 including opposite upright side walls 28, which define opposite sides of a rear region of the bale forming chamber 22. The discharge gate 26 is coupled to a second end 21 of the main frame 16. One or more gate hydraulic cylinders 30 may be coupled between the main frame 16 and the opposite side walls 28 of the discharge gate 26 and are selectively operable for moving the discharge gate 26 between a lowered baling position and an opened discharge position. It is understood that while one hydraulic cylinder is shown, two or more hydraulic cylinders may be used to open and close the discharge gate 26. The baler 10 as shown is of a variable chamber design and thus comprises a plurality of longitudinally extending side-by-side belts (not shown) supported on a plurality of rollers (not shown). At least one of the rollers is driven, via a chain drive coupled to a motor or other arrangement, to drive the belts about the bale forming chamber 22.

The baler 10 may also include one or more controllers, such as electronic controller unit (ECU). The controllers may be configured as computing devices with associated processor devices and memory architectures, as hydraulic, electrical or electro-hydraulic controllers, or otherwise. As such, the controllers may be configured to execute various computational and control functionality with respect to the baler 10 (and other machinery). The controllers may be in electronic, hydraulic, or other communication with various other systems or devices of the baler 10 (or machinery). For example, the controllers may be in electronic or hydraulic communication with various actuators, sensors, and other devices within (or outside of) the baler 10, including various devices associated with the bale forming chamber and related mechanisms. Additionally, one or more electro-hydraulic control valves (not shown) may be a part of a baler hydraulic system and interposed in hydraulic lines connecting the gate hydraulic cylinders 30 with a hydraulic supply associated with the tractor 12. The electro-hydraulic control valve may be electrically activated according to signals from the ECU and may be configured to control the flow of hydraulic fluid between the hydraulic supply associated with the tractor 12, the gate hydraulic cylinders 30 and various components of the bale recompression system 100.

In its general operation, the baler 10 is drawn through a field by the tractor 12 attached to the draft tongue 17. Crop material 36 is fed into a crop inlet 38 of the bale forming chamber 22 from a windrow of crop on the ground by a pickup 40. In the bale forming chamber 22, the crop material 36 is rolled in spiral fashion into a cylindrical bale B. In this example, the baler 10 illustrated is a variable chamber design wherein crop is rolled up in a spiral fashion in a nip formed between oppositely moving adjacent loops of belts. The space between adjacent loops of belts grows as the forming bale B grows larger. Upon completion, the bale B is discharged by actuation of gate hydraulic cylinders 30 that open discharge gate 26 permitting the completed bale B to be discharged from the baler 10 onto a bale recompression system 100.

In various embodiments, the bale recompression system 100 is coupled to the baler 10 for movement with the baler 10 as the baler 10 is towed by the tractor 12. As will be discussed, the bale recompression system 100 receives the round bale B that is discharged by the discharge gate 26, and recompresses the round bale B into a square bale. By recompressing the round bale B into a square bale, the bales are easier to transport as the shape of the square bale enables for improved packing of the bales within a transportation device. The bale recompression system 100 includes a first platen system 102, a second platen system 104 and a crop or bale accumulator 106. The first platen system 102 is spaced apart from the second platen system 104 such that the discharge gate 26 may open and close without contacting or interfering with either the first platen system 102 or the second platen system 104.

Figure 2:
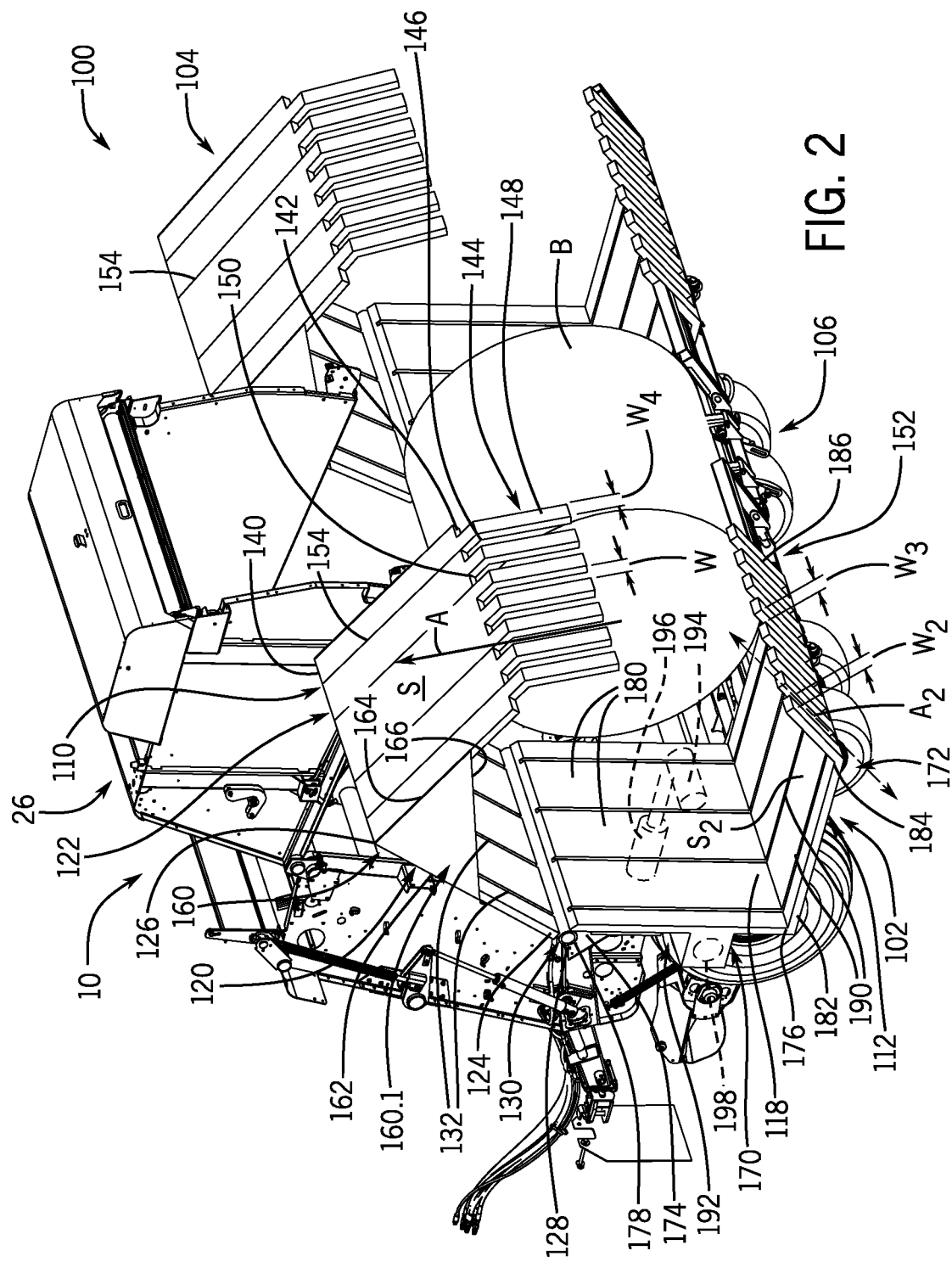
FIG. 2 is a rear perspective view of a first side of the bale recompression system of FIG. 1, which illustrates upper platens of both a first platen system and a second platen system of the bale recompression system in a first position and a formed round bale received on a bale accumulator of the bale recompression system.

With reference to FIG. 2, as the first platen system 102 is the same as the second platen system 104, for ease of description, the first platen system 102 will be described in detail herein, with the same reference numerals used to denote the same features of the second platen system 104. The first platen system 102 includes a first, upper platen 110, a second, bottom platen 112, a banding unit 114 and an actuator 116. Generally, the upper platen 110 is movably or rotatably coupled to the bottom platen 112, and is rotatable by the actuator 116 between a first position in which the upper platen 110 is spaced apart from the bottom platen 112 to define an opening 118 for receiving the round bale B from the bale accumulator 106; and a second position, in which the upper platen 110 cooperates with the bottom platen 112 to recompress the round bale B into a square bale. The bottom platen 112 remains stationary during the recompression of the round bales B.

In one example, the upper platen 110 includes a first plate member 120 and a second plate member 122. The first plate member 120 and the second plate member 122 may be composed of a metal or metal alloy, and formed via casting, forging, stamping, etc. The first plate member 120 and the second plate member 122 may be integrally formed, or may be discretely formed and coupled together via a suitable technique, such as welding, mechanical fasteners, etc. The first plate member 120 is rotatably coupled to the bottom platen 112. The first plate member 120 is substantially planar and includes a first plate end 124 opposite a second plate end 126. The first plate end 124 defines a first portion 128 of a hinge 130.

The first plate member 120 includes a plurality of first banding channels 132, which are defined through the first plate member 120 from the first plate end 124 to the second plate end 126. The plurality of first banding channels 132 are defined through the first plate member 120 and cooperate with the banding unit 114 to band the square bale after recompression. Each of the plurality of first banding channels 132 are generally spaced apart from each other along the first plate member 120. The second plate end 126 is coupled to the second plate member 122.

The second plate member 122 cooperates with the bottom platen 112 to secure the bale within the first platen system 102 during recompression. The second plate member 122 is substantially planar and includes a third plate end 140 opposite a fourth plate end 142. The third plate end 140 is coupled to the first plate member 120. The fourth plate end 142 defines a plurality of upper fingers 144. In one example, each of the upper fingers 144 has a first body portion 146 that extends outwardly from the fourth plate end 142 for a distance, and a second body portion 148 that extends from the first body portion 146 along an axis A. The axis A is substantially oblique to a plane defined by a surface S of the second plate member 122. Stated another way, at least a portion of each of the upper fingers 144 extends from the second plate member 122 at an angle. Each of the upper fingers 144 are spaced apart along the fourth plate end 142 such that a plurality of gaps 150 is defined between adjacent ones of the upper fingers 144. Each of the gaps 150 have a width W, which is at least equal to or slightly greater than a width W2 of a plurality of lower fingers 152 of the bottom platen 112.

The second plate member 122 includes a plurality of second banding channels 154, which are defined through the second plate member 122 from the third plate end 140 to the fourth plate end 142. The plurality of second banding channels 154 are defined through the second plate member 122 and cooperate with the banding unit 114 to band the square bale after recompression. Each of the plurality of second banding channels 154 are generally spaced apart from each other along the second plate member 122.

In various embodiments, one or more support plates 160 may be coupled to the first plate member 120 and the second plate member 122 to assist in the recompressing of the round bale B. The support plates 160 may be composed of a metal, metal alloy or polymer, which may be cast, stamped, etc. In this example, two support plates 160.1, 160.2 are coupled to the first plate member 120 and the second plate member 122 at the intersection of the second plate end 126 and the third plate end 140. The support plates 160.1, 160.2 may be coupled to the first plate member 120 and the second plate member 122 via any suitable technique, such as welding, adhesives, mechanical fasteners, etc. The support plates 160.1, 160.2 are substantially triangular in shape; however, the support plates 160.1, 160.2 may have any shape. Each of the support plates 160.1, 160.2 have a first support end 162, a second support end 164 and a third support end 166. The first support end 162 is coupled to the first plate member 120 to extend along the first plate member 120 from the second plate end 126 towards the first plate end 124. The second support end 164 is coupled to the second plate member 122 to extend along the second plate member 122 from the third plate end 140 towards the fourth plate end 142. The third support end 166 may contact the round bale B during recompression, and assists in retaining the round bale B between the upper platen 110 and the bottom platen 112 during recompression.

The bottom platen 112 includes a third plate member 170 and a fourth plate member 172. The third plate member 170 and the fourth plate member 172 may be composed of a metal or metal alloy, and formed via casting, forging, stamping, etc. The third plate member 170 and the fourth plate member 172 may be integrally formed, or may be discretely formed and coupled together via a suitable technique, such as welding, mechanical fasteners, etc. The third plate member 170 is rotatably coupled to the first plate member 120 of the upper platen 110. The third plate member 170 is substantially planar and includes a first bottom plate end 174 opposite a second bottom plate end 176. The first bottom plate end 174 defines a second portion 178 of the hinge 130.

The third plate member 170 includes a plurality of third banding channels 180, which are defined through the third plate member 170 from the first bottom plate end 174 to the second bottom plate end 176. The plurality of third banding channels 180 are defined through the third plate member 170 and cooperate with the banding unit 114 to band the square bale after recompression. Each of the third banding channels 180 are generally spaced apart from each other along the third plate member 170. The second bottom plate end 176 is coupled to the fourth plate member 172.

The fourth plate member 172 cooperates with the upper platen 110 to secure the bale within the first platen system 102 during recompression. The fourth plate member 172 is substantially planar and includes a third bottom plate end 182 opposite a fourth bottom plate end 184. The third bottom plate end 182 is coupled to the third plate member 170. The fourth bottom plate end 184 defines the plurality of lower fingers 152. In one example, each of the lower fingers 152 extends outwardly from the fourth bottom plate end 184 along an axis A2. The axis A2 is substantially oblique to a plane defined by a surface S2 of the fourth plate member 172. Stated another way, each of the lower fingers 152 extend from the fourth plate member 172 at an angle. Each of the lower fingers 152 are spaced apart along the fourth bottom plate end 184 such that a plurality of bottom gaps 186 is defined between adjacent ones of the lower fingers 152. Each of the bottom gaps 186 have a width W3, which is at least equal to or slightly greater than a width W4 of each of the upper fingers 144 of the upper platen 110. Thus, the gaps 150 and the bottom gaps 186 enable the upper fingers 144 to interleave with the lower fingers 152 when the upper platen 110 is in the second position. This assists in retaining the crop material within the first platen system 102 during recompression of the round bale.

The fourth plate member 172 includes a plurality of fourth banding channels 190, which are defined through the fourth plate member 172 from the third bottom plate end 182 to the fourth bottom plate end 184. The plurality of fourth banding channels 190 are defined through the fourth plate member 172 and cooperate with the banding unit 114 to band the square bale after recompression. Each of the fourth banding channels 190 are generally spaced apart from each other along the fourth plate member 172.

Figure 10:
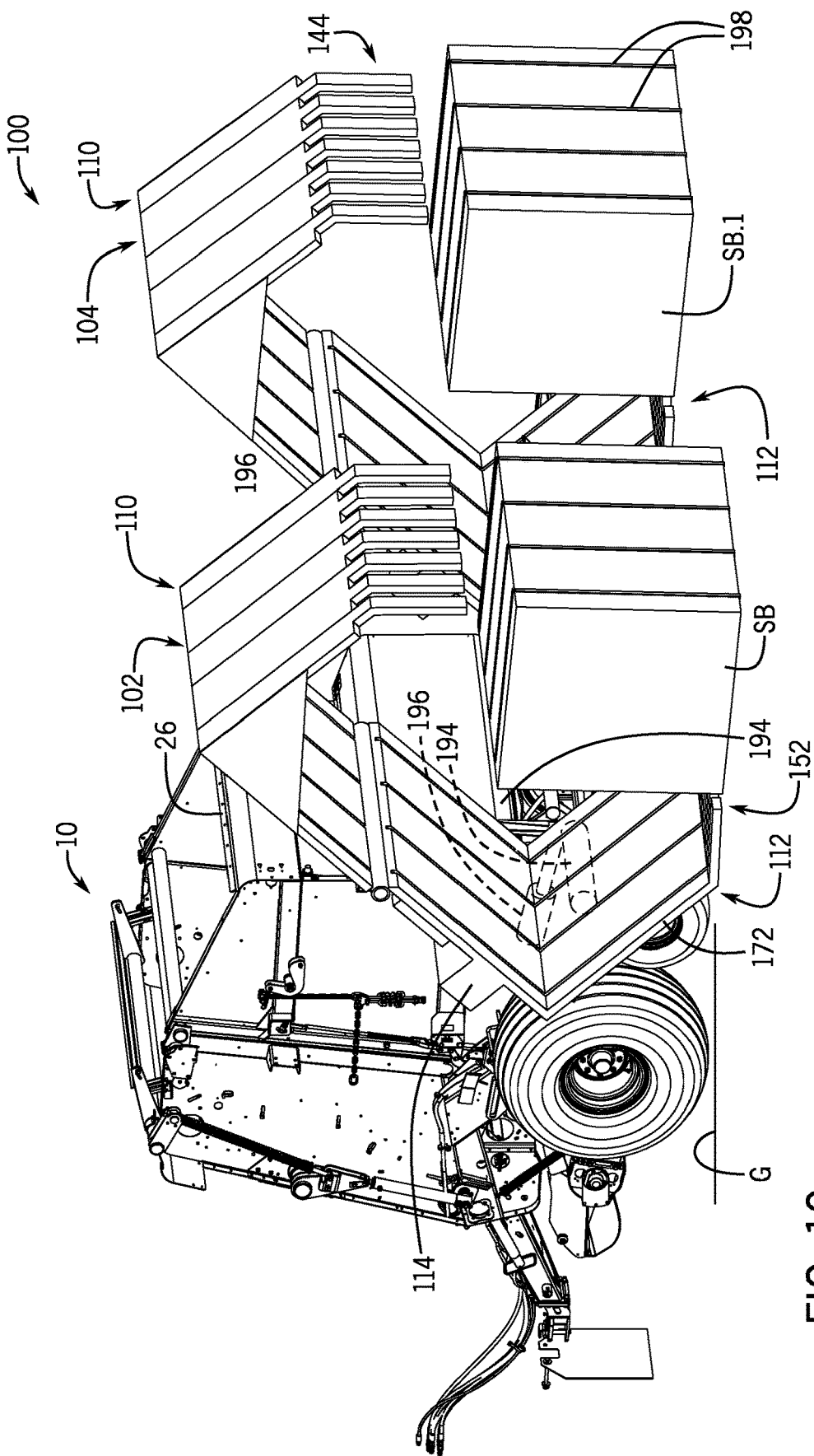
FIG. 10 is a rear perspective view of the first side of the bale recompression system of FIG. 1, which illustrates the bottom platens of each of the first platen system and the second platen system in a second discharge position to deposit the first square bale and the second square bale on a ground surface.

In various embodiments, the bottom platen 112 is rotatably coupled to the baler 10. In one example, a rear surface 192 of the third plate member 170 is coupled to a shaft 194. For example, the rear surface 192 includes a mounting bracket, which receives an end of the shaft 194 such that a rotation of the shaft 194 rotates the bottom platen 112. Generally, the shaft 194 is rotatable by a bottom platen hydraulic actuator 196 to move the bottom platen 112, and thus, the upper platen 110 from a first recompression position (FIG. 2) to a second, discharge position (FIG. 10). This enables the square bales to be discharged from the bale recompression system 100. In one example, the bottom platen hydraulic actuator 196 is a hydraulic cylinder, which is fluidly coupled to the hydraulic system of the baler 10. For example, the bottom platen hydraulic actuator 196 may include one or more hydraulic lines that connect the bottom platen hydraulic actuator 196 with the hydraulic supply associated with the tractor 12. One or more electro-hydraulic control valves of the hydraulic system of the baler 10 may be in fluid communication with the bottom platen hydraulic actuator 196 and electrically activated according to signals from the ECU to control the flow of hydraulic fluid between the hydraulic supply associated with the tractor 12 and the bottom platen hydraulic actuator 196. In various embodiments the ECU of the baler 10 may be in communication with a controller of the tractor 12, and may control the recompression of the bale based on one or more signals received from the controller of the tractor 12. For example, the controller of the tractor 12 may receive input from a human-machine interface, positioned within a cab of the tractor 12, which commands the recompression of a round bale into a square bale. Alternatively, the third plate member 170 may be coupled to a pivot arm, and the bottom platen hydraulic actuator 196 may be actuated to move the pivot arm, thereby pivoting the third plate member 170 to deposit the square bales, similar to the pivot arm and actuators employed with the bale carriage 29 of U.S. Pat. No. 9,622, 420 to Kraus et. al., previously incorporated herein by reference.

Figure 3:
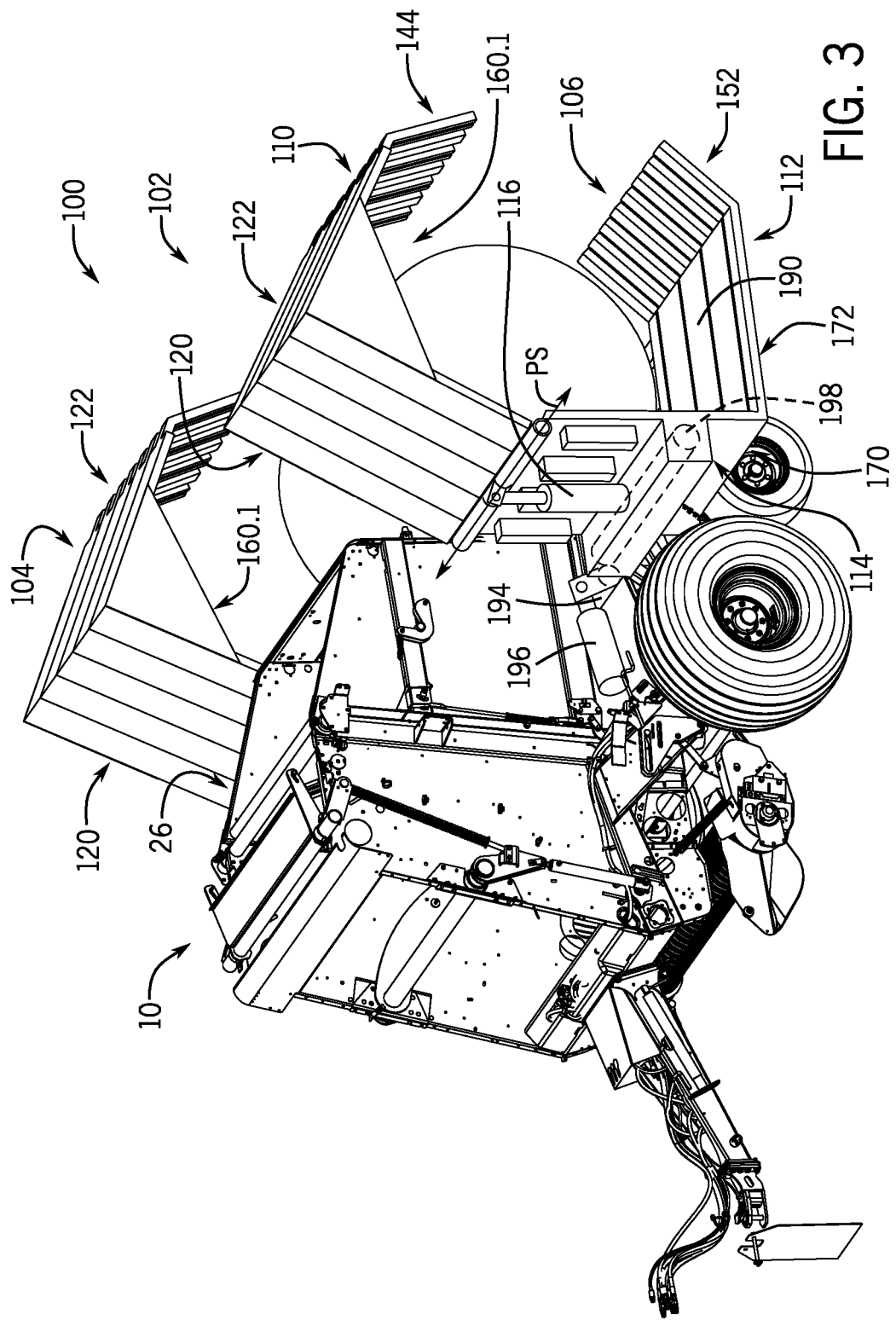
FIG. 3 is a front perspective view of the bale recompression system of FIG. 1, which illustrates upper platens of both the first platen system and the second platen system of the bale recompression system in a first position.

With reference to FIG. 3, the banding unit 114 is coupled to the rear surface 192 of the third plate member 170. The banding unit 114 is any suitable unit or system known in the art, which is capable of applying a wrap material 198 to the recompressed square bale once formed. As used herein, "wrap material" may indicate one of various types of materials utilized to hold bales of compressed crop or other plant matter together or to otherwise maintain the integrity (structural or otherwise) of the bales. The wrap material 198 may include, for example, twine or similar material, net wrap, plastic or other sheeting (i.e., "sheet wrap"), banding, straps, and so on. In certain instances, the wrap material 198 may be provided in spools or rolls, including spools of twine, rolls of net wrap, rolls of plastic sheeting, and so on. The banding unit 114 generally includes at least one spool of wrap material 198, which is supported on a roller (not shown). The roller is driven (by a motor, gearing, etc.) to dispense the wrap material 198, which is driven through the first banding channels 132, the second banding channels 154, the third banding channels 180 and the fourth banding channels 190 around the bale to hold the recompressed bale in the square shape. It should be noted that although the banding unit 114 is shown coupled to the third plate member 170 to dispose the wrap material 198 in a direction substantially parallel to the surface S of the second plate member 122, in certain embodiments, a banding unit may be configured to dispose the wrap material 198 in a direction substantially perpendicular to the surface S of the second plate member 122. Further, while the banding unit 114 is shown coupled to the third plate member 170, the banding unit 114 may also be coupled to the first plate member 120 or the second plate member 122 of the upper platen 110. Alternatively, the banding unit 114 may be coupled to a support frame associated with the bale accumulator 106 or a frame of the baler 10. Thus, generally, the banding unit 114 is coupled to or disposed in proximity to at least one of the upper platen 110 and the bottom platen 112 to dispense the wrap material 198 about the square bale.

Moreover, in certain embodiments, the baler 10 may also include a wrap feed and cut-off system coupled to the baler 10 so as to be external to the bale forming chamber 22. The wrap feed and cut-off system includes at least one spool of wrap material, such as the wrap material 198, which is supported on a roller. The roller is driven to dispense the wrap material 198, which is pulled into the bale forming chamber 22 and around the bale B. It should be noted that while in some embodiments the baler 10 is illustrated herein as including the wrap feed and cut-off system, the wrap feed and cut-off system is optional.

In one example, the actuator 116 rotates the upper platen 110 between the first position and the second position. In this example, the actuator 116 is a hydraulic cylinder, which is in fluid communication with the hydraulic system of the baler 10. It should be noted that while the first platen system 102 is shown and described as including a single hydraulic actuator 116, the first platen system 102 may include any number of actuators 116. For example, the actuator 116 may include one or more hydraulic lines that connect the actuator 116 with the hydraulic supply associated with the tractor 12. One or more electro-hydraulic control valves of the hydraulic system of the baler 10 may be in fluid communication with the actuator 116 and electrically activated according to signals from the ECU to control the flow of hydraulic fluid between the hydraulic supply associated with the tractor 12 and the actuator 116. The actuator 116 is responsive to hydraulic fluid received from the tractor 12 to rotate the upper platen 110 relative to the bottom platen 112. In one example, the actuator 116 has a first end coupled to the third plate member 170, and a second end coupled to the first plate member 120. Upon receipt of the hydraulic fluid, the actuator 116 extends, thereby rotating the first plate member 120 relative to the third plate member 170 and moving the upper platen 110 from the first position to the second position.

Figure 4:
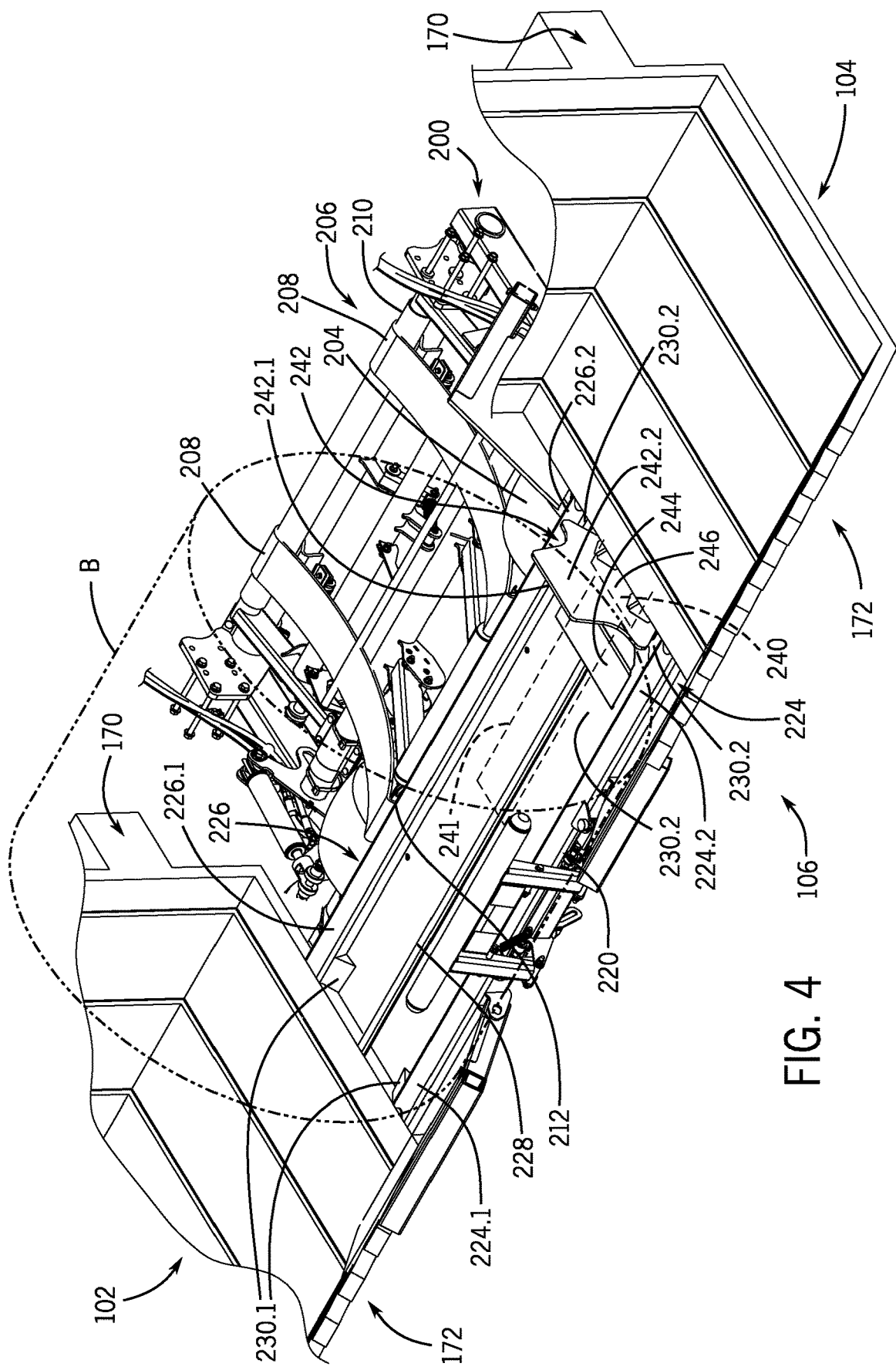
FIG. 4 is a detail view of the bale accumulator of the bale recompression system of FIG. 1.

With reference to FIG. 4, the bale accumulator 106 is shown in greater detail. In this example, the bale accumulator 106 is coupled to the baler 10 so as to be adjacent to or near the discharge gate 26 such that when the discharge gate 26 moves into the open discharge position, the round bale B is received on the bale accumulator 106. The bale accumulator 106 may act as a crop-package accumulator, and may also store a single round bale B while other square bales are being formed by the first platen system 102 and the second platen system 104. The bale accumulator 106 includes a support frame 200 and a pusher 202.

The support frame 200 is coupled to the fourth plate member 172 of each of the first platen system 102 and the second platen system 104. The support frame 200 supports a single round bale B, and interconnects the fourth plate members 172 to enable the bale accumulator 106 to transfer round bales B to the respective one of the fourth plate members 172. The support frame 200 is configured as a rigid metal frame and is supported on a pair of ground wheels 204.

As depicted, a front end 206 of the support frame 200 is coupled to the baler 10 for receiving the round bale from the discharge gate 26 (FIG. 2). One or more flexible members 208 (e.g., one or more belts or straps) are secured to the support frame 200, extending between front and rear attachment points 210 and 212 of the support frame 200. The attachment points 210 and 212 may be configured as tubing, bars, rollers, beams, brackets, or otherwise. As depicted, the flexible members 208 extend the full length of the front end 206 of the support frame 200 between front and rear attachment points 210 and 212. It will be understood, however, that the flexible members 208 may extend various other distances between attachment points on the support frame 200. As depicted in FIG. 4, the flexible members 208 are rigidly fixed to the frame at the attachment points 210 and 212, such that the flexible members 208 may lengthen by elastic deformation, but are not extendable through movement (e.g., unwinding) at the attachment points 210 and 212. It will be understood that other configurations are possible. The flexible members 208 are attached to the support frame 200 such that a round bale B may be received on the flexible members 208 with respect to the support frame 200, before moving to a platform 220 at a rear end 218 of the support frame 200.

The platform 220 receives the round bale B as the round bale B rolls out of the discharge gate 26 onto the flexible members 208 and to the platform 220. The platform 220 may also support a single round bale during the formation of two square bales by the first platen system 102 and the second platen system 104. The platform 220 includes a stop 222, a first rail 224, a second rail 226 and a slot 228. The stop 222 prevents the further rotation of the round bale B, and assists in retaining the round bale B on the platform 220. The first rail 224 is opposite the second rail 226, and each of the rails 224, 226 extend along the platform 220 such that ends of each of the rails 224, 226 are coupled to the fourth plate members 172. Thus, in this example, the rails 224, 226 extend in a direction that is substantially perpendicular to a direction of forward travel of the tractor 12 (FIG. 1).

Each of the rails 224, 226 include a pair of stops 230. A first stop 230.1 of the pair of stops 230 is coupled at a first end 224.1, 226.1 of each of the rails 224, 226, and a second stop 230.2 of the pair of stops 230 is coupled at a second end 224.2, 226.2 of each of the rails 224, 226. The rails 224, 226 guide the pusher 202 as the pusher 202 moves between the first stops 230.1 and the second stops 230.2. The slot 228 receives a portion of the pusher 202 to drive the pusher 202 between the first end 224.1, 226.1 and the second end 224.2, 226.2 of each of the rails 224, 226.

The pusher 202 includes a lower flange 240 and an upper flange 242. The lower flange 240 is coupled to the upper flange 242. The lower flange 240 extends below the platform 220, and is coupled to a pusher hydraulic actuator 241, such as a hydraulic cylinder. The pusher hydraulic actuator 241 is fluidly coupled to the hydraulic system of the baler 10. For example, the pusher hydraulic actuator 241 may include one or more hydraulic lines that connect the pusher hydraulic actuator 241 with the hydraulic supply associated with the tractor 12. One or more electro-hydraulic control valves of the hydraulic system of the baler 10 may be in fluid communication with the pusher hydraulic actuator 241 and electrically activated according to signals from the ECU to control the flow of hydraulic fluid between the hydraulic supply associated with the tractor 12 and the pusher hydraulic actuator 241. The pusher hydraulic actuator 241 is responsive to the hydraulic fluid received from the hydraulic system to move the pusher 202 between the rails 224, 226 from the first end 224.1, 226.1 to the second end 224.2, 226.2 and vice versa.

The upper flange 242 extends outwardly and upwardly from the platform 220 to contact the bale. The upper flange 242 may include a left projection 244 and a right projection 246. The left projection 244 extends outward from a first or left side 242.1 of the upper flange 242; and the right projection 246 extends outward from a second or right side 242.2 of the upper flange 242. The left projection 244 and the right projection 246 contact a round bale received on the platform 220 and cooperate with the upper flange 242 to move the round bale to the respective one of the fourth plate members 172 on the actuation of the pusher hydraulic actuator 241.

Figure 5:
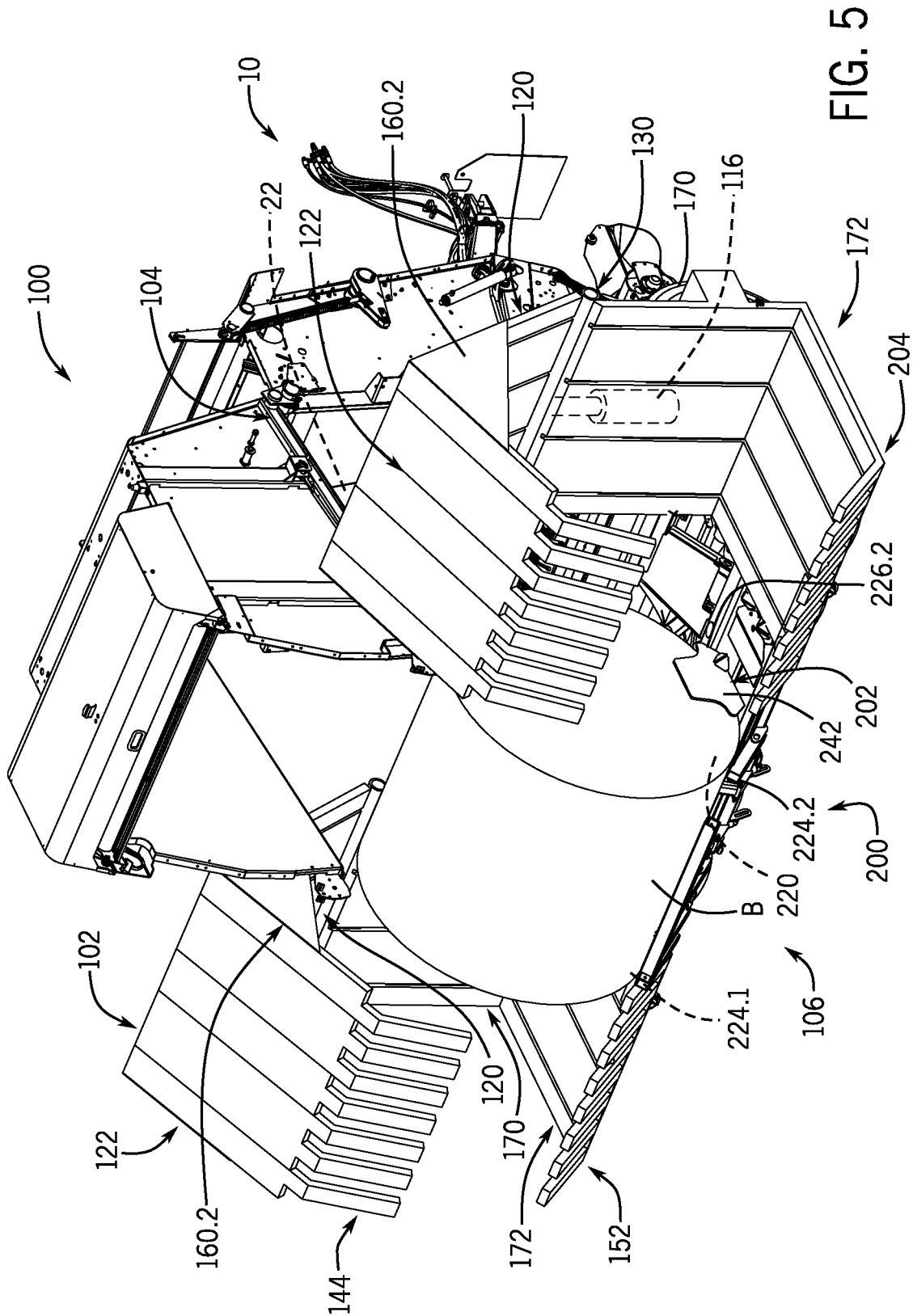
FIG. 5 is a rear perspective view of a second side of the bale recompression system of FIG. 1, which illustrates upper platens of both the first platen system and the second platen system of the bale recompression system in the first position and the formed round bale received on the bale accumulator.

With reference to FIG. 5, in one example, in order to assemble each of the first platen system 102 and the second platen system 104, with the first plate member 120 coupled to the second plate member 122 to define the upper platen 110, the third plate member 170 is coupled to the fourth plate member 172 to define the bottom platen 112. The supports 160.1, 160.2 are coupled to the first plate member 120 and the second plate member 122. The upper platen 110 is coupled to the bottom platen 112 at the hinge 130, and the actuator 116 is coupled to the third plate member 170 and the first plate member 120 to enable movement of the upper platen 110 between the first position and the second position. The hinge 130 defines a pivot axis P1 for the upper platen 110. It should be noted that while the upper platen 110 is described herein as being coupled to the bottom platen 112 via the hinge 130, the upper platen 110 may be coupled to the bottom platen 112 via a pivot pin or other device that enables the upper platen 110 to pivot relative to the bottom platen 112.

With the first platen system 102 and the second platen system 104 assembled, the first platen system 102 and the second platen system 104 are coupled to the support frame 200 once the bale accumulator 106 is assembled. In certain embodiments, the third plate members 170 are coupled to the shaft 194, which is coupled to the bottom platen hydraulic actuator 196. Generally, the bale accumulator 106 is assembled by coupling the pusher 202 to the support frame 200, with the lower flange 240 disposed within and partially below the slot 228, and the upper flange 242 is coupled to the lower flange 240 (FIG. 4) to contact a received round bale B. The pusher hydraulic actuator 241 is coupled to the lower flange 240. The flexible members 208 are coupled to the attachment points 210, 212 of the support frame 200.

With the bale accumulator 106 assembled, the fourth plate member 172 of the first platen system 102 is coupled at the first ends 224.1, 226.1 of the rails 224, 226 (FIG. 4) and the fourth plate member 172 of the second platen system 104 is coupled to the second ends 224.2, 226.2 of the rails 224, 226. The respective actuators 116, 196, 241 are each coupled to the hydraulic system of the baler 10 so as to be fluidly coupled to the hydraulic supply of the tractor 12.

Once the round bale B is formed in the bale forming chamber 22 of the baler 10, the discharge gate 26 moves to the open discharge position to release the formed round bale B. The formed round bale B contacts the flexible members 208 (FIG. 4) and rolls until the round bale B contacts the stop 222 on the platform 220. In this position, as shown in FIG. 5, the left projection 244 of the upper flange 242 contacts the round bale B.

Figure 6:
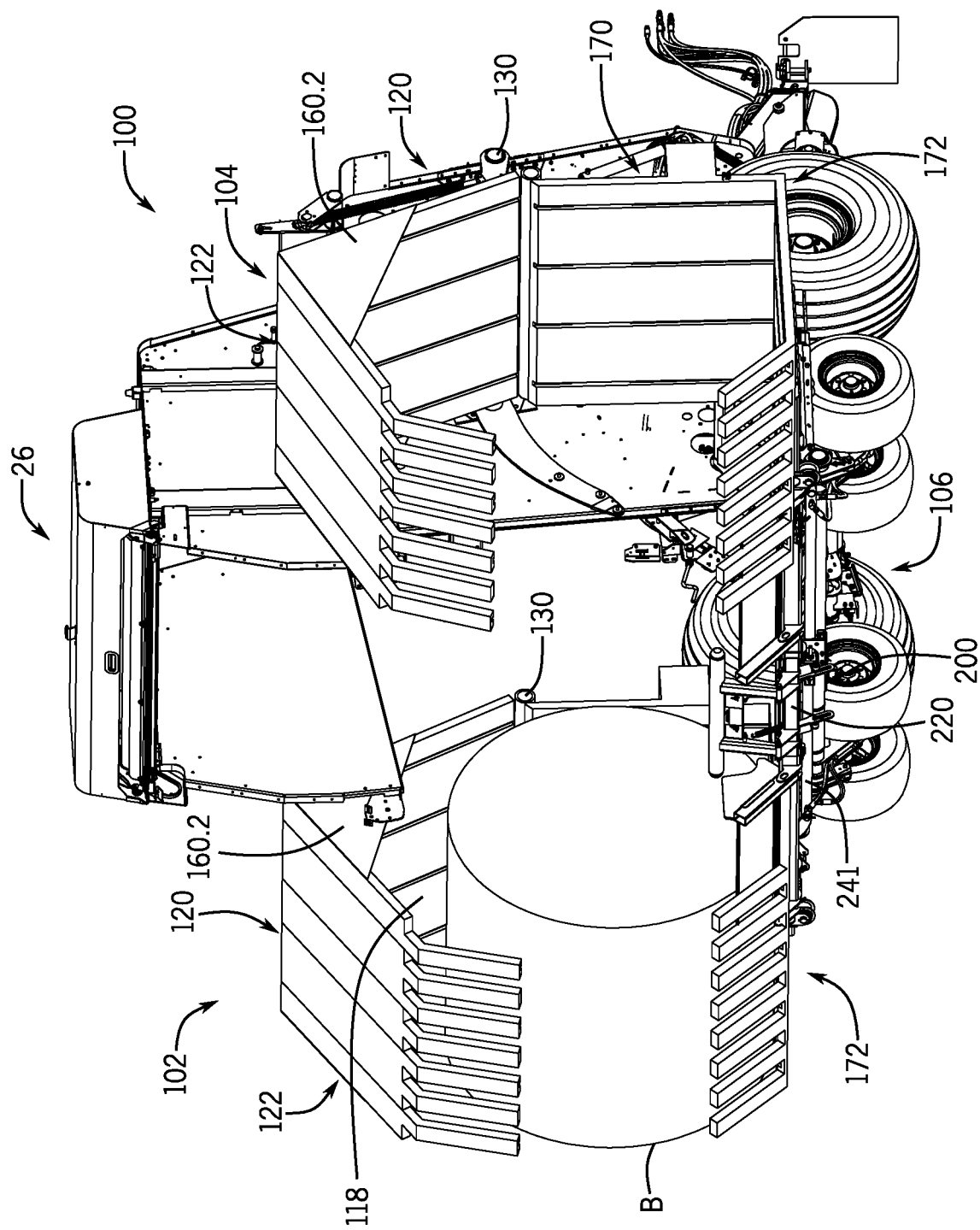
FIG. 6 is a rear perspective view of the second side of the bale recompression system of FIG. 1, which illustrates upper platens of both the first platen system and the second platen system of the bale recompression system in the first position and the formed round bale received on a bottom platen of the first platen system.
Figure 7:
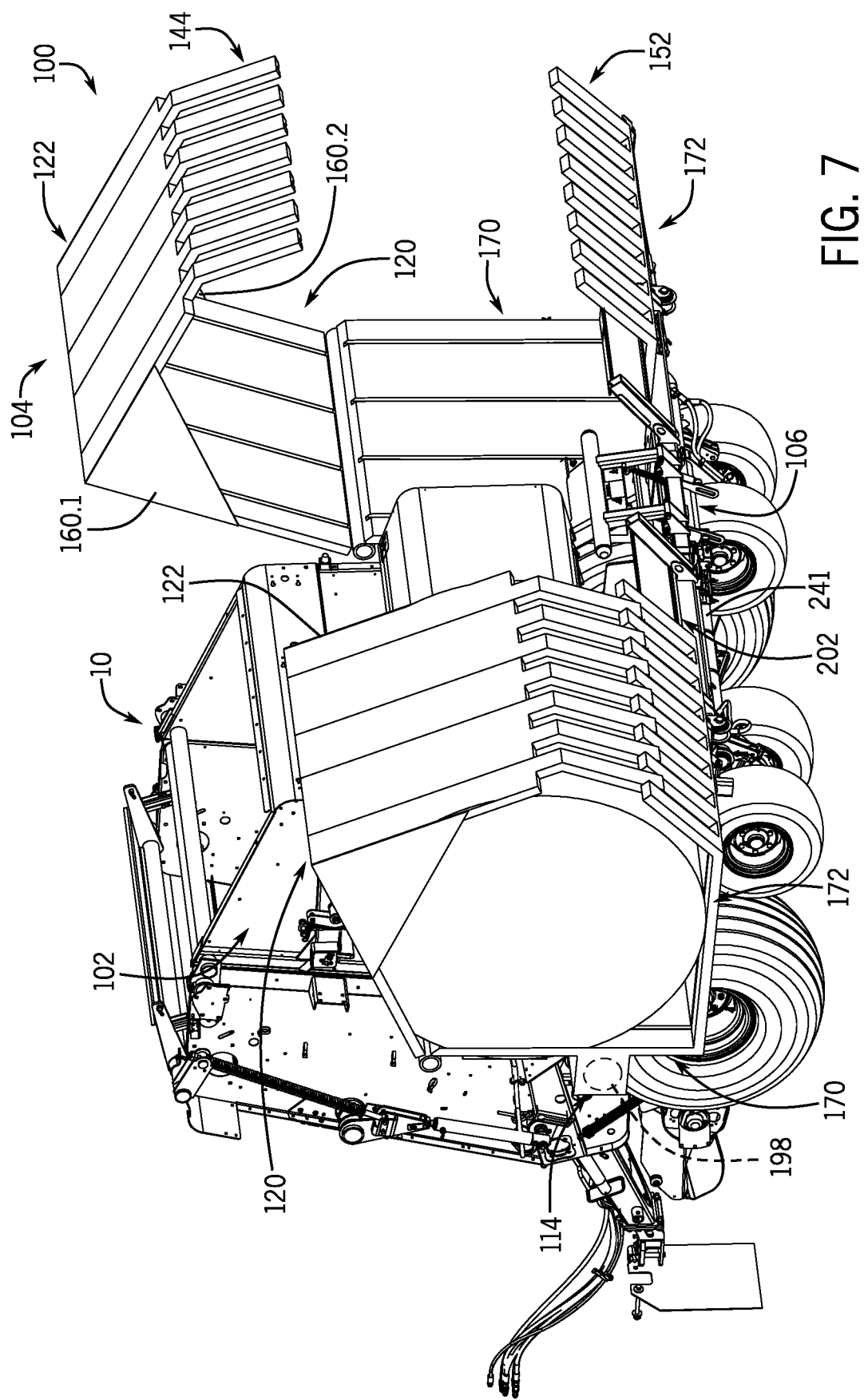
FIG. 7 is a rear perspective view of the first side of the bale recompression system of FIG. 1, which illustrates the upper platen of the first platen system in a position between the first position and a second position, and the upper platen of the second platen system in the first position.

With reference to FIG. 6, with the upper platen 110 of each of the first platen system 102 and the second platen system 104 in the first position, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the round bale B into the opening 118. With the round bale B received within the first platen system 102, with reference to FIG. 7, the actuator 116 of the first platen system 102 is actuated, based on hydraulic fluid received from the hydraulic supply of the tractor 12 through the hydraulic system of the baler 10, for example. The actuation of the actuator 116 rotates the upper platen 110 toward the bottom platen 112 to recompress the round bale B. The actuator 116 continues to rotate the upper platen 110 toward the bottom platen 112 such that the upper fingers 144 interleave with the lower fingers 152, as shown in FIG. 8.

Figure 8:
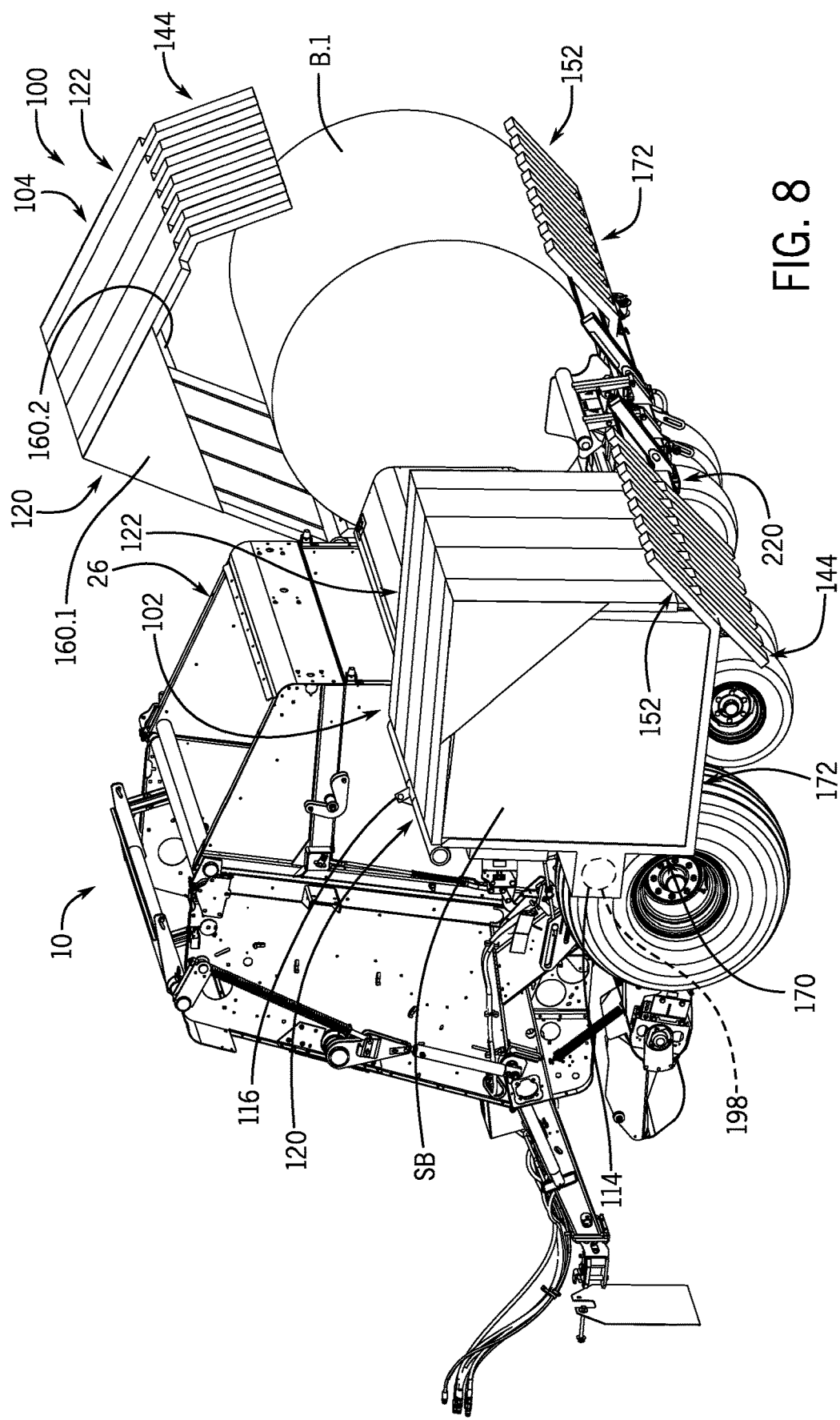
FIG. 8 is a rear perspective view of the first side of the bale recompression system of FIG. 1, which illustrates the upper platen of the first platen system in the second position, and a second formed round bale received on a bottom platen of the second platen system with the upper platen of the second platen system in the first position.
Figure 9:
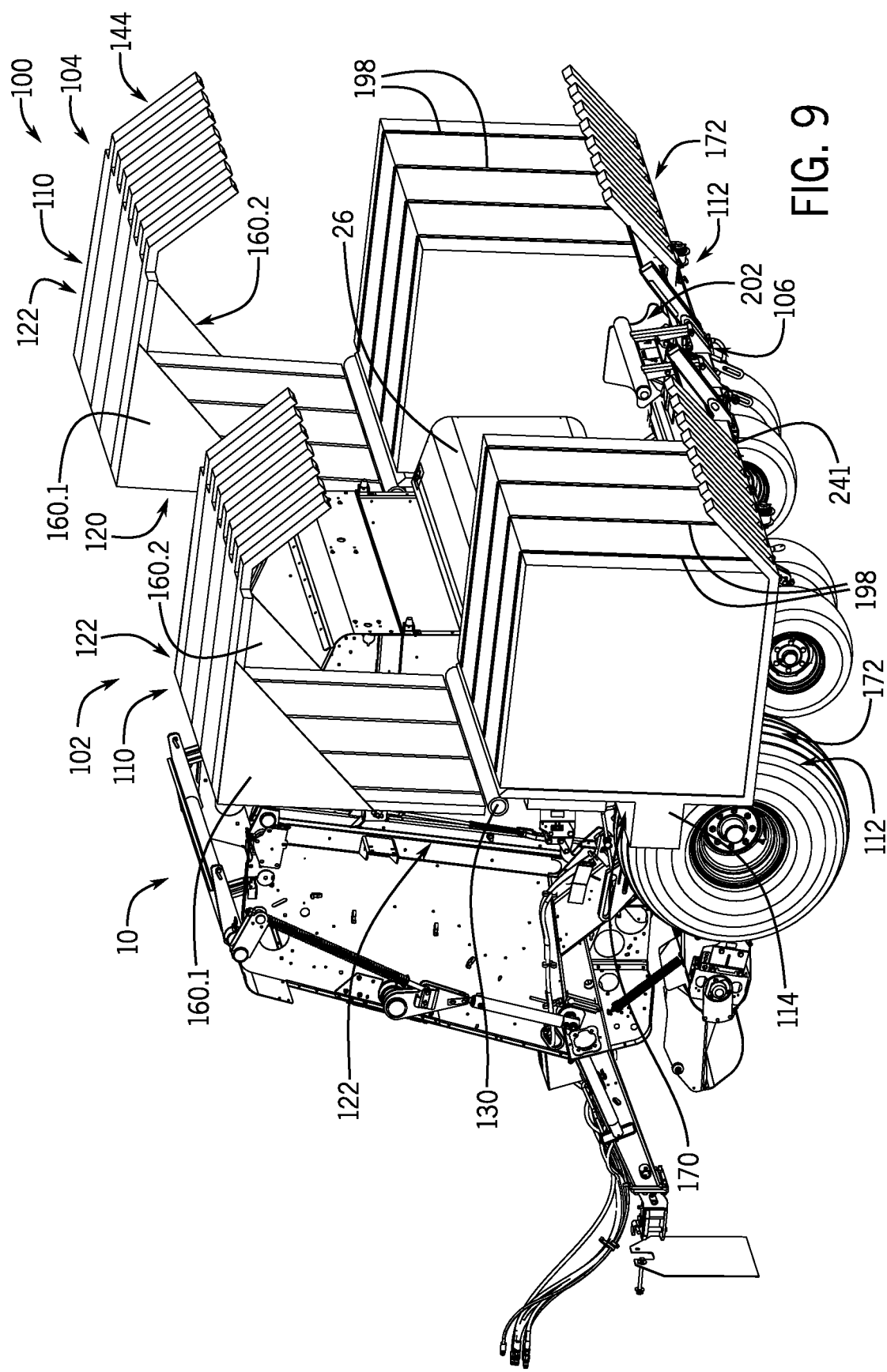
FIG. 9 is a rear perspective view of the first side of the bale recompression system of FIG. 1, which illustrates a first square bale and a second square bale formed by the first platen system and the second platen system, which are banded by wrap material received through a banding unit associated with each of the first platen system and the second platen system and the bottom platens of each of the first platen system and the second platen system are in a first recompression position.

With continued reference to FIG. 8, as the first platen system 102 forms a square bale SB, the discharge gate 26 moves to the open discharge position to release a second round bale B.1. Once the second round bale B.1 is received on the platform 220, the pusher hydraulic actuator 241 of the bale accumulator 106 is actuated based on hydraulic fluid received from the hydraulic supply of the tractor 12 through the hydraulic system of the baler 10, for example. The actuation of the pusher hydraulic actuator 241 moves the second round bale B.1 onto the fourth plate member 172 of the second platen system 104. With the second round bale B.1 received on the fourth plate member 172 of the second platen system 104, the actuator 116 is actuated based on hydraulic fluid received from the hydraulic supply of the tractor 12 through the hydraulic system of the baler 10, for example. The actuation of the actuator 116 moves the upper platen 110 from the first position to the second position to recompress the second round bale B.1. With the upper platen 110 of each of the first platen system 102 and the second platen system 104 in the second position, the banding unit 114 of each of the first platen system 102 and the second platen system 104 may be activated to apply wrap material 198 to each of the square bales SB, SB.1 (FIG. 9). The wrap material 198 passes through the first banding channels 132, the second banding channels 154, the third banding channels 180 and the fourth banding channels 190 to surround the square bales SB, SB.1 (FIG. 9). Thus, the bale recompression system 100 is capable of compressing two round bales at a time into square bales. It should be understood, however, that a single one of the first platen system 102 and the second platen system 104 may be coupled to the bale accumulator 106 to recompress a single round bale at a time.

With reference to FIG. 9, with the second round bale B.1 from FIG. 8 recompressed into the second square bale SB.1 and the wrap material 198 applied, the upper platen 110 of each of the first platen system 102 and the second platen system 104 may be moved from the second position to the first position. It should be noted, however, that the upper platen 110 of the first platen system 102 may be moved to the first position upon completion of recompressing the bale.

With the upper platen 110 of each of the first platen system 102 and the second platen system 104 in the first position, with reference to FIG. 10, the bottom platen hydraulic actuator 196 may be actuated, based on hydraulic fluid received from the hydraulic supply of the tractor 12 through the hydraulic system of the baler 10, for example. The actuation of the bottom platen hydraulic actuator 196 rotates the shaft 194. The rotation of the shaft 194 rotates the bottom platen 112 of each of the first platen system 102 and the second platen system 104 from the first, recompression position (FIG. 9) to the second, discharge position (FIG. 10). In the second, discharge position, the lower fingers 152 rest on a ground surface G to enable the square bales SB, SB.1 to fall onto the ground surface G. The bottom platen hydraulic actuator 196 may be actuated to reverse the rotation of the shaft 194 to move the bottom platen 112 of each of the first platen system 102 and the second platen system 104 from the second position to the first position (FIG. 9) to resume recompressing round bales. It should be noted, however, that the bottom platen hydraulic actuator 196 and the shaft 194 may be configured such that a single one of the bottom platens 112 may be rotated to the second, discharge position, to enable a single one of the square bales SB, SB.1 to be deposited at a time. Thus, in certain embodiments, the bottom platens 112 are individually rotatable relative to the baler 10 to deposit the respective square bales SB, SB.1 onto the ground surface G. Moreover, the bale recompression system 100 may be configured to deposit the square bales SB, SB.1 on a virtual trip line. As the depositing of the bales on a virtual trip line is known from commonly assigned U.S. Pat. No. 9,578,811 to Kraus et al., titled "Variable Rate Discharge System for Crop Accumulator,"

which is incorporated herein by reference, the depositing of the square bales SB, SB.1 will not be discussed in detail herein.

Figure 11:
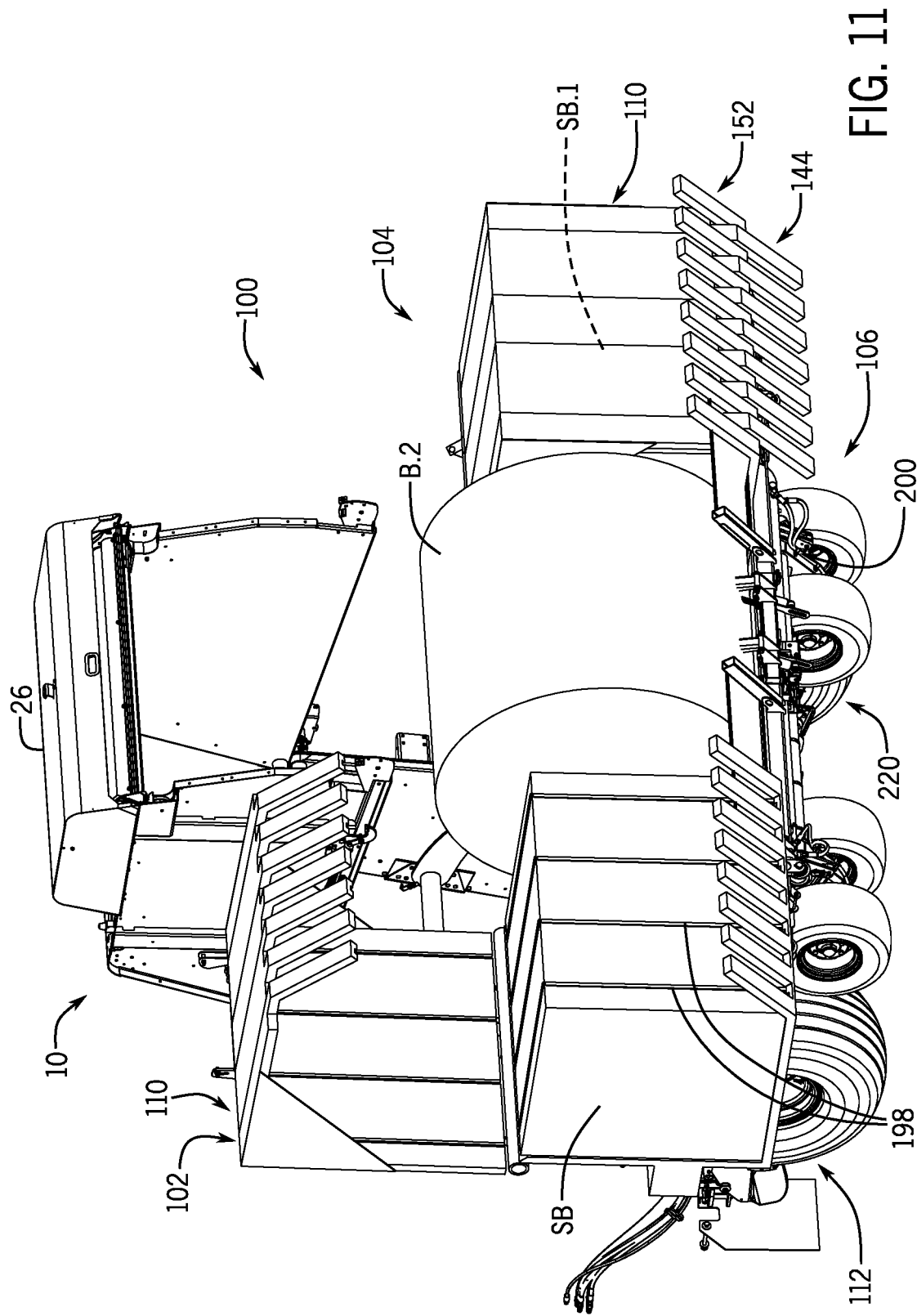
FIG. 11 is a rear perspective view of the first side of the bale recompression system of FIG. 1, which illustrates a third formed round bale received on the bale accumulator, and the first square bale and the second square bale on the respective one of the bottom platens of each of the first platen system and the second platen system.

Alternatively, in certain embodiments, with reference to FIG. 11, the upper platen 110 may be moved from the second position to the first position once the square bale SB is formed and wrapped with the wrap material 198. While the upper platen 110 of the second platen system 104 is in the second position to form the second square bale SB.1, a third round bale B.2 may be discharged through the discharge gate 26 onto the platform 220. The third round bale B.2 is received on the platform 220 of the support frame 200.

Figure 12:
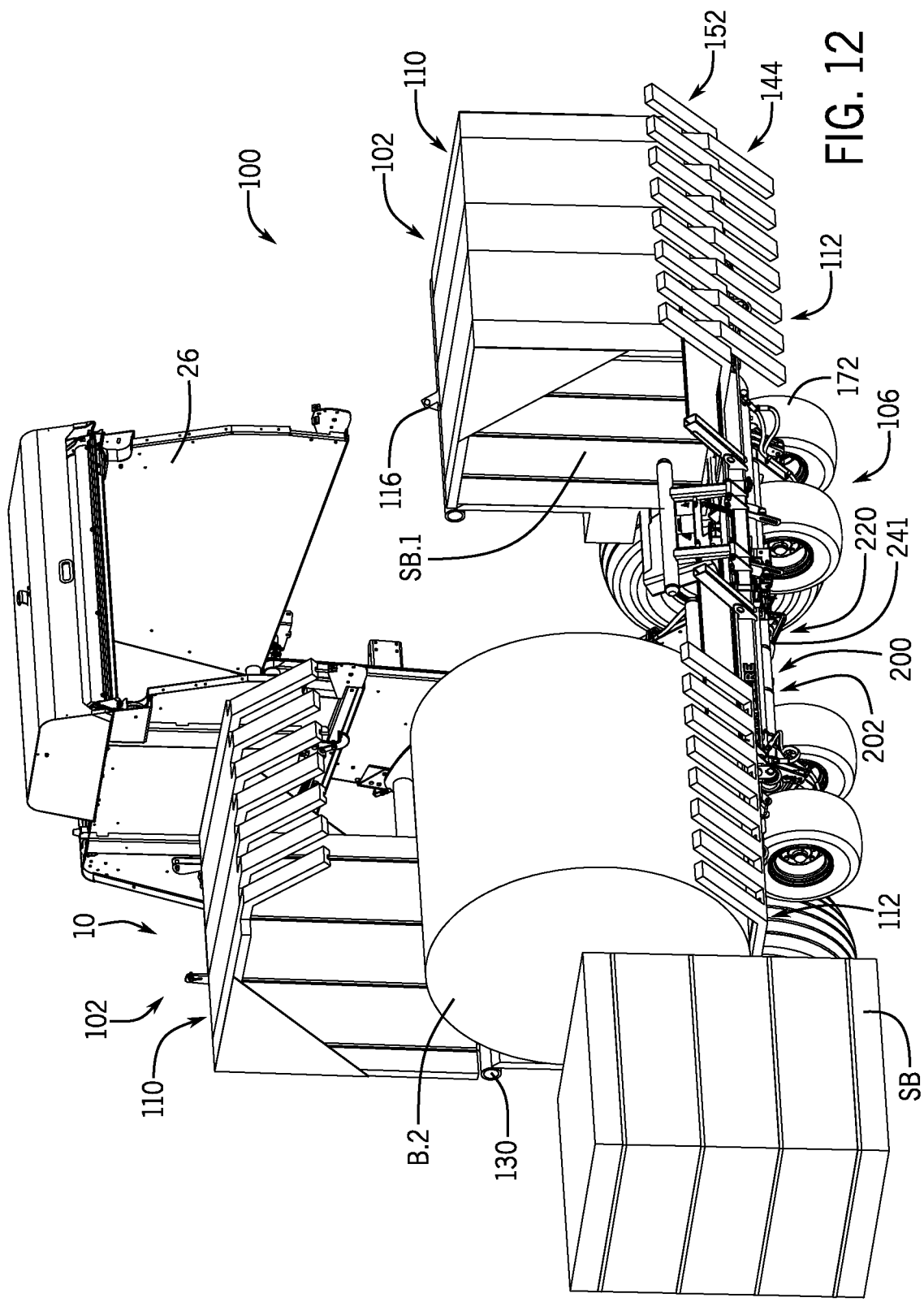
FIG. 12 is a rear perspective view of the first side of the bale recompression system of FIG. 1, which illustrates the third formed round bale ejecting the first square bale from the bottom platen of the first platen system to deposit the first square bale on the ground surface.

With reference to FIG. 12, the pusher hydraulic actuator 241 is actuated, and moves the third round bale B.2 toward the first platen system 102. As the third round bale B.2 moves toward the first platen system 102, the third round bale B.2 contacts the square bale SB. The continued advancement of the pusher 202 to move the third round bale B.2 unto the fourth plate member 172 ejects the square bale SB from the first platen system 102. The upper platen 110 may then be moved, via the actuator 116, from the first position to the second position to recompress the third round bale B.2.

Figure 13:
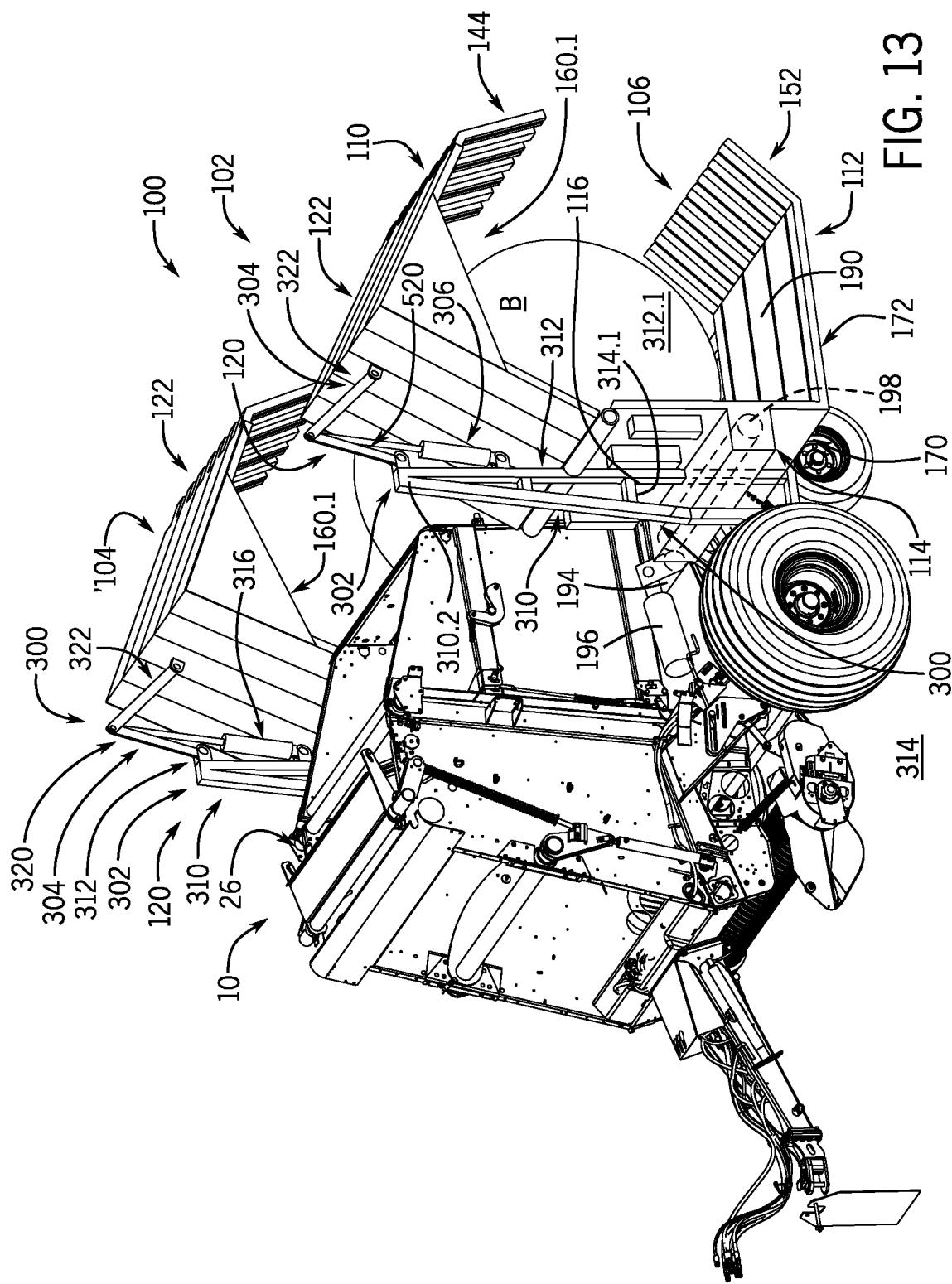
FIG. 13 is a front perspective view of an example bale recompression system, which illustrates upper platens of both the first platen system and the second platen system of the bale recompression system in a first position and an example actuation system for the both the first platen system and the second platen system.

It should be noted that while the bale recompression system 100 is described herein as employing hydraulic actuators 116 to move the upper platen 110 relative to the bottom platen 112, the upper platen 110 may be moved relative to the bottom platen 112 in a variety of ways. For example, with reference to FIG. 13, a bale recompression system 100' is shown. As the bale recompression system 100' is similar to the bale recompression system 100 discussed with regard to FIGS. 1-12, the same reference numerals will be used to denote the same or substantially similar components. The bale recompression system 100' includes a first platen system 102' and a second platen system 104'. As the first platen system 102' is the same as the second platen system 104', for ease of description, the first platen system 102' will be described in detail herein, with the same reference numerals used to denote the same features of the second platen system 104'.

The first platen system 102' includes the upper platen 110, the bottom platen 112, the banding unit 114 and an actuation system 300. In this example, the actuation system 300 includes a support structure 302, a linkage 304 and an actuator 306. The support structure 302 is rigid structure, which is capable of withstanding the force applied by the actuator 306 to move the upper platen 110 to recompress the bale B. In one example, the support structure 302 includes a support beam 308, a first frame member 310, a second frame member 312 and one or more interconnecting members 314. While the support structure 302 is described herein as comprising separate and discrete components that are coupled together, via welding, mechanical fasteners, etc., it will be understood that the support structure 302 may be integrally formed, via selective metal sintering, additive manufacturing, etc. The support beam 308 may comprise an I-beam or similar beam, which is coupled to a bottom surface of the bottom platen 112. Generally, the support beam 308 is composed of a metal or metal alloy, and may be stamped, forged, cast, etc. While the support beam 308 is described herein as a beam, the support beam 308 may comprise a rigid plate, a truss structure, or the like. Moreover, the support beam 308 may comprise more than one beam.

The first frame member 310 and the second frame member 312 are coupled to the support beam 308, via welding, mechanical fasteners, etc. The first frame member 310 and the second frame member 312 are composed of a metal or metal alloy, and may be stamped, forged, cast, etc. The first frame member 310 has a first end 310.1 coupled to the support beam 308 and an opposite, second end 310.2 coupled to the second frame member 312. Generally, the first frame member 310 extends along an axis that is transverse to a longitudinal axis of the support beam 308 such that the first frame member 310 extends at an angle relative to the support beam 308. The second frame member 312 has a first end 312.1 coupled to the support beam 308 and an opposite, second end 312.2 coupled to the first frame member 310. The first end 312.1 of the second frame member 312 is spaced apart from the first end 310.1 of the first frame member 310. Generally, the second frame member 312 extends along an axis that is substantially perpendicular to a longitudinal axis of the support beam 308.

The interconnecting members 314 couple or connect the first frame member 310 to the second frame member 312. Generally, each of the interconnecting members 314 extend along an axis that is substantially parallel to the longitudinal axis of the support beam 308. In this example, the interconnecting members 314 include a first interconnecting member 314.1 and a second interconnecting member 314.2. The first interconnecting member 314.1 has a first end coupled to the first frame member 310 and a second end coupled to the second frame member 312. The first interconnecting member 314.1 generally has a length that is greater than a length of the second frame member 312 due to the orientation of the first frame member 310. The second interconnecting member 314.2 has a first end coupled to the first frame member 310 and a second end coupled to the second frame member 312. It should be noted that the orientation and configuration of the support structure 302 is merely an example.

In one example, the linkage 304 is a scissors linkage, having a first link 320 and a second link 322. Each of the first link 320 and the second link 322 are composed of a metal or metal alloy, and may be stamped, forged, cast, etc. The first link 320 has a first end 320.1 and an opposite, second end 320.2, and the first link 320 extends along a first link longitudinal axis. The first end 320.1 is coupled to the second frame member 312. In this example, the second frame member 312 includes a first bracket 324, and the first end 320.1 is pivotally coupled to the first bracket 324 via a first pin 326. The first pin 326 defines a first pivot axis SP1 for the linkage 304. The second end 320.2 is coupled to the second link 322 via a second pin 328. The second pin 328 defines a second pivot axis SP2 for the linkage 304.

The second link 322 includes a first end 322.1 and an opposite, second end 322.2, and the second link 322 extends along a second link longitudinal axis. The first end 322.1 is coupled to the second end 320.2 of the first link 320 via the second pin 328. The second end 322.2 is coupled to the first plate member 120 of the upper platen 110. In one example, the first plate member 120 of the upper platen 110 has a second bracket 330, and the second end 322.2 is coupled to the second bracket 330 via a third pin 332. The third pin 332 defines a third pivot axis SP3 for the linkage 304.

The actuator 306 rotates the upper platen 110 between the first position and the second position. In this example, the actuator 306 is a hydraulic cylinder, which is in fluid communication with the hydraulic system of the baler 10. For example, the actuator 306 may include one or more hydraulic lines that connect the actuator 306 with the hydraulic supply associated with the tractor 12. One or more electro-hydraulic control valves of the hydraulic system of the baler 10 may be in fluid communication with the actuator 306 and electrically activated according to signals from the ECU to control the flow of hydraulic fluid between the hydraulic supply associated with the tractor 12 and the actuator 306. It should be noted that while a single actuator 306 is illustrated herein, one or more actuators 306 may be employed. The actuator 306 is responsive to hydraulic fluid received from the tractor 12 to rotate the upper platen 110 relative to the bottom platen 112. In one example, the second frame member 312 includes a third bracket 334, and the actuator 306 has a first end 306.1 coupled to the third bracket 334 via a fourth pin 336. Generally, the actuator 306 is coupled to the third bracket 334 so as to remain in a fixed orientation (i.e. non-rotating) relative to the second frame member 312. The actuator 306 has a second end 306.1, which is opposite the first end 306.1. The second end 306.2 is coupled to the second pin 328. In one example, the second pin 328 is received through a bore defined through the second end 306.2 of the actuator 306 to couple the actuator 306 to the second pin 328, the first links 320 and the second links 322.

Figure 13B:
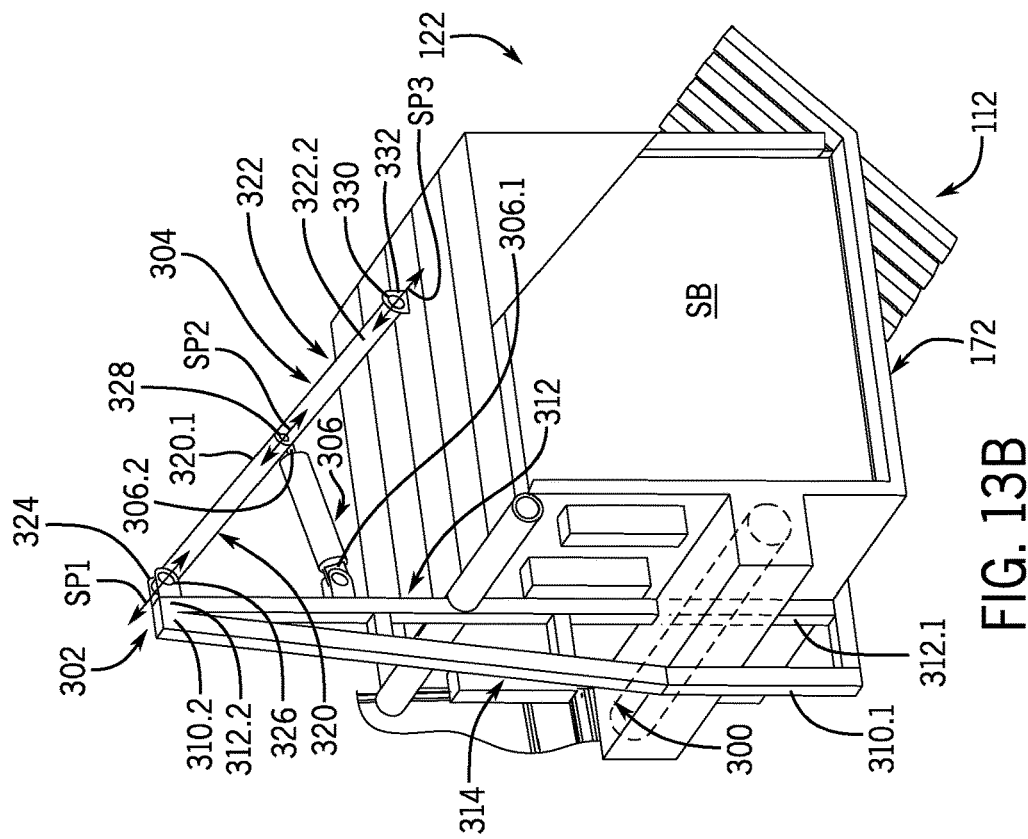
FIG. 13B is a detail front perspective of the actuation system of the bale recompression system of FIG. 13, with the upper platen in the second position.
Figure 13A:
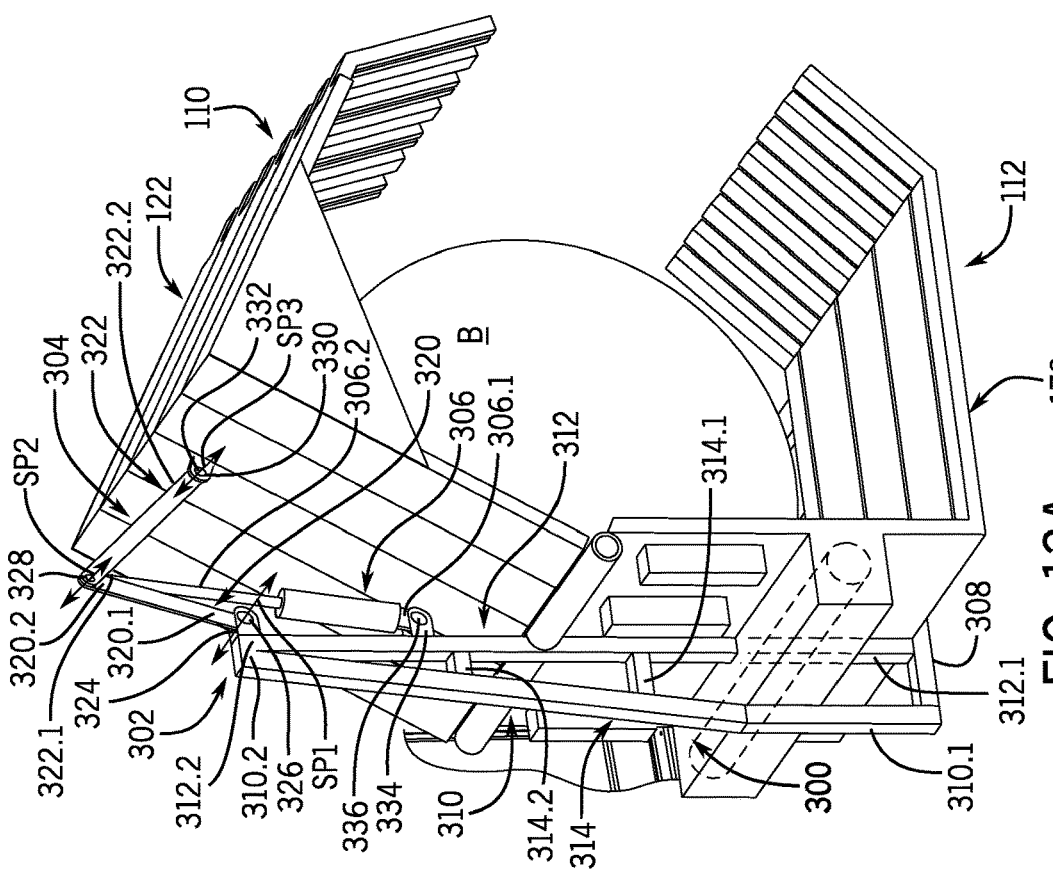
FIG. 13A is a detail front perspective of the actuation system of the bale recompression system of FIG. 13, with the upper platen in the first position.

In order to move the upper platen 110 between the first position and the second position, with the upper platen 110 in the first position (FIG. 13A), upon receipt of the hydraulic fluid, the actuator 306 retracts such that the second end 306.2 of the actuator 306 is pulled toward the first end 306.1. As the first link longitudinal axis is substantially transverse to or intersects the second link longitudinal axis in the first position of the upper platen 110, the retraction of the second end 306.2 of the actuator 306 causes the linkage 304 to move toward a position in which the first link longitudinal axis is substantially parallel to the second link longitudinal axis. This movement of the linkage 304 causes the upper platen 110 to move or rotate into the second position (FIG. 13B) to enable recompression of a round bale into a square bale.

Figure 14:
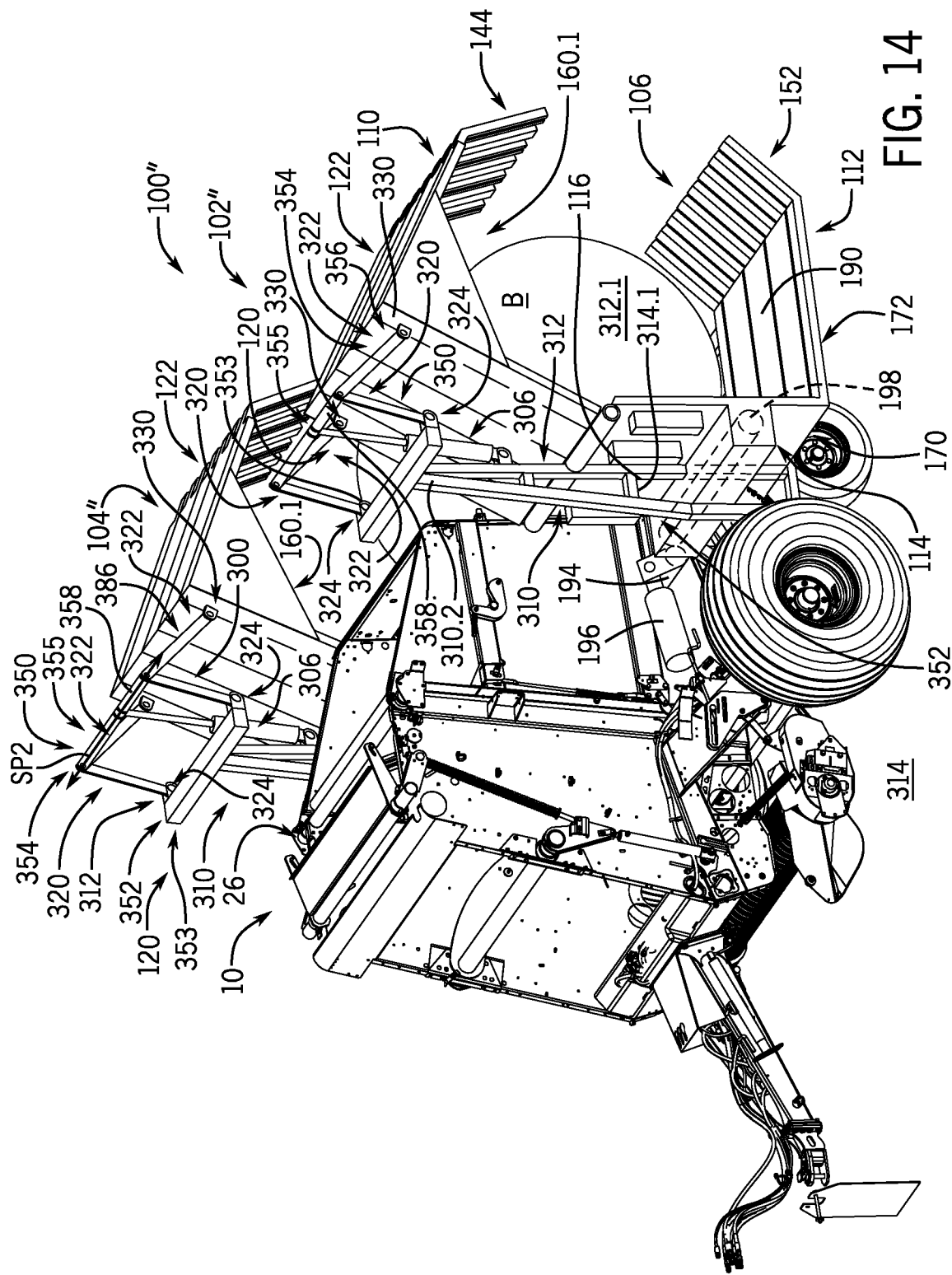
FIG. 14 is a front perspective view of an example bale recompression system, which illustrates upper platens of both the first platen system and the second platen system of the bale recompression system in a first position and an example actuation system for the both the first platen system and the second platen system.

As discussed, the upper platen 110 may be moved relative to the bottom platen 112 in a variety of ways. In another example, with reference to FIG. 14, a bale recompression system 100″ is shown. As the bale recompression system 100″ is similar to the bale recompression system 100' discussed with regard to FIGS. 13-13B, the same reference numerals will be used to denote the same or substantially similar components. The bale recompression system 100″ includes a first platen system 102″ and a second platen system 104″. As the first platen system 102″ is the same as the second platen system 104″, for ease of description, the first platen system 102″ will be described in detail herein, with the same reference numerals used to denote the same features of the second platen system 104″.

The first platen system 102″ includes the upper platen 110, the bottom platen 112, the banding unit 114 and an actuation system 350. In this example, the actuation system 350 includes a support structure 352, a linkage assembly 354 and the actuator 306. In one example, the support structure 352 includes the support beam 308, the first frame member 310, the second frame member 312, a cross-bar 353 and the interconnecting members 314.1, 314.2. While the support structure 352 is described herein as comprising separate and discrete components that are coupled together, via welding, mechanical fasteners, etc., it will be understood that the support structure 352 may be integrally formed, via selective metal sintering, additive manufacturing, etc.

In one example, the linkage assembly 354 is a dual scissors linkage, having a first linkage 355 and a second linkage 356 interconnected by a cross-pin 358. The first linkage 355 includes the first link 320 and the second link 322; and the second linkage 356 includes the first link 320 and the second link 322. In this example, the cross-bar 353 includes a pair of first brackets 324. The first end 320.1 of one of the first links 320 is pivotally coupled to one of the first brackets 324 via the first pin 326; and the first end 320.1 of the second one of the first links 320 is pivotally coupled to the other of the first brackets 324 via the first pin 326. The second end 320.2 of each of the pair of first links 320 is coupled to the cross-pin 358.

The first end 322.1 of each of the second links 322 is coupled to the second end 320.2 of each of the first links 320 via the cross-pin 358. The second end 322.2 of each of the second links 322 is coupled to the first plate member 120 of the upper platen 110. In one example, the first plate member 120 of the upper platen 110 has a pair of the second brackets 330, and the second end 322.2 of each of the second links 322 is coupled to a respective one of the second brackets 330 via a respective one of a pair of third pins 332.

The cross-pin 358 is composed of a metal or metal alloy, and may be stamped, forged, cast, etc. The cross-pin 358 defines a second pivot axis SP2 for the linkage assembly 354. The cross-pin 358 couples the second ends 320.2 of each of the first links 320 and the first ends 322.1 of each of the second links 322 to the actuator 306. In one example, the cross-pin 358 is received through a bore defined through the second end 306.1 of the actuator 306 to couple the actuator 306 to the cross-pin 358.

In order to move the upper platen 110 between the first position and the second position, with the upper platen 110 in the first position (FIG. 14), upon receipt of the hydraulic fluid, the actuator 306 retracts such that the second end 306.2 of the actuator 306 is pulled toward the first end 306.1. As the first link longitudinal axis of each of the first links 320 is substantially transverse to or intersects the second link longitudinal axis of each of the second links 322 in the first position of the upper platen 110, the retraction of the second end 306.2 of the actuator 306 causes the linkage assembly 354 to move toward a position in which the first link longitudinal axis of each of the first links 320 is substantially parallel to the second link longitudinal axis of each of the second links 322. Thus, the retraction of the second end 306.2 of the actuator 306 pulls the cross-pin 358 toward the upper platen 110, which causes the pair of first links 320 and the pair of second links 322 to rotate into an extended position. This movement of the linkage assembly 354 causes the upper platen 110 to move or rotate into the second position (similar to that shown in FIG. 13B) to enable recompression of a round bale into a square bale.

Figure 15:
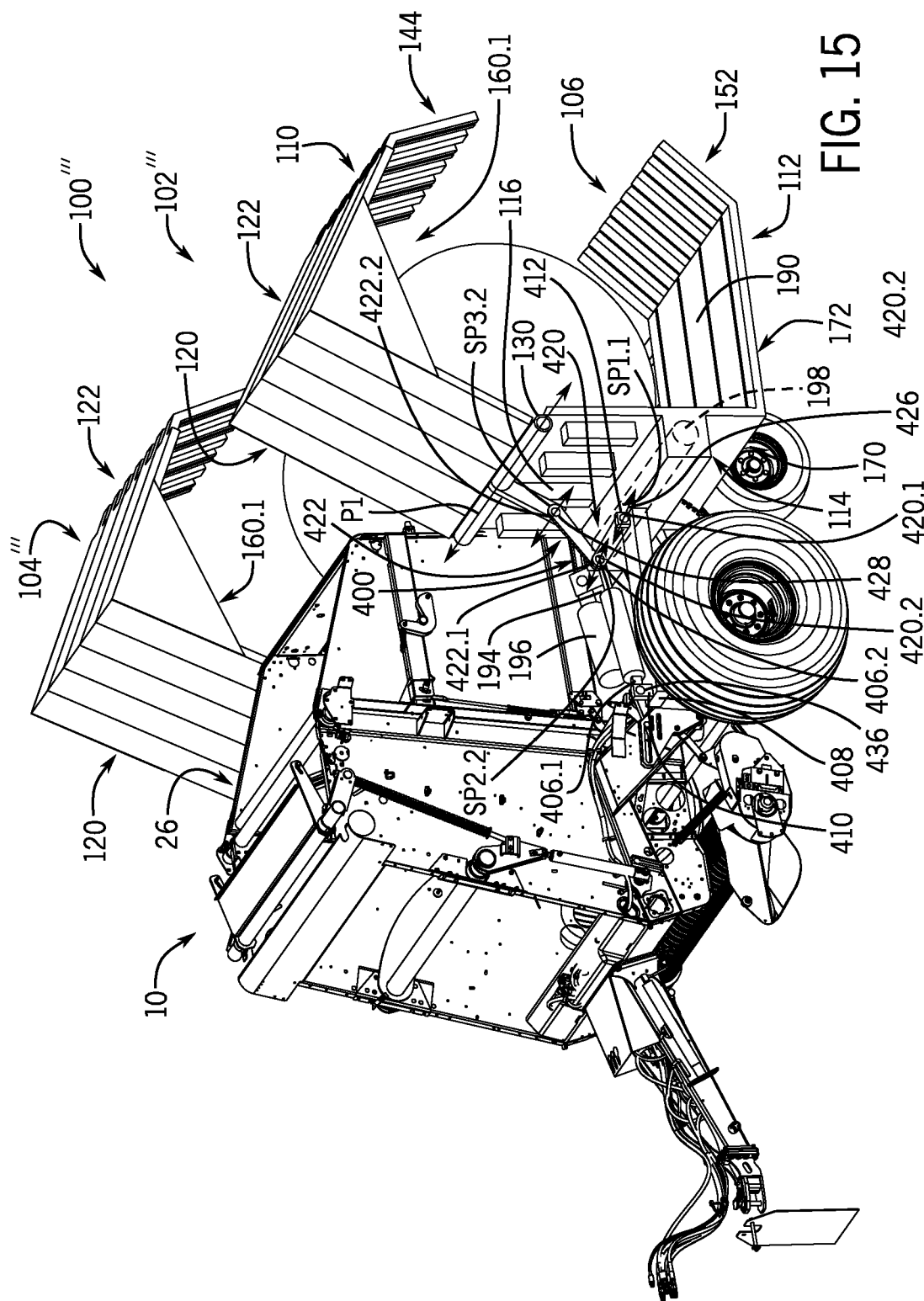
FIG. 15 is a front perspective view of an example bale recompression system, which illustrates upper platens of both the first platen system and the second platen system of the bale recompression system in a first position and an example actuation system for the both the first platen system and the second platen system.

As discussed, the upper platen 110 may be moved relative to the bottom platen 112 in a variety of ways. In another example, with reference to FIG. 15, a bale recompression system 100‴ is shown. As the bale recompression system 100‴ is similar to the bale recompression system 100' discussed with regard to FIGS. 13-13B, the same reference numerals will be used to denote the same or substantially similar components. The bale recompression system 100‴ includes a first platen system 102‴ and a second platen system 104‴. As the first platen system 102‴ is the same as the second platen system 104‴, for ease of description, the first platen system 102‴ will be described in detail herein, with the same reference numerals used to denote the same features of the second platen system 104″.

The first platen system 102‴ includes the upper platen 110, the bottom platen 112, the banding unit 114 and an actuation system 400. In this example, the actuation system 400 includes a support structure 402, a linkage 404 and an actuator 406. The support structure 402 is rigid structure, which is capable of withstanding the force applied by the actuator 406 to move the upper platen 110 to recompress the bale B. In one example, the support structure 402 includes a support beam 408. The support beam 408 may comprise an I-beam or similar beam, which is coupled to the bottom surface of the bottom platen 112. Generally, the support beam 408 is composed of a metal or metal alloy, and may be stamped, forged, cast, etc. While the support beam 408 is described herein as a beam, the support beam 408 may comprise a rigid plate, a truss structure, or the like. Moreover, the support beam 408 may comprise more than one beam.

The support beam 408 is sized to generally extend a distance beyond the third plate member 170. The support beam 408 includes a first bracket 410 at a first end and a second bracket 412 between the first bracket 410 and an opposite, second end. The first bracket 410 couples the actuator 406 to the support beam 408 and the second bracket 412 couples a portion of the linkage 404 to the support beam 408. In one example, the first bracket 410 and the second bracket 412 are each substantially U-shaped and each define a through bore for receipt of a pin. It will be noted that the first bracket 410 and the second bracket 412 may have any desired shape and configuration for receiving the actuator 406.

In one example, the linkage 404 is a scissors linkage, having a first link 420 and a second link 422. Each of the first link 420 and the second link 422 are composed of a metal or metal alloy, and may be stamped, forged, cast, etc. The first link 420 has a first end 420.1 and an opposite, second end 420.2, and the first link 420 extends along a first link longitudinal axis. The first end 420.1 is coupled to the second bracket 412 of the support beam 408. In this example, the first end 420.1 is pivotally coupled to the second bracket 412 via a first pin 426. The first pin 426 defines a first pivot axis SP1.1 for the linkage 404. The second end 420.2 is coupled to the second link 422 via a second pin 428. The second pin 428 defines a second pivot axis SP2.1 for the linkage 404.

The second link 422 includes a first end 422.1 and an opposite, second end 422.2, and the second link 422 extends along a second link longitudinal axis. The first end 422.1 is coupled to the second end 420.2 of the first link 420 via the second pin 428. The second end 422.2 is coupled to an extension 430 of the upper platen 110. The extension 430 is composed of a metal or metal alloy, and may be stamped, forged, cast, etc. In one example, the extension 430 is coupled to the first plate member 120 of the upper platen 110 at the hinge 130, and extends downward from the first plate member 120 at an angle. It should be noted, however, that the extension 430 may have any desired shape, and may be coupled to the upper platen 110 at any desired location. The extension 430 couples the linkage 404 to the upper platen 110 to enable the movement of the upper platen 110 about the pivot axis P1. Generally, the second end 422.2 is coupled to the extension 430 via a third pin 432. The third pin 432 defines a third pivot axis SP3.2 for the linkage 404.

The actuator 406 rotates the upper platen 110 between the first position and the second position. In this example, the actuator 406 is a hydraulic cylinder, which is in fluid communication with the hydraulic system of the baler 10. For example, the actuator 406 may include one or more hydraulic lines that connect the actuator 406 with the hydraulic supply associated with the tractor 12. One or more electro-hydraulic control valves of the hydraulic system of the baler 10 may be in fluid communication with the actuator 406 and electrically activated according to signals from the ECU to control the flow of hydraulic fluid between the hydraulic supply associated with the tractor 12 and the actuator 406. The actuator 406 is responsive to hydraulic fluid received from the tractor 12 to rotate the upper platen 110 relative to the bottom platen 112. In one example, the actuator 406 has a first end 406.1 coupled to the first bracket 410 via a fourth pin 436. Generally, the actuator 406 is coupled to the first bracket 410 so as to remain in a fixed orientation (i.e. non-rotating) relative to the support beam 408. The actuator 406 has a second end 406.2, which is opposite the first end 406.1. The second end 406.2 is coupled to the second pin 428. In one example, the second pin 428 is received through a bore defined through the second end 406.2 of the actuator 406 to couple the actuator 406 to the second pin 428.

In order to move the upper platen 110 between the first position and the second position, with the upper platen 110 in the first position (FIG. 15), upon receipt of the hydraulic fluid, the actuator 406 extends such that the second end 406.2 of the actuator 406 is pushed toward the first end 406.1. As the first link longitudinal axis is substantially transverse to or intersects the second link longitudinal axis in the first position of the upper platen 110, the retraction of the second end 406.2 of the actuator 406 causes the linkage 404 to move toward a position in which the first link longitudinal axis is substantially parallel to the second link longitudinal axis. This movement of the linkage 404 causes the upper platen 110 to move or rotate into the second position (similar to that shown in FIG. 13B) to enable recompression of a round bale into a square bale. It should be noted that the position of the actuator 406 is merely an example, as the actuators 116, 306, 406 may be positioned at any desired location relative to the upper platen 110 to move the upper platen 110 relative to the bottom platen 112.

Figure 16:
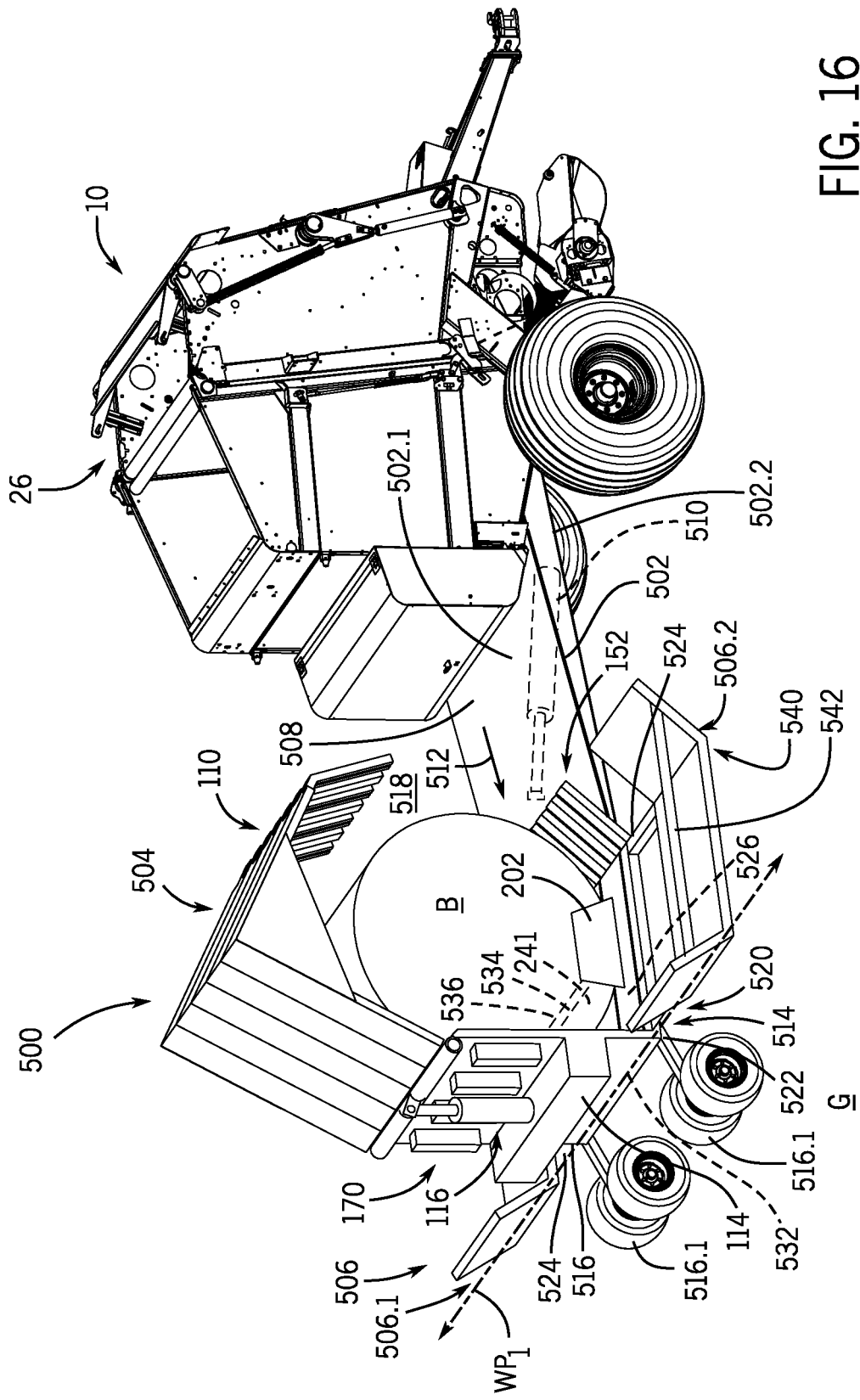
FIG. 16 is a rear perspective view of an example crop-packaging device, such as a baler, having a bale recompression system according to various embodiments of this disclosure.

It should be noted that while the bale recompression system 100 is described herein as including the first platen system 102 and the second platen system 104, it should be understood that the bale recompression system 100 may be configured in a variety of ways. For example, with reference to FIG. 16, a bale recompression system 500 is shown. As the bale recompression system 500 is similar to the bale recompression system 100 discussed with regard to FIGS. 1-12, the same reference numerals will be used to denote the same or substantially similar components. The bale recompression system 500 includes a transfer table 502, first platen system 504 and one or more optional bale accumulator wings 506.

The bale recompression system 500 is coupled to the baler 10 for movement with the baler 10 as the baler 10 is towed by the tractor 12. As will be discussed, the bale recompression system 500 receives the round bale B that is discharged by the discharge gate 26, and recompresses the round bale B into a square bale. In this example, the first platen system 504 is towed substantially directly behind the tractor 12, and the transfer table 502 guides the round bale B from the discharge gate 26 of the baler 10 into the first platen system 504.

The transfer table 502 interconnects the baler 10 and the first platen system 504. In various embodiments, the transfer table 502 comprises the platform 56 described in U.S. Pat. No. 9,622,420, previously incorporated herein by reference. Generally, the transfer table 502 is substantially planar and is coupled to the baler 10 so as to be in a position for the round bale B to be dropped on a surface 502.1 of the transfer table 502 when the discharge gate 26 opens. The transfer table 502 is pivotable relative to a support structure 502.2. The transfer table 502 receives the round bale B and when the discharge gate 26 opens, the transfer table 502 tilts and/or lifts the round bale B in a generally aft direction (indicated by arrow 508) to move the round bale B in the direction 512 onto the first platen system 504. Thus, the transfer table 502 is movable between a first position (in which the transfer table 502 is substantially parallel to a ground surface G) and a second position (in which the transfer table 502 is pivoted in the aft direction).

Generally, the transfer table 502 is movable between the first position and the second position by an actuator 510. In one example, the actuator 510 is a hydraulic actuator, which is fluidly coupled to the hydraulic system of the baler 10 and is coupled between the transfer table 502 and the support structure 502.2. For example, the actuator 510 may include one or more hydraulic lines that connect the actuator 510 with the hydraulic supply associated with the tractor 12. One or more electro-hydraulic control valves of the hydraulic system of the baler 10 may be in fluid communication with the actuator 510 and electrically activated according to signals from the ECU to control the flow of hydraulic fluid between the hydraulic supply associated with the tractor 12 and the actuator 510. The actuator 510 is responsive to the hydraulic fluid received from the hydraulic system to move the transfer table 502 between the first position (substantially parallel the ground G) and the second position (pivoted in the aft direction) and vice versa.

In one example, the transfer table 502 is configured to position the round bale B so that it can be slid in the direction 512 without the side of the round bale B getting caught on a portion of the first platen system 504, such as the second plurality of lower fingers 152. This may be accomplished by pivoting the transfer table 502, via the extension of the actuator 510, such that it pushes the round bale B far enough back into the first platen system 504 so that the round bale B does not initially contact the second plurality of lower fingers 152 of the first platen system 504. This ensures that the round bale B enters into the first platen system 504 without damage to the round bale B and without getting hung up or stuck on the second plurality of lower fingers 152.

The first platen system 504 includes the upper platen 110, a bottom platen 514, the banding unit 114 and the actuator 116. The first platen system 504 may be supported on a frame 516, which may include one or more ground wheels 516.1, 516.2. The frame 516 may include the support structure 502.2, which is coupled to and supports the pivotal movement of the transfer table 502. Generally, the upper platen 110 is rotatably coupled to the bottom platen 514, and is rotatable by the actuator 116 between a first position in which the upper platen 110 is spaced apart from the bottom platen 514 to define an opening 518 for receiving the round bale B from the transfer table 502; and a second position, in which the upper platen 110 cooperates with the bottom platen 514 to recompress the round bale B into a square bale. The bottom platen 514 remains stationary during the recompression of the round bales B. The upper platen 110 may include the support plates 160 or the support plates 160 may be optional.

The bottom platen 514 includes the third plate member 170 and a fourth plate member 520. The fourth plate member 520 may be composed of a metal or metal alloy, and formed via casting, forging, stamping, etc. The third plate member 170 and the fourth plate member 520 may be integrally formed, or may be discretely formed and coupled together via a suitable technique, such as welding, mechanical fasteners, etc. The third plate member 170 is coupled to the first plate member 120 of the upper platen 110 such that the first plate member 120 is movable or pivotable relative to the third plate member 170.

The fourth plate member 520 cooperates with the upper platen 110 to secure the bale within the first platen system 504 during recompression. The fourth plate member 520 includes a third bottom plate end 522 opposite a fourth bottom plate end 524. The third bottom plate end 522 is coupled to the third plate member 170. The fourth bottom plate end 524 defines the plurality of lower fingers 152 and includes the plurality of fourth banding channels 190. The fourth plate member 520 also includes a first plate side 524 opposite a second plate side 526, and the pusher 202. The first plate side 524 and the second plate side 526 extend from the third bottom plate end 522 to the fourth bottom plate end 524. As will be discussed, one of the bale accumulator wings 506 may be coupled to the first plate side 524 and another one of the bale accumulator wings 506 may be coupled to the second plate side 526.

In this example, the pusher 202 is integrated into the fourth plate member 520 for moving a formed square bale to either one of the optional bale accumulator wings 506, or for moving the formed square bale off either side of the fourth plate member 520. In one example, the fourth plate member 520 includes a recessed area 530, which includes a first rail 532, a second rail 534 and a slot 536. The first rail 532 is opposite the second rail 534, and each of the rails 532, 534 extend along the fourth plate member 520 from the first plate side 524 to the second plate side 526. Thus, in this example, the rails 532, 534 extend in a direction that is substantially perpendicular to a direction of forward travel of the tractor 12 (FIG. 1). Each of the rails 532, 534 include a pair of stops (not shown; substantially the same as the stops 230.1, 230.2) at each of the first plate side 524 and the second plate side 526. The rails 532, 534 guide the pusher 202 as the pusher 202 moves between the first stops and the second stops. The slot 536 receives a portion of the pusher 202 to drive the pusher 202 between the first plate side 524 and the second plate side 526 along each of the rails 532, 534.

The pusher 202 is coupled to the pusher hydraulic actuator 241, which is fluidly coupled to the hydraulic system of the baler 10. For example, the pusher hydraulic actuator 241 may include one or more hydraulic lines that connect the pusher hydraulic actuator 241 with the hydraulic supply associated with the tractor 12. The pusher hydraulic actuator 241 is responsive to the hydraulic fluid received from the hydraulic system to move the pusher 202 from the first plate side 524 to the second plate side 526 between each of the rails 532, 534 and vice versa. The left projection 244 and the right projection 246 of the pusher 202 contact a round bale received from the transfer table 502 and cooperate with the upper flange 242 of the pusher 202 to move the round bale to the respective one of the bale accumulator wings 506 or off the fourth plate member 520 onto the ground surface G.

The optional one or more bale accumulator wings 506 are coupled to the fourth plate member 520. In this example, one bale accumulator wing 506.1 is coupled to the first plate side 524 and one bale accumulator wing 506.2 is coupled to the second plate side 526. In one example, each of the bale accumulator wings 506.1, 506.2 includes a plurality of interconnected frame members 540. The plurality of interconnected frame members 540 are generally connected together via mechanical fasteners, welding, etc., to define a substantially U-shape for receipt of a square bale formed by the first platen system 504. Generally, one end of the interconnected frame members 540 are coupled to the respective one of the first plate side 524 and the second plate side 526, and the opposite end of the interconnected frame members 540 includes a cross-bar 542, which retains the square bale on the bale accumulator wing 506.1, 506.2. The bale accumulator wing 506.1, 506.2 may also be extendable and retractable, so as to be stowable along the respective first plate side 524 and the second plate side 526 when not in use.

In certain embodiments, the bale accumulator wings 506.1, 506.2 may be coupled to fourth plate member 520 so as to be rotatable relative to the bottom platen 514 to deposit the square bales on a virtual trip line. In one example, the bale accumulator wings 506.1, 506.2 are pivotally coupled to the respective one of the first plate side 524 and the second plate side 526, via a pivot pin or other arrangement that defines a pivot axis WP1. A respective pivot arm (not shown) may be coupled to a respective one of the bale accumulator wings 506.1, 506.2, and moved by a respective actuator (not shown) to pivot the respective one of the bale accumulator wings 506.1, 506.2 about the pivot axis WP1 to deposit the square bales on the ground surface G. The pivot arms and the actuators may be coupled between the bale accumulator wings 506.1, 506.2 and the support frame 502.2 that supports the transfer table 502. The actuator may be a hydraulic cylinder, which is fluidly coupled to the hydraulic system of the baler 10; however, other actuators may be employed. The actuators may move the bale accumulator wings 506.1, 506.2 substantially simultaneously to deposit the square bales upon the ground surface G, or may move the bale accumulator wings 506.1, 506.2 independently. Moreover, a single actuator may be employed to move a pivot arm coupled to a respective one of the bale accumulator wings 506.1, 506.2. Further detail regarding the depositing of a bale on a ground surface may be found in U.S. Pat. No. 9,622,420, previously incorporated herein by reference.

In one example, in order to assemble the first platen system 504, with the first plate member 120 coupled to the second plate member 122 to define the upper platen 110, the third plate member 170 is coupled to the fourth plate member 520 to define the bottom platen 514. The supports 160.1, 160.2, if employed, are coupled to the first plate member 120 and the second plate member 122. The pusher 202 is coupled to the fourth plate member 520, with the lower flange 240 disposed within and partially below the slot 536, and the upper flange 242 is coupled to the lower flange 240 to contact a received round bale B. The pusher hydraulic actuator 241 is coupled to the lower flange 240. The upper platen 110 is coupled to the bottom platen 514 at the hinge 130, and the actuator 116 is coupled to the third plate member 170 and the first plate member 120 to enable movement of the upper platen 110 between the first position and the second position. It should be noted that while the upper platen 110 is described herein as being coupled to the bottom platen 514 via the hinge 130, the upper platen 110 may be coupled to the bottom platen 514 via a pivot pin or other device that enables the upper platen 110 to pivot relative to the bottom platen 514.

With the first platen system 102 assembled, the first platen system 504 is coupled to the transfer table 502 once the transfer table 502 is assembled. In certain embodiments, the transfer table 502 is pivotally coupled to the baler 10, and the actuator 510 is coupled between the transfer table 502 and a frame of the baler 10. The bale accumulator wings 506.1, 506.2 are coupled to a respective one of the first plate side 524 and the second plate side 526. The respective pivot arms and actuators are coupled to the respective one of the bale accumulator wings 506.1, 506.2 and to the support structure 502.2. The respective actuators 116, 510, 241 and actuators associated with the bale accumulator wings 506.1, 506.2 are each coupled to the hydraulic system of the baler 10 so as to be fluidly coupled to the hydraulic supply of the tractor 12.

Once the round bale B is formed in the bale forming chamber 22 of the baler 10, the discharge gate 26 moves to the open discharge position to release the formed round bale B. The formed round bale B contacts the transfer table 502 and the transfer table 502 is actuated by the actuator 510 to pivot to the second position. As the transfer table 502 moves to the second position, the round bale B is received within the first platen system 504. Once the round bale B is received within the first platen system 504, the transfer table 502 is moved from the second position to the first position.

With the upper platen 110 of the first platen system 504 in the first position, the actuator 116 of the first platen system 504 is actuated, based on hydraulic fluid received from the hydraulic supply of the tractor 12 through the hydraulic system of the baler 10, for example. The actuation of the actuator 116 rotates the upper platen 110 toward the bottom platen 514 to recompress the round bale B. The actuator 116 continues to rotate the upper platen 110 toward the bottom platen 514 such that the upper fingers 144 interleave with the lower fingers 152 (like that shown in FIG. 8) to recompress the round bale B into a square bale. The banding unit 114 of each of the first platen system 102 and the second platen system 104 may be activated to apply wrap material to the square bale. The wrap material 198 passes through the first banding channels 132, the second banding channels 154, the third banding channels 180 and the fourth banding channels 190 to surround the square bale.

With the square bale formed and wrapped, the upper platen 110 is rotated from the second position to the first position, and once in the first position, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into one of the bale accumulator wings 506.1, 506.2.

With a first square bale formed, the discharge gate 26 may move to the open discharge position to release a second round bale. Once the second round bale is received on the transfer table 502, the transfer table 502 is actuated by the actuator 510 to pivot to the second position. As the transfer table 502 moves to the second position, the second round bale B is received within the first platen system 504. Once the second round bale B is received within the first platen system 504, the transfer table 502 is moved from the second position to the first position.

With the upper platen 110 of the first platen system 504 in the first position, the actuator 116 of the first platen system 504 is actuated, based on hydraulic fluid received from the hydraulic supply of the tractor 12 through the hydraulic system of the baler 10, for example. The actuation of the actuator 116 rotates the upper platen 110 toward the bottom platen 514 to recompress the second round bale B. The actuator 116 continues to rotate the upper platen 110 toward the bottom platen 514 such that the upper fingers 144 interleave with the lower fingers 152 (like that shown in FIG. 8) to recompress the second round bale B into a second square bale. The banding unit 114 of each of the first platen system 102 and the second platen system 104 may be activated to apply wrap material to the second square bale. The wrap material 198 passes through the first banding channels 132, the second banding channels 154, the third banding channels 180 and the fourth banding channels 190 to surround the second square bale.

With the second square bale formed, the upper platen 110 is rotated from the second position to the first position, and once in the first position, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the second square bale into the other of the bale accumulator wings 506.1, 506.2.

With the upper platen 110 of the first platen system 102 in the first position, the actuators (not shown) associated with the bale accumulator wings 506.1, 506.2 may be actuated, based on hydraulic fluid received from the hydraulic supply of the tractor 12 through the hydraulic system of the baler 10, for example. The actuation of these actuators moves the respective pivot arms, and thus, the respective bale accumulator wings 506.1, 506.2 to deposit the square bales SB, SB.1 on a virtual trip line. As the depositing of the bales on a virtual trip line is known from commonly assigned U.S. Pat. No. 9,578,811 to Kraus et al., titled "Variable Rate Discharge System for Crop Accumulator," which was previously incorporated herein by reference, the depositing of the square bales SB, SB.1 will not be discussed in detail herein.

Alternatively, in certain embodiments, when the bale accumulator wings 506.1, 506.2 are not employed, the pusher 202 may be actuated to eject the square bale from the fourth plate member 520 of the first platen system 504.

It should be noted that while the bale recompression system 100 is described herein as including the first platen system 102 and the second platen system 104, it should be understood that the bale recompression system 100 may be configured in a variety of ways. For example, with reference to FIG. 17, a bale recompression system 600 is shown. As the bale recompression system 600 is similar to the bale recompression system 100 discussed with regard to FIGS. 1-12 and the bale recompression system 500 discussed with regard to FIG. 16, the same reference numerals will be used to denote the same or substantially similar components. The bale recompression system 600 includes the transfer table 502, a first platen system 602 and a bale accumulator 604. In various embodiments, the bale recompression system 600 also includes an accumulator control system 606, as will be discussed with regard to FIGS. 28-32.

The bale recompression system 600 is coupled to the baler 10 for movement with the baler 10 as the baler 10 is towed by the tractor 12. As will be discussed, the bale recompression system 600 receives the round bale B that is discharged by the discharge gate 26, and recompresses the round bale B into a square bale. In this example, the first platen system 602 is towed substantially directly behind the tractor 12, and the transfer table 502 guides the round bale B from the discharge gate 26 of the baler 10 into the first platen system 602.

The transfer table 502 interconnects the baler 10 and the first platen system 602. As discussed, the transfer table 502 is substantially planar and is coupled to the baler 10 so as to be in a position for the round bale B to be dropped on a surface 502.1 of the transfer table 502 when the discharge gate 26 opens. The transfer table 502 tilts and/or lifts the round bale B in a generally aft direction to move the round bale B in the direction 512 onto the first platen system 602. The transfer table 502 is movable about a pivot axis PT defined by a pivot pin 502.3 between the first position (in which the transfer table 502 is substantially parallel to a ground surface G) and the second position (in which the transfer table 502 is pivoted in the aft direction) by the actuator 510.

Figure 18:
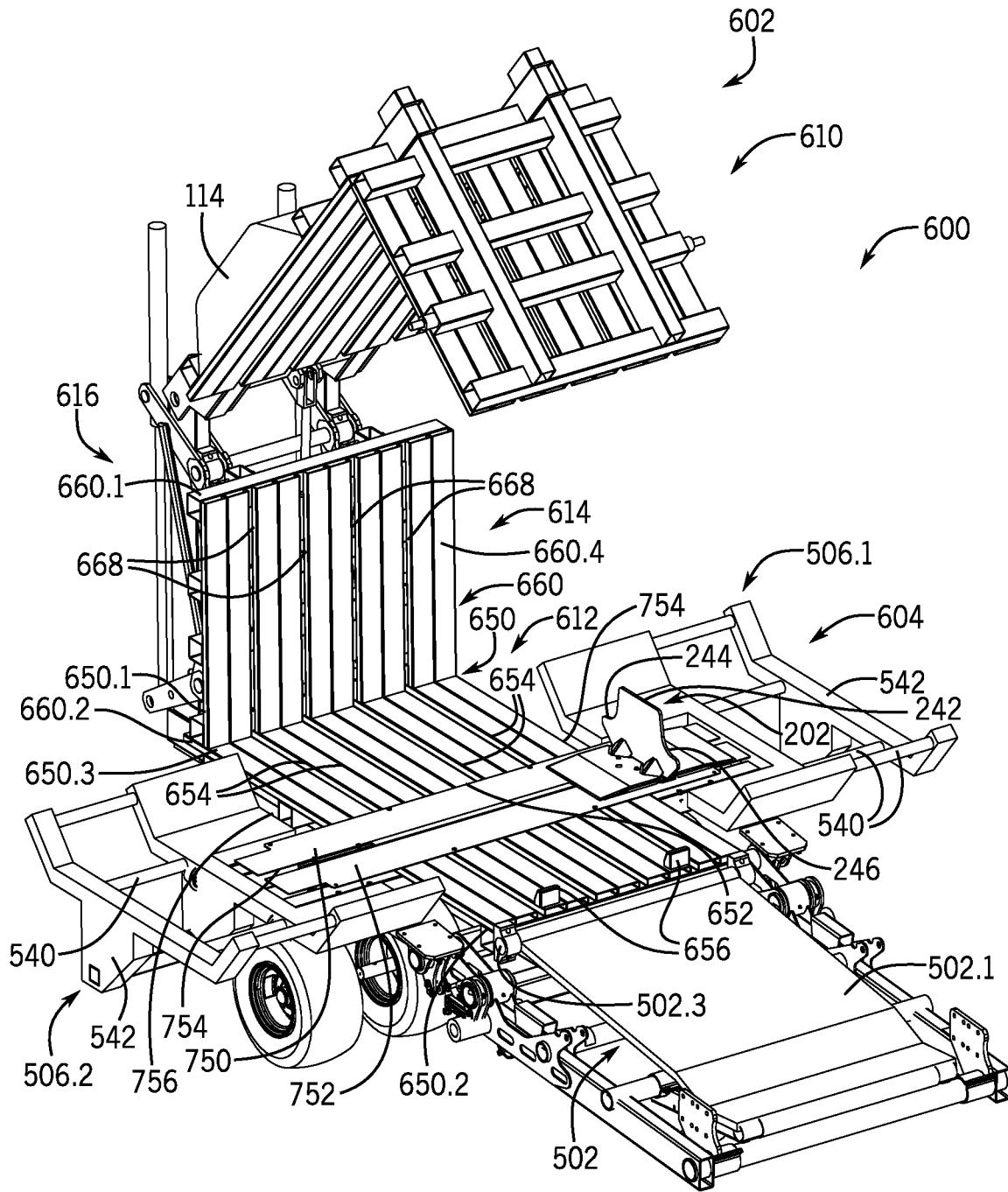
FIG. 18 is a front perspective view of the bale recompression system of FIG. 17.
Figure 25:
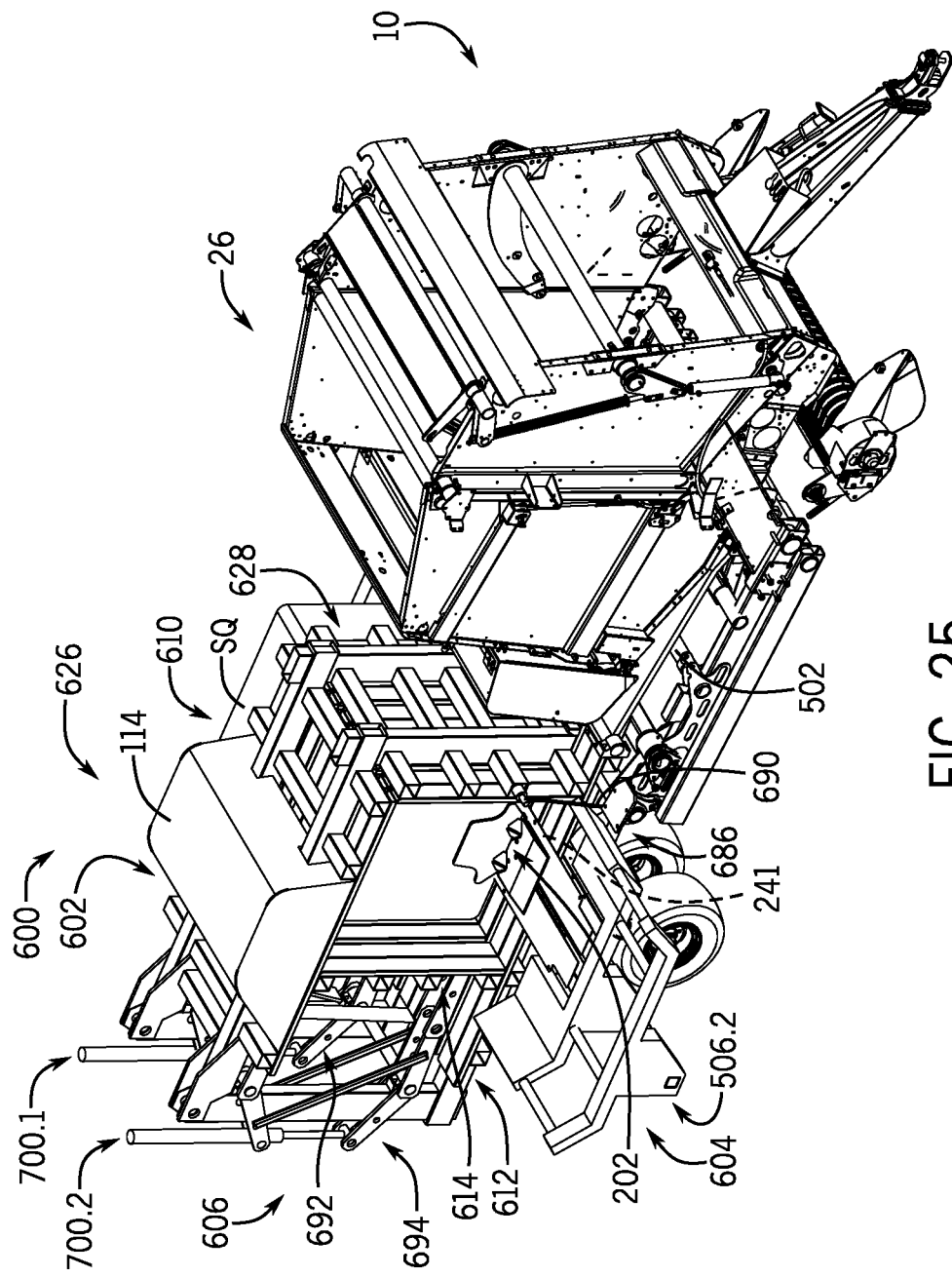
FIG. 25 is a front perspective view of bale recompression system of FIG. 17, in a pusher of a bale accumulator has been actuated to remove the square bale from the bale recompression system.

The first platen system 602 includes a frame 608, a first, upper platen 610, a second, bottom platen 612, a third, movable platen 614, the banding unit 114 and an actuation system 616. The banding unit 114 is shown in FIGS. 18 and 25, and is not shown in the remaining figures of the bale recompression system 600 for clarity. In addition, it will be noted that the position of the banding unit 114 illustrated in FIGS. 18 and 25 is merely an example, as generally, the banding unit 114 may be coupled to or disposed in proximity to at least one of the upper platen 610 and the bottom platen 612 to dispense the wrap material 198 about a square bale SQ. As will be discussed, the actuation system 616 is operable to move the upper platen 610 and the movable platen 614 to recompress the round bale B into the square bale SQ. The first platen system 602 is supported on the frame 608, which may include one or more ground wheels 618, a plurality of interconnecting frame members 620 and a pair of vertical support beams 622. The interconnecting frame members 620 and the pair of vertical support beams 622 may be composed of a metal or metal alloy, and formed via casting, forging, stamping, etc. The plurality of interconnecting frame members 620 forms a support structure or platform for the bottom platen 612, the bale accumulator 604 and the actuation system 616. A second end 620.2 of the support structure formed by the interconnecting frame members 620 may be coupled to or may form part of the support structure 502.2 for the transfer table 502.

In one example, the pair of vertical support beams 622 each extend upwardly from a first end 620.1 of the support structure formed by the interconnecting frame members 620. The pair of vertical support beams 622 are each spaced apart from each other along the first end 620.1. The pair of vertical support beams 622 are each coupled to the upper platen 610, the movable platen 614 and the actuation system 616. The vertical support beams 622 each define a bore 621 at a first end 622.1 that cooperate with the upper platen 610 to pivotally couple the upper platen 610 to the vertical support beams 622. The first end 622.1 is opposite a second end 622.2, and the first end 622.1 is coupled to the upper platen 610 and the second end 622.2 is coupled to the second end 620.1 of the frame 608.

Generally, the upper platen 610 is rotatably coupled to the vertical support beams 622, and is rotatable by the actuation system 616 between a first position in which the upper platen 610 is spaced apart from the bottom platen 612 to define an opening 623 for receiving the round bale B from the transfer table 502; and a second position, in which the upper platen 610 cooperates with the bottom platen 612 and the movable platen 614 to recompress the round bale B into a square bale. The bottom platen 612 remains stationary during the recompression of the round bales B.

In one example, the upper platen 610 includes a first plate member 626 and a second plate member 628. The first plate member 626 and the second plate member 628 may be composed of a metal or metal alloy, and formed via casting, forging, stamping, etc. The first plate member 626 and the second plate member 628 may be integrally formed, or may be discretely formed and coupled together via a suitable technique, such as welding, mechanical fasteners, etc. The first plate member 626 and the second plate member 628 may include one or more cross-beams 630 and vertical reinforcement beams 632 to provide structural rigidity to the respective first plate member 626 and the second plate member 628. In one example, one of the cross-beams 630 includes a coupler 631 for coupling the second plate member 628 to the actuation system 616. In this example, the coupler 631 is an eye bolt; however, any coupler may be employed. Generally, the coupler 631 is coupled to one of the cross-beams 630 of the second plate member 628; however, the coupler 631 may be coupled to one of the cross-beams 630 of the first plate member 626, or may be coupled directly to one of the first plate member 626 and the second plate member 628.

The first plate member 626 is rotatably coupled to the vertical support beams 622. The first plate member 626 is substantially planar and includes a first plate end 634 opposite a second plate end 636. The first plate end 634 includes a pair of first hinge brackets 638 and a pair of second hinge brackets 640. The pair of first hinge brackets 638 is coupled to a first side 626.1 of the first plate member 626, and the pair of second hinge brackets 640 is coupled to a first side 626.2 of the first plate member 626. The pair of first hinge brackets 638 and the pair of second hinge brackets 640 extend from the first plate member 626 to pivotally couple the first plate member 626 to the vertical support beams 622. In one example, the pair of first hinge brackets 638 and the pair of second hinge brackets 640 each include a bore 642, which is defined along a pivot axis P6. A pivot pin 644 is received through the bores 642 of the pair of first hinge brackets 638 and the bore 621 of one of the vertical support beams 622; and a pivot pin 644 is received through the bores 642 of the pair of second hinge bracket 640 and the bore 621 of one of the vertical support beams 622. The pivot pins 644 enable the upper platen 610 to rotate relative to the vertical support beams 622, and thus, the movable platen 614 and the bottom platen 612. The first plate member 626 also includes the plurality of first banding channels 132, which are defined through the first plate member 626 from the first plate end 634 to the second plate end 636. The second plate end 636 is coupled to the second plate member 628.

The second plate member 628 cooperates with the bottom platen 612 to secure the bale within the first platen system 602 during recompression. The second plate member 628 is substantially planar and includes a third plate end 646 opposite a fourth plate end 648. The third plate end 646 is coupled to the first plate member 626, and the fourth plate end 648 contacts a portion of the bottom platen 612 when the upper platen 610 is in the second position. The second plate member 628 includes the plurality of second banding channels 154, which are defined through the second plate member 628 from the third plate end 646 to the fourth plate end 648. While not illustrated herein, the one or more support plates 160 may be coupled to the first plate member 626 and the second plate member 628, if desired.

The bottom platen 612 includes a plate member 650. The plate member 650 may be composed of a metal or metal alloy, and formed via casting, forging, stamping, etc. In one example, with reference to FIG. 18, the plate member 650 is substantially planar, and includes a first end 650.1 opposite a second end 650.2 and a channel 652. The first end 650.1 is coupled to the frame 608 near or adjacent to the first end 620.1 of the support structure formed by the interconnecting frame members 620. The second end 650.2 is coupled to the frame 608 at the second end 620.2 of the support structure formed by the interconnecting frame members 620. The channel 652 is defined between the first end 650.1 and the second end 650.2. The channel 652 receives a portion of the bale accumulator 604 to couple the bale accumulator 604 to the bottom platen 514. Alternatively, the plate member 650 may be composed of multiple pieces, which are coupled together on either side of the bale accumulator 604.

The plate member 650 also includes a plurality of banding channels 654 and one or more retaining projections 656. The plurality of banding channels 654 are defined through the plate member 650 from the first end 650.1 to the second end 650.2. The plurality of banding channels 654 are defined through the plate member 650 and cooperate with the banding unit 114 to band the square bale after recompression. Each of the plurality of banding channels 654 are generally spaced apart from each other along the plate member 650. The one or more retaining projections 656 extend upwardly and outwardly from the plate member 650. In one example, the one or more retaining projections 656 are substantially triangular in shape; however, the one or more retaining projections 656 may have any desired shape. The one or more retaining projections 656 contact the fourth plate end 648 of the second plate member 628 in the second position and aid in preventing the movement of the second plate member 628 toward the transfer table 502.

Figure 17:
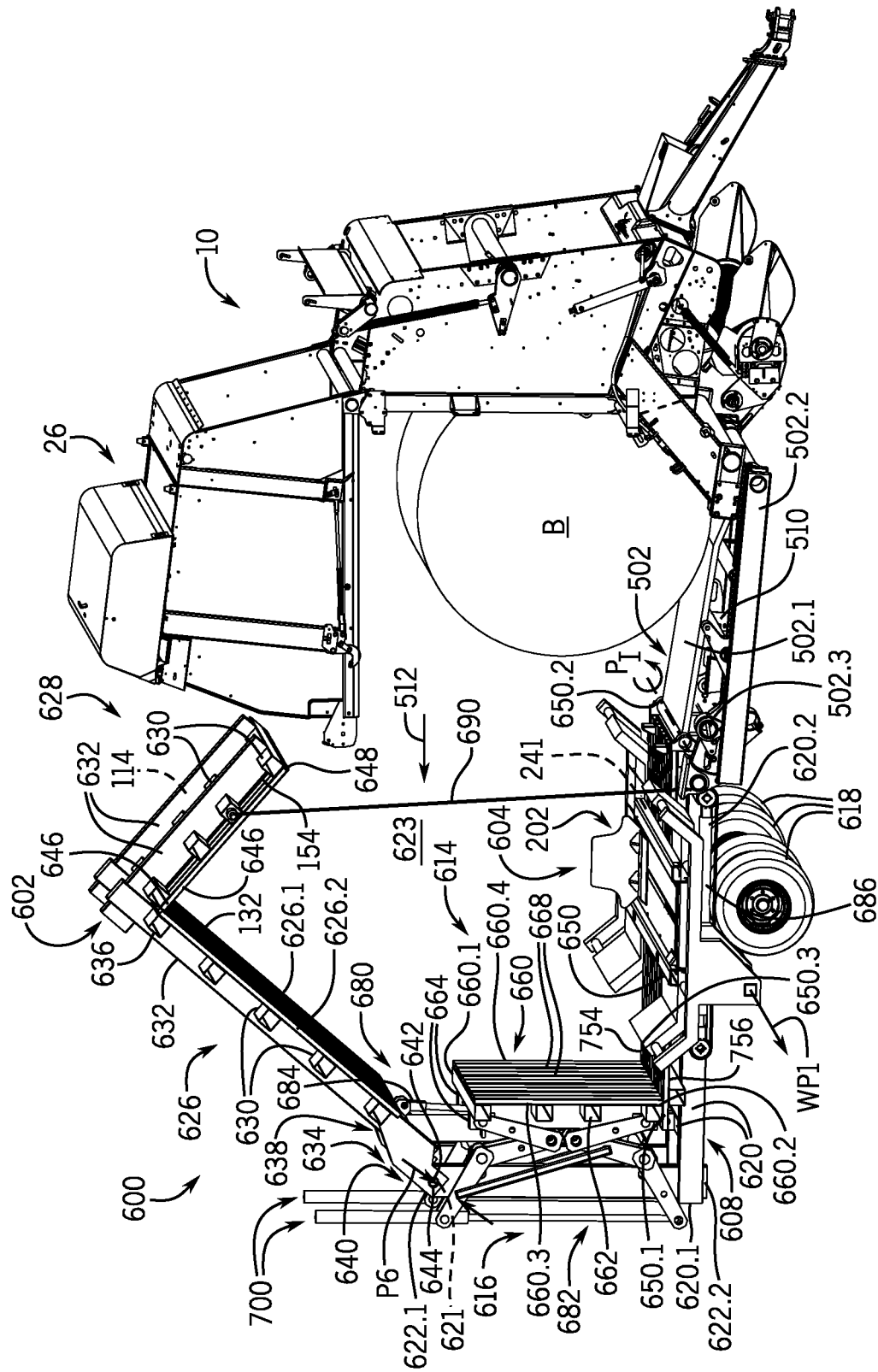
FIG. 17 is a side perspective view of an example crop-packaging device, such as a baler, having a bale recompression system according to various embodiments of this disclosure.
Figure 24:
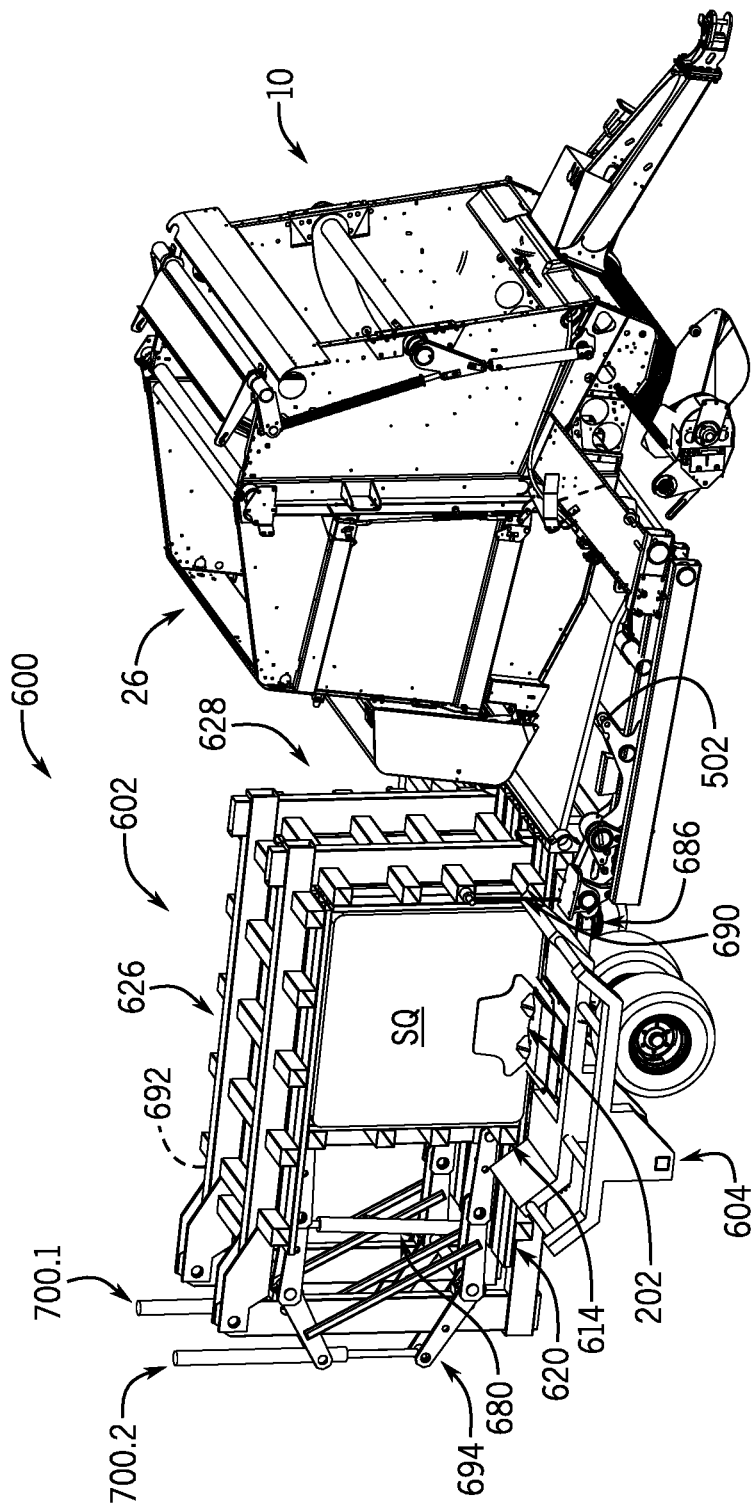
FIG. 24 is a front perspective view of bale recompression system of FIG. 17, in which the upper platen has been rotated from the first position to a second position, and the movable platen has been moved from the first position to the second position to recompress the round bale into a square bale.

With reference to FIG. 17, the movable platen 614 is movable by the actuation system 616 to cooperate with the upper platen 610 to recompress the round bale B. Generally, the movable platen 614 is movable between a first position, in which the movable platen 614 is next to or adjacent to the first end 650.1 of the bottom platen 612 (FIG. 17), and a second position, in which the movable platen 614 is next to or adjacent to the channel 652 defined in the plate member 650 to recompress the round bale B (FIG. 24). The movable platen 614 is substantially perpendicular to the bottom platen 612 and moves in a direction substantially parallel to a surface of the plate member 650. The movable platen 614 includes a movable plate member 660, one or more cross-beams 662 and a pair of vertical support beams 664. The movable plate member 660, the cross-beams 662 and the vertical support beams 664 may be composed of a metal or metal alloy, and formed via casting, forging, stamping, etc.

The movable plate member 660 is substantially planar, and includes a first end 660.1 opposite a second end 660.2 and a plurality of banding channels 668. The first end 660.1 contacts the first plate end 634 of the first plate member 626 when the upper platen 610 is in the first position, and the second end 660.2 is slidable along a surface 650.3 of the plate member 650. The plurality of banding channels 668 are defined through the movable plate member 660 from the first end 660.1 to the second end 660.2. The plurality of banding channels 668 are defined through the movable plate member 660 and cooperate with the banding unit 114 to band the square bale after recompression. Each of the plurality of banding channels 668 are generally spaced apart from each other along the movable plate member 660.

Figure 19:
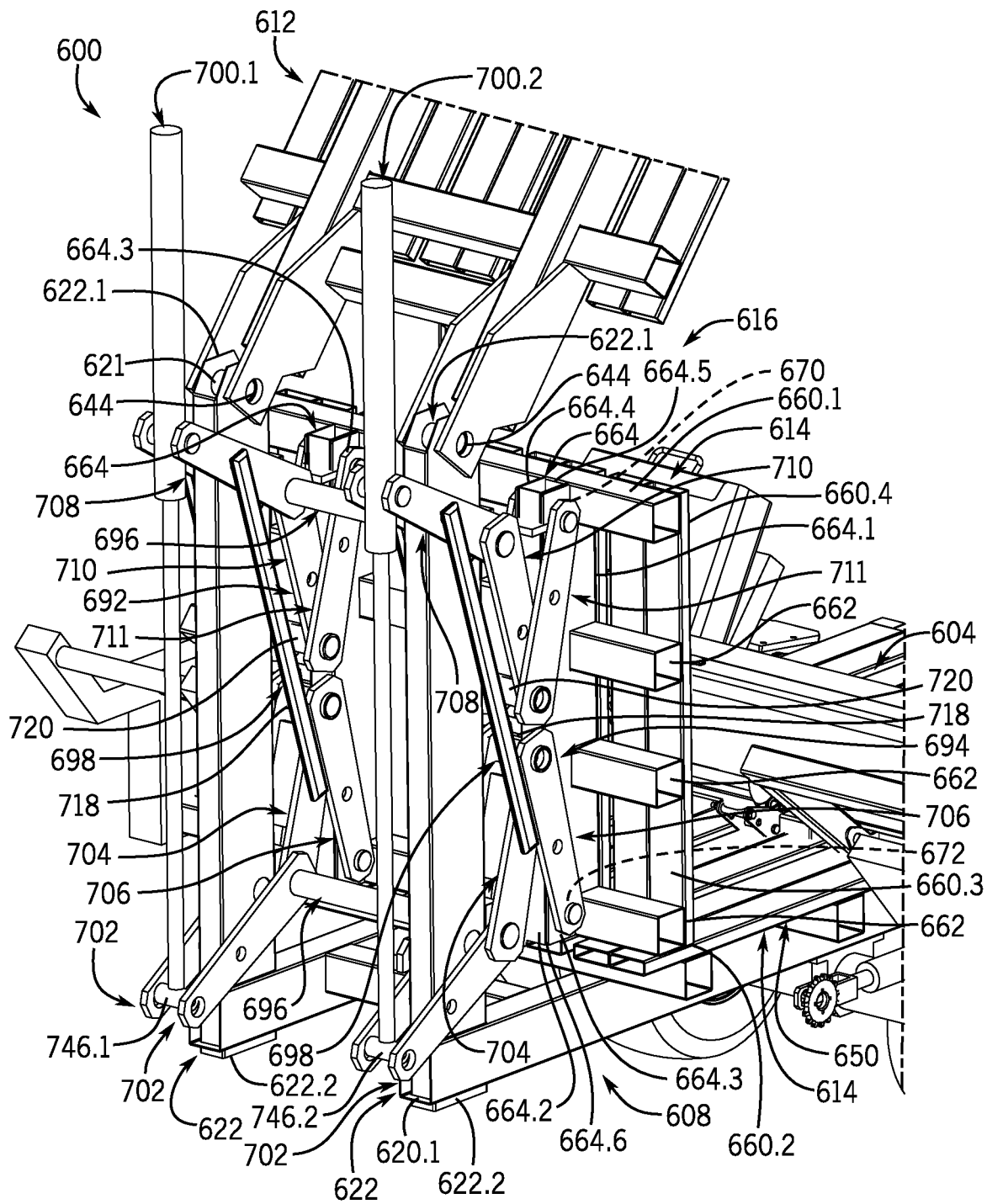
FIG. 19 is a rear perspective view of a portion of an actuation system for the bale recompression system of FIG. 17.

The cross-beams 662 and the vertical support beams 664 are coupled to a first side 660.3 of the movable plate member 660, which is opposite a second side 660.4 that contacts the round bale B during recompression. With reference to FIG. 19, a detail view of the first side 660.3 of the movable plate member 660 is shown. In this example, the movable platen 614 includes four cross-beams 662 coupled to the first side 660.3 of the movable plate member 660, but it should be understood that the movable plate member 660 may include any number of cross-beams 662. The cross-beams 662 provide structural rigidity and reinforcement to the movable plate member 660.

The vertical support beams 664 are coupled to the first side 660.3, and couple the movable platen 614 to the actuation system 616. Generally, the vertical support beams 664 extend along the first side 660.3 of the movable plate member 660 from the first end 660.1 to the second end 660.2. In one example, each of the vertical support beams 664 define a plurality of cut-outs on a first beam side 664.1, such that the first beam side 664.1 is coupled to the first side 660.3 over each of the plurality of cross-beams 662. Each of the vertical support beams 664 also include a second side 664.2 opposite the first side 664.1, and a third side 664.3 opposite a fourth side 664.4. The third side 664.3 and the fourth side 664.4 are coupled to the actuation system 616. In one example, a first bore 670 is defined through each of the vertical support beams 664 from the third side 664.3 to the fourth side 664.4 at a first end 664.5 of the vertical support beams 664. A second bore 672 is defined through each of the vertical support beams 664 from the third side 664.3 to the fourth side 664.4 at a second end 664.6 of the vertical support beams 664. The first bore 670 and the second bore 672 couple the movable platen 614 to the actuation system 616.

With reference to FIG. 17, the actuation system 616 is shown in greater detail. In one example, the actuation system 616 includes an upper platen actuation system 680 and a movable platen actuation system 682. The upper platen actuation system 680 is operable to move the upper platen 610 between the first position and the second position, while the movable platen actuation system 682 is operable to move the movable platen 614 between the first position and the second position. In one example, the upper platen actuation system 680 includes a first, lift actuator 684 and one or more second, pull actuators 686. The lift actuator 684 moves the upper platen 610 to the first position, and the pull actuators 686 move the upper platen 610 to the second position.

Figure 20:
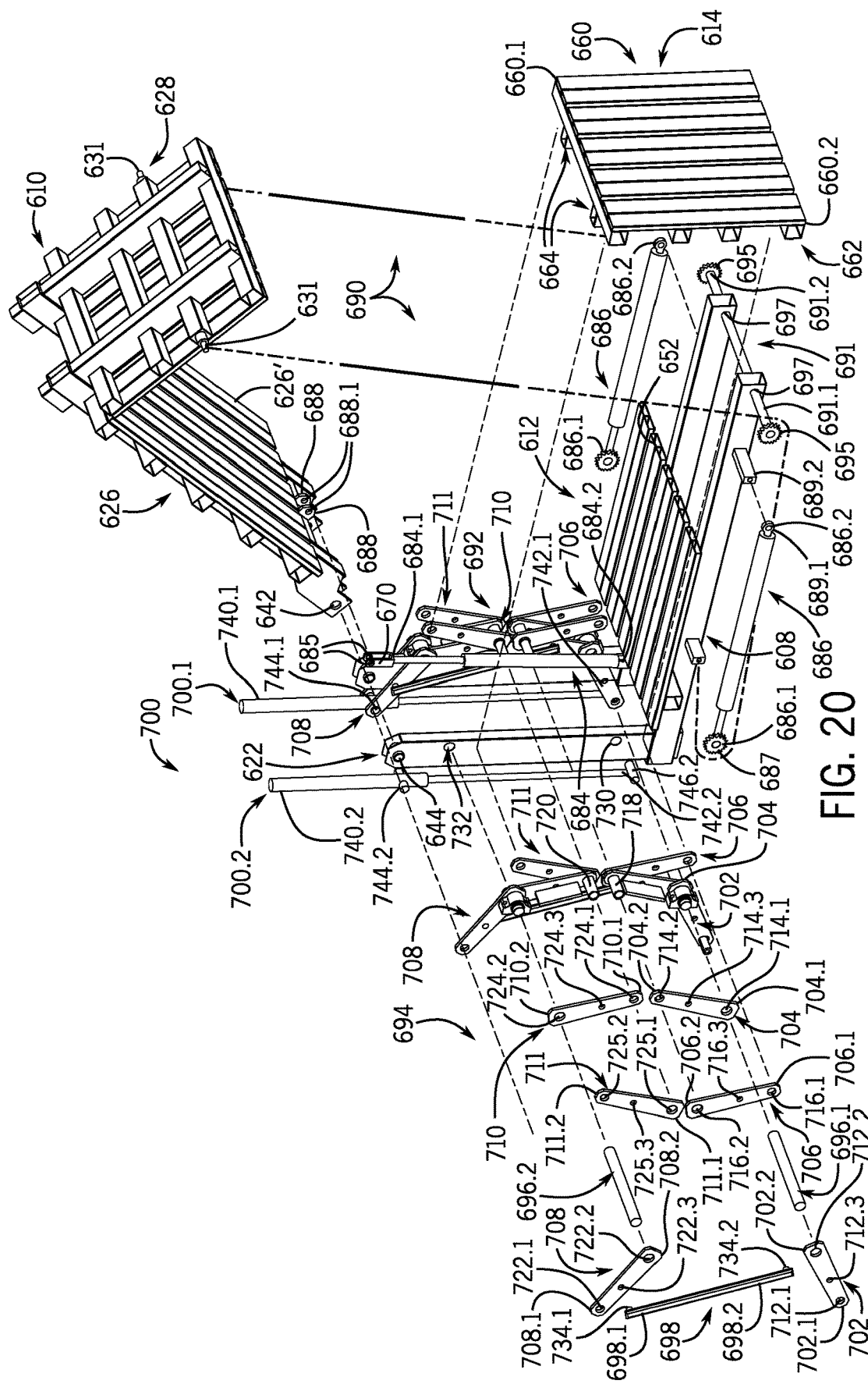
FIG. 20 is a partially exploded view of the portion of the actuation system of FIG. 18.

With reference to FIG. 20, the lift actuator 684 is coupled to the upper platen 610. In one example, the lift actuator 684 includes a first end 684.1 and an opposite second end 684.2. The first end 684.1 is coupled to the upper platen 610. In this example, the first end 684.1 is substantially U-shaped, and defines a pair of coaxially aligned bores 685. The first end 684.1 is coupled to the upper platen 610 via a pair of mounting flanges 688. The pair of mounting flanges 688 generally extends from the surface 626.1 of the first plate member 626. The pair of mounting flanges 688 each defines a bore 688.1, and a pin is received through the bores 688.1 and the pair of coaxially aligned bores 685 to couple the first end 684.1 to the pair of mounting flanges 688. The second end 684.2 is coupled to the frame 608.

In this example, the lift actuator 684 is a hydraulic cylinder, which is in fluid communication with the hydraulic system of the baler 10. It should be noted that while the upper platen actuation system 680 is shown and described as including a single lift actuator 684, the upper platen actuation system 680 may include any number of lift actuators 684. In one example, the lift actuator 684 may include one or more hydraulic lines that connect the lift actuator 684 with the hydraulic supply associated with the tractor 12. One or more electro-hydraulic control valves of the hydraulic system of the baler 10 may be in fluid communication with the lift actuator 684 and electrically activated according to signals from the ECU to control the flow of hydraulic fluid between the hydraulic supply associated with the tractor 12 and the lift actuator 684. The lift actuator 684 is responsive to hydraulic fluid received from the tractor 12 to move or rotate the upper platen 610 relative to the bottom platen 612. Upon receipt of the hydraulic fluid, the lift actuator 684 extends, thereby rotating the upper platen 610 relative to the bottom platen 612 and moving the upper platen 610 from the second position to the first position.

The pull actuators 686 are coupled to the bottom platen 612. In one example, the pull actuators 686 each include a first end 686.1 and an opposite second end 686.2. The first end 686.1 is coupled to a respective coupling member 690. In one example, the first end 686.1 includes a sprocket 687 to couple the first end 686.1 to the respective coupling member 690. Generally, the sprocket 687 is movably coupled to the first end 686.1, via a pin, for example. In this example, the sprocket 687 is a chain sprocket and the coupling member 690 is a roller chain. It should be noted, however, that the coupling member 690 may comprise a rope, twine, cable, etc., which may be coupled to the first end 686.1 via any suitable technique, and thus, the first end 686.1 may include any compatible device for cooperating with a selected coupling member 690. The second end 686.2 of each of the pull actuators 686 is coupled to the frame 608. In one example, the second end 686.2 of each of the pull actuators 686 is coupled to the frame 608 via a pin 698.1 that is received within a post 689.2 coupled to the frame 608, however, any suitable technique may be used to couple the second end 686.2 of each of the pull actuators 686 to the frame 608.

In addition, in this example, the frame 608 may include a cross-shaft assembly 691. In one example, the cross-shaft assembly 691 includes a shaft 693 and a pair of sprockets 695. The shaft 693 is received through a bore 697 defined in two or more of the interconnecting frame members 620. The shaft 693 generally extends along an axis that is substantially perpendicular to the direction of forward travel of the tractor 12 so as to interconnect the coupling members 690 on each side of the upper platen 610. The shaft 693 may be composed of metal or metal alloy, and may be stamped, rolled, forged, cast, etc. The shaft 693 may be a solid rod, or may be a hollow tubular structure. A first end 693.1 of the shaft 693 includes a first one of the pair of sprockets 695, and an opposite, second end 693.2 of the shaft 693 includes a second one of the pair of sprockets 695.

Each of the pair of sprockets 695 is movably coupled to the respective end 693.1, 693.2 of the shaft 693, via a pin, for example, to guide the respective one of the coupling members 690 during a movement of the upper platen 610. It should be noted, however, that the ends 693.1, 693.2 of the shaft 693 may include a guide or other feature that directs the coupling member 690 along the respective one of the pull actuators 686 from the second end 686.2 to the first end 686.1. Generally, the cross-shaft assembly 691 ensures that the coupling members 690 are substantially synchronized during the movement of the upper platen 610 between the first position and the second position and thereby inhibit the upper platen 610 from twisting as the upper platen 610 moves between the first position and the second position. Further, the cross-shaft assembly 691 enables the pull actuators 686 to share the load involved in moving the upper platen 610 from the first position to the second position. For example, in an instance where the round bale is cone-shaped, such that one of the pull actuators 686 encounters a greater load than the other, the cross-shaft assembly 691 enables the load to be shared between each of the pull actuators 686.

In this example, each of the pull actuators 686 is a hydraulic cylinder, which is in fluid communication with the hydraulic system of the baler 10. It should be noted that while the upper platen actuation system 680 is shown and described as including two pull actuators 686, the upper platen actuation system 680 may include any number of pull actuators 686. In one example, the pull actuators 686 may each include one or more hydraulic lines that connect the respective pull actuator 686 with the hydraulic supply associated with the tractor 12. One or more electro-hydraulic control valves of the hydraulic system of the baler 10 may be in fluid communication with the respective pull actuator 686 and electrically activated according to signals from the ECU to control the flow of hydraulic fluid between the hydraulic supply associated with the tractor 12 and the respective pull actuator 686. Each of the pull actuators 686 is responsive to hydraulic fluid received from the tractor 12 to move or rotate the upper platen 610 relative to the bottom platen 612. Upon receipt of the hydraulic fluid, each of the pull actuators 686 extends, thereby pulling the coupling members 690 to rotate the upper platen 610 relative to the bottom platen 612 and moving the upper platen 610 from the first position to the second position. Once the hydraulic fluid is released from each of the pull actuators 686, the first end 686.1 retracts towards the second end 686.2, resulting in slack in the coupling members 690. The slack on the coupling members 690 enables the lift actuator 684 to move the upper platen 610 from the second position to the first position.

With reference to FIG. 19, the movable platen actuation system 682 includes a first scissors linkage 692, a second scissors linkage 694, a pair of cross-members 696, one or more connector links 698 and one or more actuators 700. The scissors linkages 692, 694 are configured to impart translation movement to the movable platen 614 and may effect such translation with any type of input actuation, including translation and pivotal input force. In the illustrated example, the first linkage 692 and the second linkage 694 are scissor linkages, in particular, split scissor linkages in which an upper linkage of each scissors linkage 692, 694 has a pivot point that is movable (e.g., vertically separable) with respect to a pivot point of a lower linkage of each scissors linkage 692, 694. As the first linkage 692 is the same as the second linkage 694, for ease of description, the second linkage 694 will be described in detail herein, with the same reference numerals used to denote the same features of the first linkage 692. Also for simplicity, the scissors linkages 692, 694 will be referred to below as first and second linkages 692, 694. In one example, with reference to FIG. 20, the second linkage 694 includes a pair of first links 702, a pair of second links 704, a pair of third links 706, a pair of fourth links 708, a pair of fifth links 710 and a pair of sixth links 711. The first links 702, the second links 704, the third links 706, the fourth links 708, the fifth links 710 and the sixth links 711 may be composed of a metal or metal alloy, and formed via casting, forging, stamping, etc.

Each of the first links 702 has a first end 702.1 opposite a second end 702.2 and a plurality of bores 712 defined between the first end 702.1 and the second end 702.2. A first bore 712.1 is defined through each of the first links 702 at the first end 702.1, a second bore 712.2 is defined through each of the first links 702 at the second end 702.2 and a third bore 712.3 is defined through each of the first links 702 between the first bore 712.1 and the second bore 712.2. The first bore 712.1 couples the first links 702 to the actuator 700, and the second bore 712.2 couples the first links 702 to the second links 706. The third bore 712.3 couples the first links 702 to the vertical support beam 622. For example, a pin, bolt or other mechanical fastener is received through the first bore 712.3 to couple the first links 702 to the vertical support beam 622, thus forming a first pair of laterally spaced apart pivotal mounting locations for the first links 702 to the movable platen 614, one for each of the first linkage 692 and the second linkage 694.

Each of the second links 704 has a first end 704.1 opposite a second end 704.2 and a plurality of bores 714 defined between the first end 704.1 and the second end 704.2. A first bore 714.1 is defined through each of the second links 704 at the first end 704.1, a second bore 714.2 is defined through each of the second links 704 at the second end 704.2 and a third bore 714.3 is defined through each of the second links 704 between the first bore 714.1 and the second bore 714.2. The first bore 714.1 couples the second links 704 to one of the cross-members 696 and to the first links 702, and the second bore 714.2 couples the second links 704 to the third links 706. The third bore 714.3 is couples the second links 704 to one of the connector links 698.

Each of the pair of third links 706 has a first end 706.1 opposite a second end 706.2 and a plurality of bores 716 defined between the first end 706.1 and the second end 706.2. A first bore 716.1 is defined through each of the third links 706 at the first end 706.1, a second bore 716.2 is defined through each of the third links 706 at the second end 706.2 and a third bore 716.3 is defined through each of the third links 706 between the first bore 716.1 and the second bore 716.2. The first bore 716.1 couples the third links 706 to second link 704. In one example, a rod 718 is received within the first bore 716.1 of the third links 706 and the second bore 714.2 of the second links 704 to couple the second links 704 to the third links 706. The second bore 716.2 couples the third links 706 to the movable platen 614. In one example, a pin is received through the second bores 716.2 and the second bore 762 defined in the movable platen 614 to couple the movable platen 614 to the third links 706 near or adjacent to the second end 660.2 of the movable platen 614. The third bore 712.3 is optional.

Each of the fourth links 708 has a first end 708.1 opposite a second end 708.2 and a plurality of bores 722 defined between the first end 708.1 and the second end 708.2. A first bore 722.1 is defined through each of the fourth links 708 at the first end 708.1, a second bore 722.2 is defined through each of the fourth links 708 at the second end 708.2 and a third bore 722.3 is defined through each of the fourth links 708 between the first bore 722.1 and the second bore 722.2. The first bore 722.1 couples the fourth links 708 to the actuator 700, and the second bore 722.2 couples the fourth links 708 to the fifth links 710 and to one of the cross-members 696. The third bore 722.3 couples the fourth links 708 to one of the connector links 698.

Each of the fifth links 710 has a first end 710.1 opposite a second end 710.2 and a plurality of bores 724 defined between the first end 710.1 and the second end 710.2. A first bore 724.1 is defined through each of the fifth links 710 at the first end 710.1, a second bore 724.2 is defined through each of the fifth links 710 at the second end 710.2 and a third bore 724.3 is defined through each of the fifth links 710 between the first bore 724.1 and the second bore 724.2. The first bore 724.1 couples the fifth links 710 to one of the cross-members 696 and to the fourth links 708, and the second bore 724.2 couples the fifth links 710 to the sixth links 711. The third bore 724.3 is optional.

Each of the pair of sixth links 711 has a first end 711.1 opposite a second end 711.2 and a plurality of bores 725 defined between the first end 706.1 and the second end 711.2. A first bore 725.1 is defined through each of the sixth links 711 at the first end 711.1, a second bore 725.2 is defined through each of the sixth links 711 at the second end 725.2 and a third bore 725.3 is defined through each of the sixth links 711 between the first bore 725.1 and the second bore 725.2. The first bore 725.1 couples the sixth links 711 to fifth links 710. In one example, a rod 720 is received within the first bore 725.1 of the sixth links 711 and the second bore 724.2 of the fifth links 710 to couple the sixth links 711 to the fifth links 710. The second bore 725.2 couples the sixth links 711 to the movable platen 614. In one example, a pin is received through the second bores 725.2 and the first bore 670 defined in the movable platen 614 to couple the movable platen 614 to the sixth links 711 near or adjacent to the first end 660.1 of the movable platen 614 thus forming a second pair of laterally spaced apart pivotal mounting locations for the sixth links 711 to the movable platen 614, one for each of the first linkage 692 and the second linkage 694. The pivotal mounting locations are at fixed locations relative to the movable platen 614. The second pair of pivotal mounting locations is spaced apart from the first pair of pivotal mounting locations to be at different heights, such as the upper and lower areas of the movable platen 614 (e.g., at or near upper and lower ones of the cross-beams 662). The third bore 725.3 is optional.

Generally, the first links 702 are fixedly coupled to the second links 704 such that the first links 702 do not move relative to the second links 704 and vice versa. It should be noted that while the first links 702 and the second links 704 are described herein as separate and discrete components, one or more of the first links 702 and the second links 704 may be integrally formed. Moreover, one or more of the first links 702, the second links 704 and the rod 718 may be coupled together via welding, for example, to ensure that the first links 702 and the second links 704 move and act as a single unit. It should be noted, however, that splined coupling or other techniques may be used to ensure that the first links 702 and the second links 704 move and act as a single unit. Generally, the third links 706 are movable or pivotable relative to the second links 704.

In addition, the fourth links 708 are fixedly coupled to the fifth links 710 such that the fourth links 708 do not move relative to the fifth links 710 and vice versa. It should be noted that while the fourth links 708 and the fifth links 710 are described herein as separate and discrete components, one or more of the fourth links 708 and the fifth links 710 may be integrally formed. Moreover, one or more of the fourth links 708, the fifth links 710 and the rod 720 may be coupled together via welding, for example, to ensure that the fourth links 708 and the fifth links 710 move and act as a single unit. It should be noted, however, that splined coupling or other techniques may be used to ensure that the fourth links 708 and the fifth links 710 move and act as a single unit. Generally, the sixth links 711 are movable or pivotable relative to the fifth links 710.

The pair of cross-members 696 each act as a torsion bar and maintain a lateral (left and right) alignment of the movable platen 614 as the movable platen 614 moves between the first position and the second position. In one example, the pair of cross-members 696 includes a first cross-member 696.1 and a second cross-member 696.2. The pair of cross-members 696 are composed of a metal or metal alloy, and formed via casting, forging, stamping, etc. In this example, the pair of cross-members 696 are each tubular; however, the pair of cross-members 696 may have any desired shape. The first cross-member 696.1 interconnects the first links 702 and second links 704. In one example, the first cross-member 696.1 is received through the second bores 712.2 of the first links 702 and the first bores 714.1 of the second links 704. The second cross-member 696.2 interconnects the fourth links 708 and the fifth links 710. In one example, the second cross-member 696.2 is received through the second bores 722.2 of the fourth links 708 and the first bores 724.1 of the fifth links 710. Each of the pair of cross-members 696 may also include a flange, cap or other device at each end to securely couple each of the pair of cross-members 696 to the respective links 702, 704, 708, 710.

The one or more connector links 698 ensure the first end 660.1 of the movable plate member 660 moves substantially simultaneously with the second end 660.2 of the movable plate member 660. Thus, the connector links 698 cooperate with the pair of cross-members 696 to ensure that the movable platen 614 moves in a uniform manner from the first position to the second position to recompress the round bale B. In one example, the connector links 698 comprise four connector links 698. Each of the connector links 698 includes a first end 698.1 opposite a second end 698.2. The first end 698.1 and the second end 698.2 each define a peg 734.1, 734.2. The pegs 734.1 of the connector links 698 are each received within the third bores 722.3 of the fourth links 708 to couple the respective connector links 698 to the fourth links 708. The pegs 734.2 of the connector links 698 are received within the third bores 714.3 of the second links 704 to couple the connector links 698 to the second links 704. Thus, generally, the connector links 698 interconnect the fourth links 708 with the second links 704 to ensure that the movement of a top of the respective linkage 692, 694 is synchronized with a movement of a bottom of the respective linkage 692, 694, thereby ensuring the first end 660.1 of the movable platen 614 moves in unison with the second end 660.2 of the movable platen 614.

The one or more actuators 700 move the movable platen 614 between the first position and the second position. The actuators 700 may be rotary or linear actuators of various types. The actuators 700 are coupled to the first links 702 and the fourth links 708. In one example, the actuators 700 include a first actuator 700.1 coupled to the first linkage 692, and a second actuator 700.2 is coupled to the second linkage 694. It should be noted that while the movable platen actuation system 682 is shown and described as including two actuators 700, the movable platen actuation system 682 may include any number of actuators 700. Each of the actuators 700 includes a first end 740.1, 740.2 and an opposite second end 742.1, 742.2. Mounting projections 744.1, 744.2 are defined near or adjacent to the first end 740.1, 740.2. The mounting projections 744.1, 744.2 extend from either side of the respective actuator 700.1, 700.2. The mounting projections 744.1 of the actuator 700.1 are coupled to the fourth links 708 of the first linkage 692 and the mounting projections 744.2 of the actuator 700.2 are coupled to the fourth links 708 of the second linkage 694. The second end 742.1, 742.2 of each of the actuators 700 includes second mounting projections 746.1, 746.2. The second mounting projections 746.1, 746.2 extend from either side of the respective actuator 700.1, 700.2. The second mounting projections 746.1 of the actuator 700.1 are coupled to the first links 702 of the first linkage 692 and the second mounting projections 746.2 of the actuator 700.2 are coupled to the first links 702 of the second linkage 694.

In this example, each of the actuators 700 is a hydraulic cylinder, and the first ends 740.1, 740.2 are cylinders and the second ends 742.1, 742.2 are pistons. The hydraulic cylinders are in fluid communication with the hydraulic system of the baler 10. In one example, the actuators 700 may each include one or more hydraulic lines that connect the respective actuator 700 with the hydraulic supply associated with the tractor 12. One or more electro-hydraulic control valves of the hydraulic system of the baler 10 may be in fluid communication with the respective actuator 700 and electrically activated according to signals from the ECU to control the flow of hydraulic fluid between the hydraulic supply associated with the tractor 12 and the respective actuator 700. Each of the actuators 700 is responsive to hydraulic fluid received from the tractor 12 to move the first linkage 692 and the second linkage 694 to move the movable platen 614 from the first position to the second position. Upon receipt of the hydraulic fluid, each of the actuators 700 retracts, thereby causing the first linkage 692 and the second linkage 694 to extend, moving the movable platen 614 from the first position to the second position. Once the hydraulic fluid is released from each of the actuators 700, the second ends 742.1, 742.2 extend towards the first ends 740.1, 740.2, resulting in the retraction of the first linkage 692 and the second linkage 694.

With reference to FIG. 18, the bale accumulator 604 is shown coupled to the bottom platen 612. The bale accumulator 604 includes the pusher 202 and the one or more optional bale accumulator wings 506. In this example, the pusher 202 is integrated into the bottom platen 612 for moving a formed square bale to either one of the optional bale accumulator wings 506, or for moving the formed square bale off either side of the plate member 650. In one example, the channel 652 of the plate member 650 is coupled to a first rail 750, a second rail 752 and a slot 754. The first rail 750 is opposite the second rail 752, and each of the rails 750, 752 extend along the plate member 650 from a first plate side 754 to a second plate side 756. Thus, in this example, the rails 750, 752 extend in a direction that is substantially perpendicular to a direction of forward travel of the tractor 12 (FIG. 1). The rails 750, 752 guide the pusher 202 as the pusher 202 moves between the first plate side 754 and the second plate side 756. The slot 754 receives a portion of the pusher 202 to drive the pusher 202 between the first plate side 754 to a second plate side 756 along each of the rails 750, 752.

The pusher 202 is coupled to the pusher hydraulic actuator 241 (FIG. 17), which is fluidly coupled to the hydraulic system of the baler 10. The pusher hydraulic actuator 241 is responsive to the hydraulic fluid received from the hydraulic system to move the pusher 202 from the first plate side 754 to a second plate side 756 between each of the rails 750, 752 and vice versa. The left projection 244 and the right projection 246 of the pusher 202 contact a round bale received from the transfer table 502 and cooperate with the upper flange 242 of the pusher 202 to move the round bale to the respective one of the bale accumulator wings 506 or off the plate member 650 onto the ground surface G (FIG. 17).

The optional one or more bale accumulator wings 506 are coupled to the plate member 650. In this example, one bale accumulator wing 506.1 is coupled to the first plate side 754 and one bale accumulator wing 506.2 is coupled to the second plate side 756. Generally, one end of the interconnected frame members 540 are coupled to the respective one of the first plate side 754 and the second plate side 756, and the opposite end of the interconnected frame members 540 includes the cross-bar 542, which retains the square bale on the bale accumulator wing 506.1, 506.2. The bale accumulator wings 506.1, 506.2 are also be extendable and retractable, so as to be stowable along the respective first plate side 754 and the second plate side 756 when not in use.

In certain embodiments, the bale accumulator wings 506.1, 506.2 may be coupled to the plate member 650 so as to be rotatable relative to the plate member 650 to deposit the square bales on a virtual trip line. In one example, with reference to FIG. 17, the bale accumulator wings 506.1, 506.2 are pivotally coupled to the respective one of the first plate side 754 and the second plate side 756, via a pivot pin or other arrangement that defines the pivot axis WP1. A respective pivot arm (not shown) may be coupled to a respective one of the bale accumulator wings 506.1, 506.2, and moved by a respective actuator (not shown) to pivot the respective one of the bale accumulator wings 506.1, 506.2 about the pivot axis WP1 to deposit the square bales on the ground surface G. The pivot arms and the actuators may be coupled between the bale accumulator wings 506.1, 506.2 and the support frame 502.2 that supports the transfer table 502. The actuator may be a hydraulic cylinder, which is fluidly coupled to the hydraulic system of the baler 10; however, other actuators may be employed. The actuators may move the bale accumulator wings 506.1, 506.2 substantially simultaneously to deposit the square bales upon the ground surface G, or may move the bale accumulator wings 506.1, 506.2 independently. Moreover, a single actuator may be employed to move a pivot arm coupled to a respective one of the bale accumulator wings 506.1, 506.2. Further detail regarding the depositing of a bale on a ground surface may be found in U.S. Pat. No. 9,622,420, previously incorporated herein by reference.

In one example, in order to assemble the first platen system 602, with the cross-beams 630 and the reinforcement beams 632 coupled to each of the first plate member 626 and the second plate member 628, the first plate member 626 is coupled to the second plate member 628 to define the upper platen 610. The first hinge brackets 638 are coupled to the first plate end 634. The frame 608 is assembled with the interconnecting frame members 620 joined together to form the support structure. The vertical support beams 622 are coupled to the frame 608. The bottom platen 612 is coupled to the frame 608, and the bale accumulator 604, with the pusher 202 coupled to the slot 754 (FIG. 18), is coupled to the channel 652. The pusher hydraulic actuator 241 is coupled to the pusher 202 and the frame 608. The bale accumulator wings 506.1, 506.2 are coupled to the respective one of the first plate side 754 and the second plate side 756.

With reference to FIG. 20, the first linkage 692 is assembled, and coupled to one of the vertical support beams 622. The second linkage 694 is assembled, and coupled to the other one of the vertical support beams 622. The cross-member 696.1 is coupled to the first links 702 and the second links 704; and the cross-member 696.2 is coupled to the fourth links 708 and the fifth links 710. The third links 706 and the sixth links 711 are coupled to the vertical support beams 664 of the movable plate member 660, thereby coupling the movable platen 614 to the first linkage 692 and the second linkage 694. The connector links 698 are coupled to the fourth links 708 and the second links 704. The actuators 700 are coupled to the respective vertical support beams 622.

Referring back to FIG. 17, with the transfer table 502 and actuator 510 assembled and coupled to the support structure 502.2, the support structure 502.2, including the transfer table 502, is coupled to the frame 608. The lift actuator 684 is coupled to the upper platen 610 and to the frame 608. With the pull actuators 686 coupled to the frame 608, the coupling members 690 are coupled to the sprockets 687 of the pull actuators 686, the sprockets 695 and the coupler 631.

With the bale recompression system 600 assembled, the respective pivot arms and actuators are coupled to the respective one of the bale accumulator wings 506.1, 506.2 and to the support frame 502.2. The respective hydraulic actuators 241, 510, 684, 686, 700 and actuators associated with the bale accumulator wings 506.1, 506.2 are each coupled to the hydraulic system of the baler 10 so as to be fluidly coupled to the hydraulic supply of the tractor 12.

Figure 21:
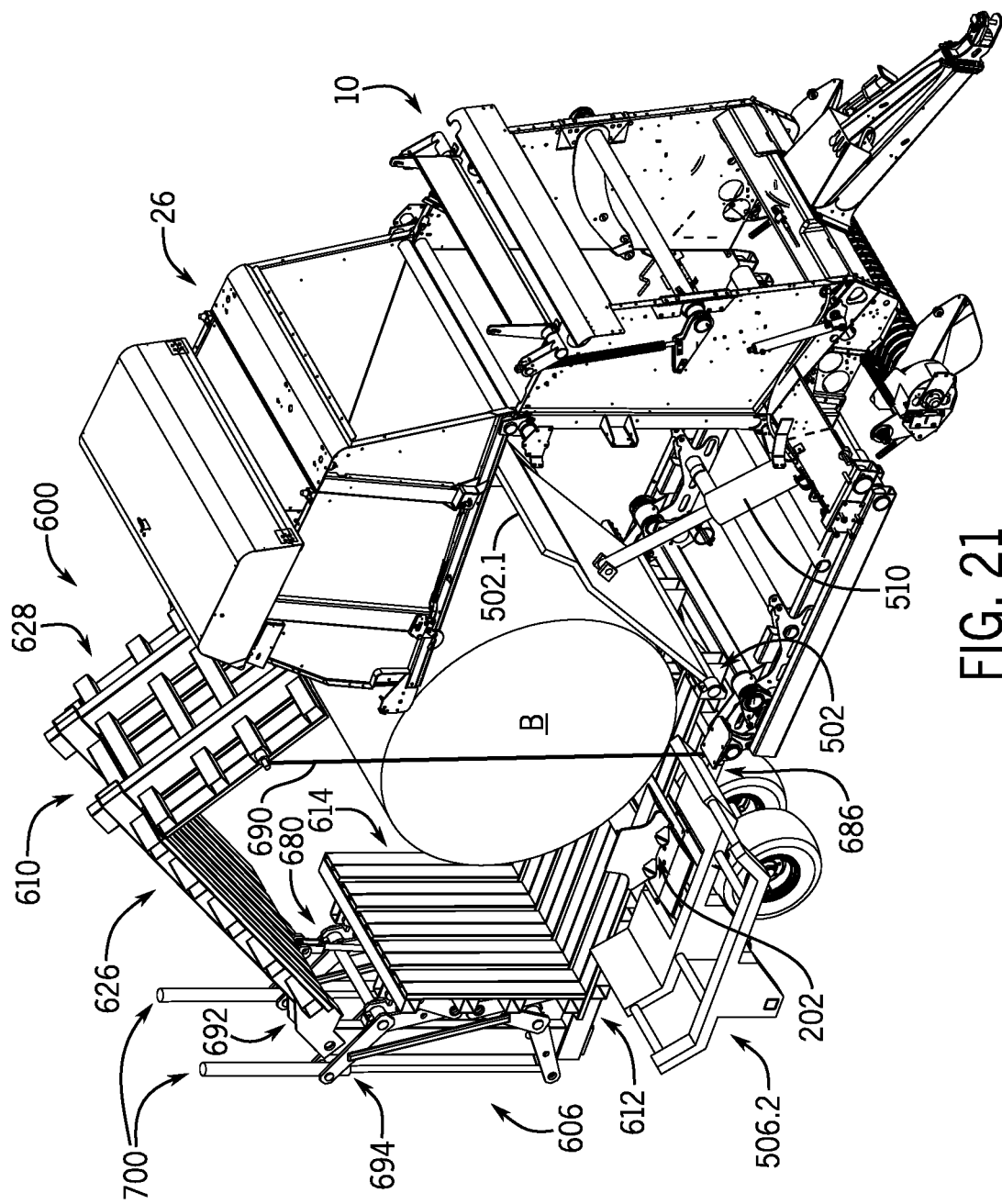
FIG. 21 is a front perspective view of bale recompression system of FIG. 17, in which a round bale has been discharged from the baler and moved by a transfer table into a first platen system for recompression.
Figure 22:
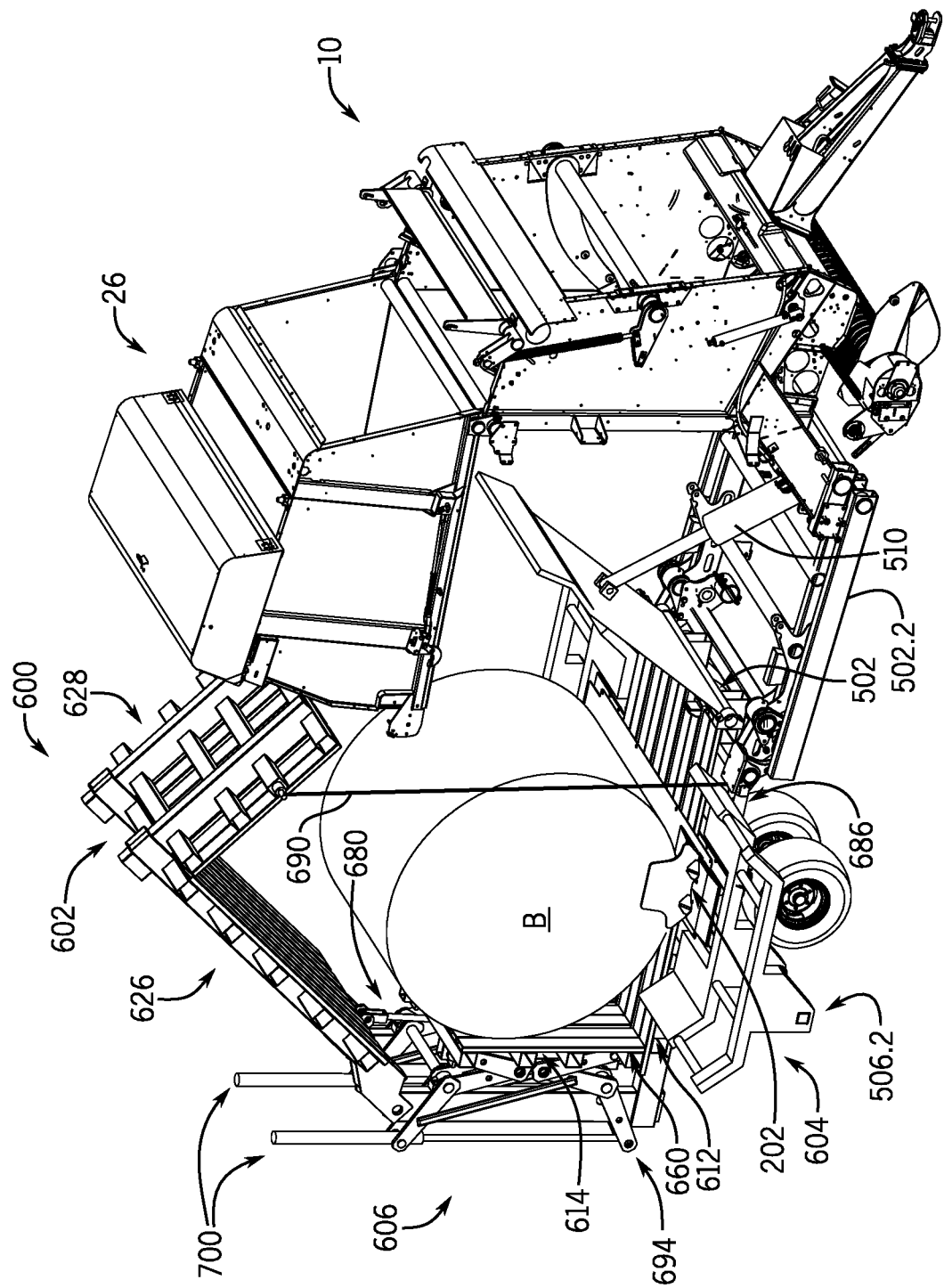
FIG. 22 is a front perspective view of bale recompression system of FIG. 17, in which a round bale received within the first platen system for recompression, with an upper platen of the first platen system in a first position and a movable platen of the first platen system in a first position.

Once the round bale B is formed in the bale forming chamber 22 of the baler 10, the discharge gate 26 moves to the open discharge position to release the formed round bale B. With reference to FIG. 21, the formed round bale B contacts the transfer table 502 and the transfer table 502 is actuated by the actuator 510 to pivot from the first position (FIG. 17) to the second position (FIG. 21). As the transfer table 502 moves to the second position, the round bale B is received within the first platen system 602. Generally, with reference to FIG. 22, the round bale B rolls from the transfer table 502 onto the plate member 650 and continues to roll until the round bale B contacts the movable plate member 660.

Figure 23:
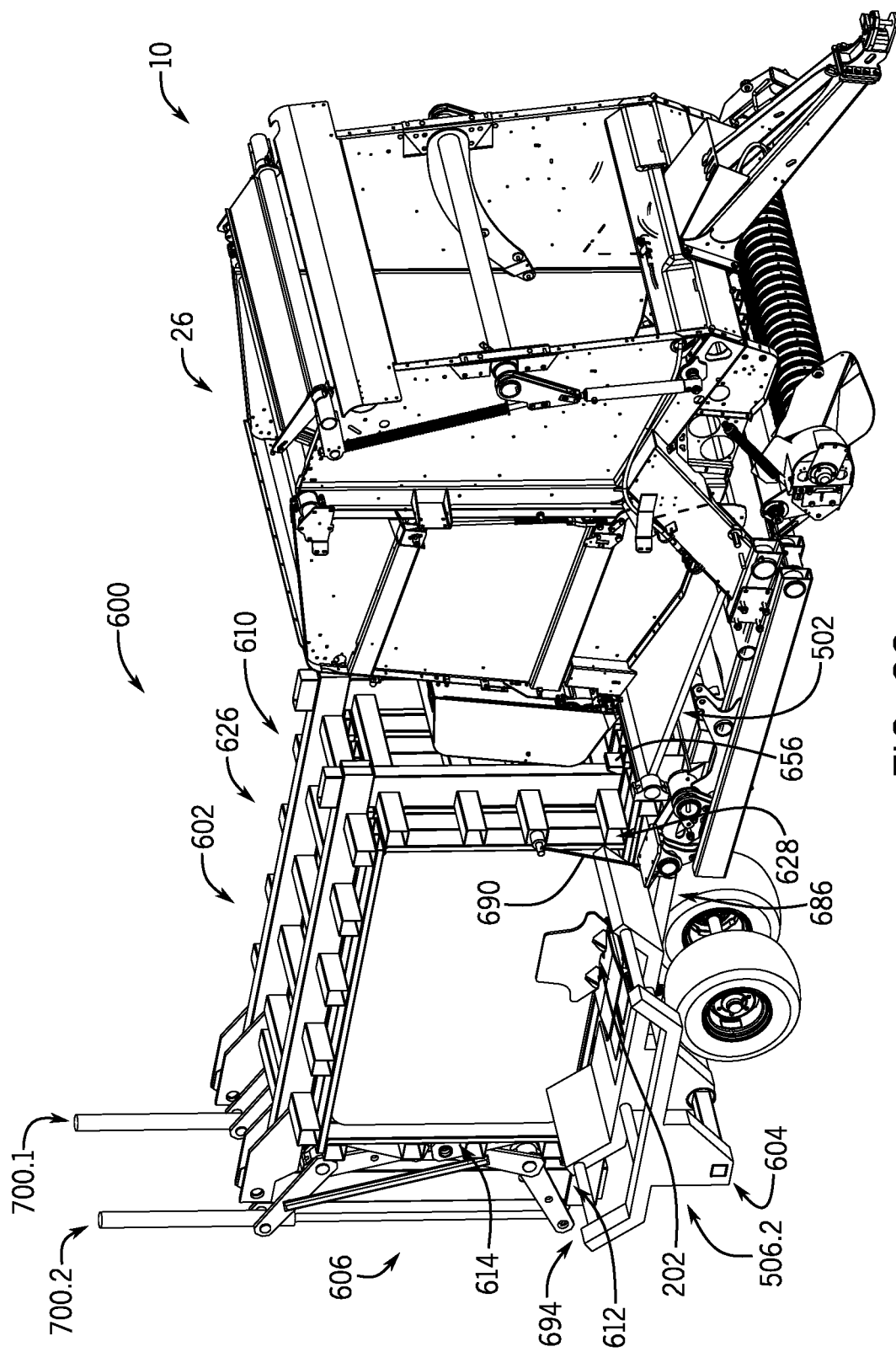
FIG. 23 is a front perspective view of bale recompression system of FIG. 17, in which the upper platen has been rotated from the first position to a second position, and the movable platen is in the first position.

With reference to FIG. 23, once the round bale B is received within the first platen system 602, the transfer table 502 is moved from the second position to the first position. The pull actuators 686 are actuated, based on hydraulic fluid received from the hydraulic supply of the tractor 12 through the hydraulic system of the baler 10, to move the upper platen 610 from the first position (FIG. 17) to the second position (FIG. 23). In the second position, the second plate member 628 contacts the retaining projections 656. As shown, the movement of the upper platen 610 to the second position recompresses the round bale B into a substantially elongated rectangular shape.

With reference to FIG. 24, with the upper platen 610 in the second position, the actuators 700.1, 700.2 are actuated, based on hydraulic fluid received from the hydraulic supply of the tractor 12 through the hydraulic system of the baler 10, to substantially simultaneously move the first linkage 692 and the second linkage 694. The movement of the first linkage 692 and the second linkage 694 causes the movable platen 614 to move from the first position (FIG. 17) to the second position (FIG. 24). In the second position, the round bale B is further recompressed into a substantially square shape to form the square bale SQ. The banding unit 114 of the first platen system 1104 may be activated to apply wrap material to the square bale SQ. The wrap material 198 passes through the first banding channels 132, the second banding channels 154, the banding channels 654 and the banding channels 668 to surround the square bale SQ.

Referring to FIG. 25, with the square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into one of the bale accumulator wings 506.1, 506.2.

Figure 26:
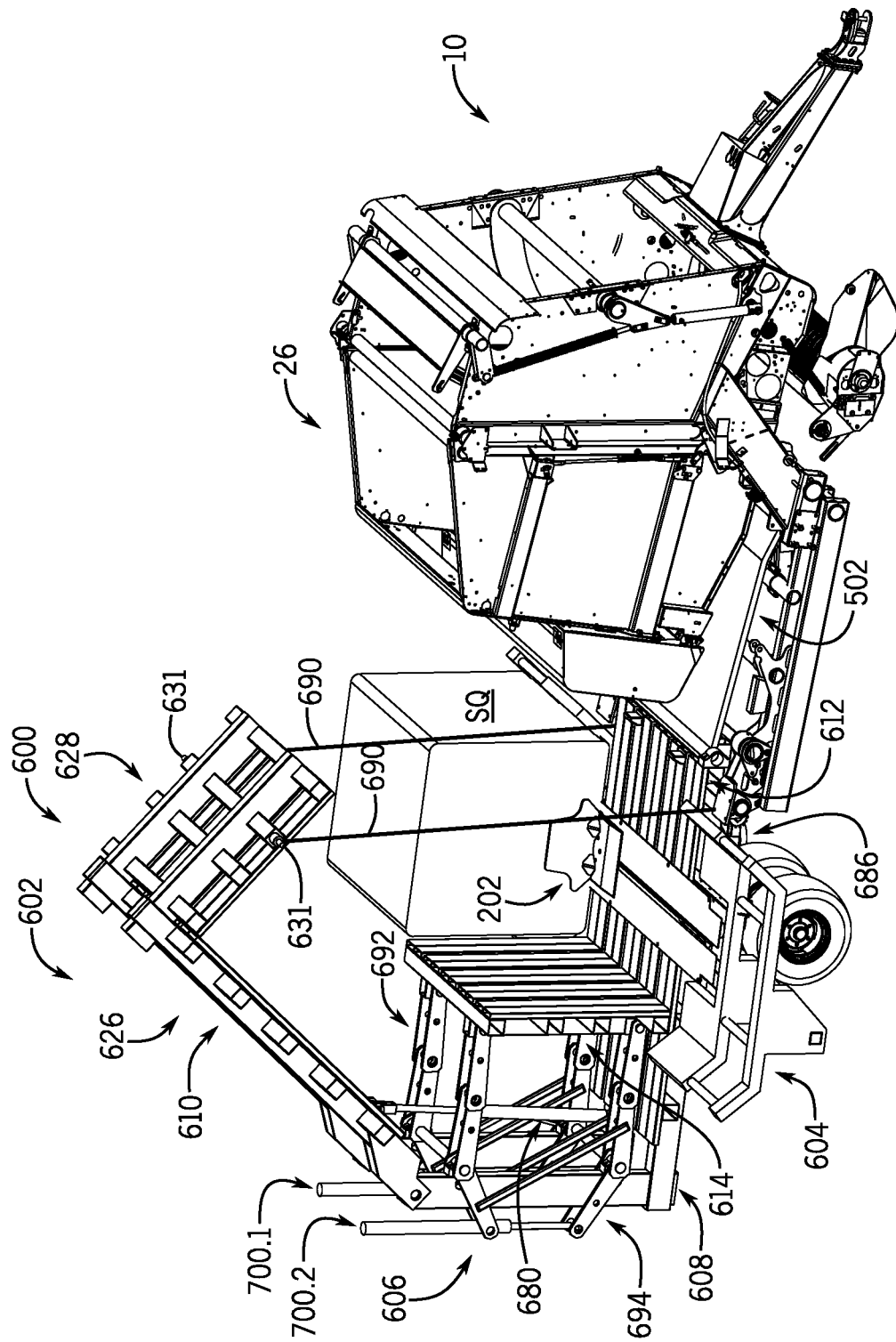
FIG. 26 is a front perspective view of bale recompression system of FIG. 17, in which the pusher of the bale accumulator has moved the square bale into a bale accumulator wing, and the upper platen has been rotated from the second position to the first position.

Referring to FIG. 26, with the square bale SQ on one of the bale accumulator wings 506.1, 506.2, the hydraulic pressure is released from the pull actuators 686, which causes the pull actuators 686 to retract thereby causing slack on the coupling members 690. The lift actuator 684 is actuated based on hydraulic fluid received from the hydraulic supply of the tractor 12 through the hydraulic system of the baler 10, for example. The actuation of the lift actuator 684 moves the upper platen 610 from the second position to the first position.

Figure 27:
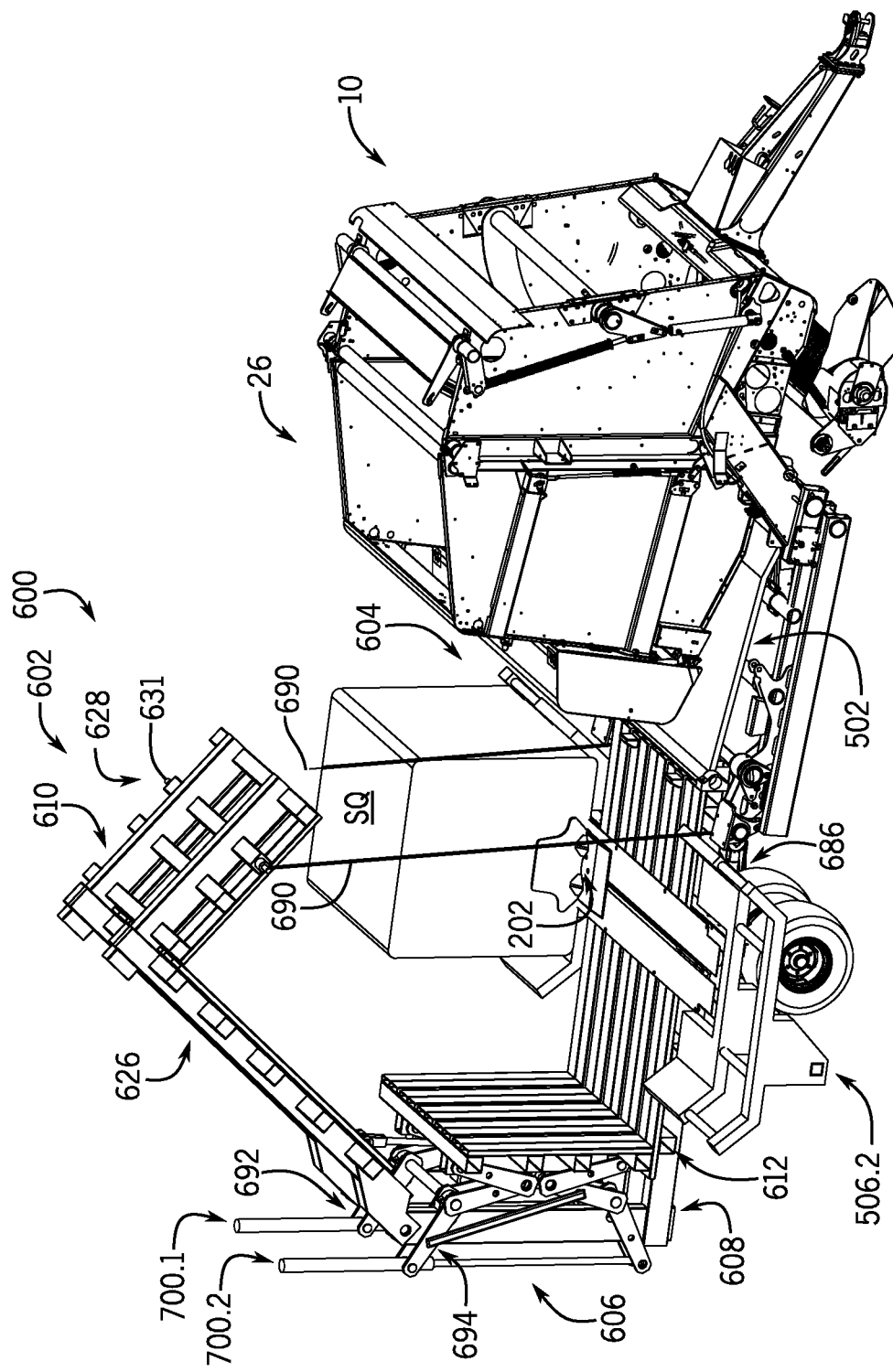
FIG. 27 is a front perspective view of bale recompression system of FIG. 17, in which the movable platen has been rotated from the second position to the first position such that the bale recompression system may receive another round bale from the baler.

Referring to FIG. 27, with the upper platen 610 in the first position, the hydraulic pressure is released from the actuators 700.1, 700.2, which causes the first linkage 692 and the second linkage 694 to retract, thereby moving the movable platen 614 from the second position to the first position. With the upper platen 610 and the movable platen 614 in the first position, the bale recompression system 600 is ready to accept another round bale B from the baler 10 for recompression.

With the first square bale SQ formed, the discharge gate 26 may move to the open discharge position to release a second round bale. Once the second round bale is received on the transfer table 502, the transfer table 502 is actuated by the actuator 510 to pivot to the second position. As the transfer table 502 moves to the second position, the second round bale B is received within the first platen system 602. Once the second round bale B is received within the first platen system 602, the transfer table 502 is moved from the second position to the first position. The pull actuators 686 are actuated based on hydraulic fluid received from the hydraulic supply of the tractor 12 through the hydraulic system of the baler 10, to move the upper platen 610 from the first position (FIG. 17) to the second position (FIG. 23). In the second position, the second plate member 628 contacts the retaining projections 656. As shown, the movement of the upper platen 610 to the second position recompresses the second round bale B into a substantially elongated rectangular shape.

With the upper platen 610 in the second position, the actuators 700.1, 700.2 are actuated, based on hydraulic fluid received from the hydraulic supply of the tractor 12 through the hydraulic system of the baler 10, to substantially simultaneously move the first linkage 692 and the second linkage 694. The movement of the first linkage 692 and the second linkage 694 causes the movable platen 614 to move from the first position (FIG. 17) to the second position (FIG. 24). In the second position, the second round bale B is further recompressed into a substantially square shape to form a second square bale SQ. The banding unit 114 of the first platen system 602 may be activated to apply wrap material to the second square bale SQ. The banding unit 114 of the first platen system 1104 may be activated to apply wrap material to the second square bale SQ. The wrap material 198 passes through the first banding channels 132, the second banding channels 154, the banding channels 654 and the banding channels 668 to surround the second square bale SQ.

With the second square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the second square bale into the other one of the bale accumulator wings 506.1, 506.2.

With the second square bale SQ on the other one of the bale accumulator wings 506.1, 506.2, the hydraulic pressure is released from the pull actuators 686, which causes the pull actuators 686 to retract thereby causing slack on the coupling members 690. The lift actuator 684 is actuated based on hydraulic fluid received from the hydraulic supply of the tractor 12 through the hydraulic system of the baler 10, for example. The actuation of the lift actuator 684 moves the upper platen 610 from the second position to the first position.

With the upper platen 610 in the first position, the hydraulic pressure is released from the actuators 700.1, 700.2, which causes the first linkage 692 and the second linkage 694 to retract, thereby moving the movable platen 614 from the second position to the first position. With the upper platen 610 and the movable platen 614 in the first position, the bale recompression system 600 is ready to accept another round bale B from the baler 10 for recompression.

Further, with square bales on both of the bale accumulator wings 506.1, 506.2 and the upper platen 610 of the first platen system 602 in the first position, the actuators (not shown) associated with the bale accumulator wings 506.1, 506.2 may be actuated, based on hydraulic fluid received from the hydraulic supply of the tractor 12 through the hydraulic system of the baler 10, for example. The actuation of these actuators moves the respective pivot arms, and thus, the respective bale accumulator wings 506.1, 506.2 to deposit the square bales on a virtual trip line. As the depositing of the bales on a virtual trip line is known from commonly assigned U.S. Pat. No. 9,578,811 to Kraus et al., titled "Variable Rate Discharge System for Crop Accumulator," which is incorporated herein by reference, the depositing of the square bales will not be discussed in detail herein.

Alternatively, in certain embodiments, when the bale accumulator wings 506.1, 506.2 are not employed, the pusher 202 may be actuated to eject the square bale from the plate member 650 of the first platen system 602.

Figure 28:
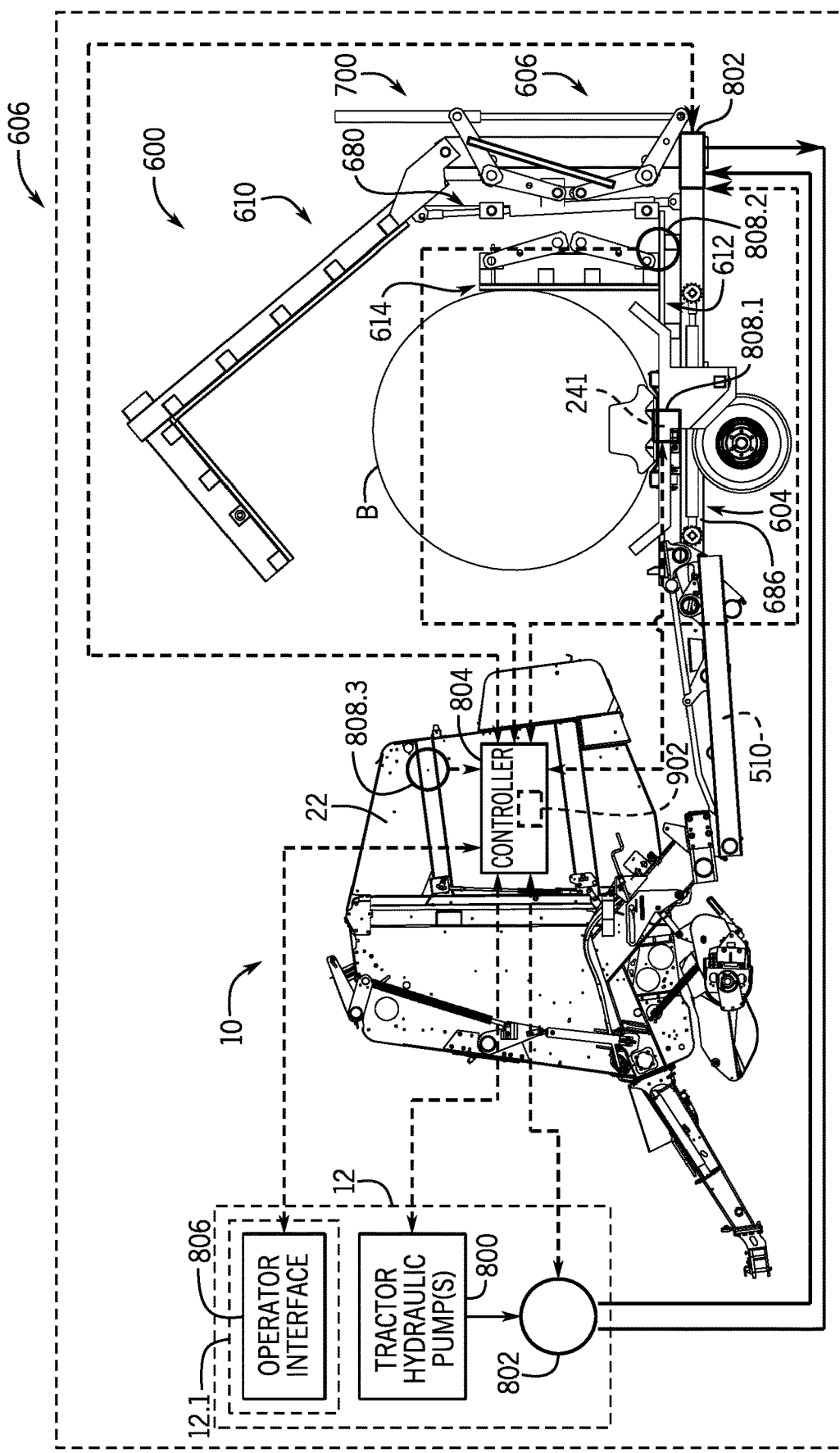
FIG. 28 is a functional block diagram illustrating the baler having the bale recompression system of FIG. 17 and a bale accumulator system in accordance with various embodiments.

With reference to FIG. 28, a functional block diagram of the accumulator control system 606 is shown. In various embodiments, the accumulator control system 606 includes various components associated with the baler 10, the bale recompression system 600 and the tractor 12. In one example, the accumulator control system 606 includes one or more tractor hydraulic pumps 800, one or more control valves 802, a controller 804, a human-machine or operator interface 806 and one or more sensors 808. The one or more tractor hydraulic pumps 800 and the one or more control valves 802, along with various lines, hoses, conduits, define a hydraulic circuit that supplies hydraulic fluid to the hydraulic actuators 241, 510, 684, 686, 700 and actuators associated with the bale accumulator wings 506.1, 506.2 based on one or more control signals from the controller 804.

Generally, the tractor 12 includes the one or more tractor hydraulic pumps 800, which may be driven by an engine of the tractor 12. Flow from the tractor hydraulic pumps 800 may be routed through the one or more control valves 802 of the tractor 12 and baler 10 and various conduits (e.g., flexible hoses) in order to drive the hydraulic cylinders or hydraulic actuators 241, 510, 684, 686, 700 and actuators associated with the bale accumulator wings 506.1, 506.2. Flow from the tractor hydraulic pumps 800 may also power various other components of the tractor 12 and/or baler 10. The flow from the tractor hydraulic pumps 800 may be controlled in various ways (e.g., through control of the various control valves 802), in order to cause movement of the hydraulic actuators 241, 510, 684, 686, 700 and actuators associated with the bale accumulator wings 506.1, 506.2. In this way, for example, a movement of the baler 10 and/or bale recompression system 600 may be implemented by various control signals to the tractor hydraulic pumps 800, control valves 802, and so on. Generally, each of the control valves 802 may be controlled by the controller 804 between one of three positions. In one example, the control valves 802 have a first, open position, in which hydraulic fluid from the tractor hydraulic pumps 800 flows into a respective one of the hydraulic actuators 241, 510, 684, 686, 700 and actuators associated with the bale accumulator wings 506.1, 506.2; a second, open position, in which hydraulic fluid from the tractor hydraulic pumps 800 is released from the respective one of the hydraulic actuators 241, 510, 684, 686, 700 and actuators associated with the bale accumulator wings 506.1, 506.2; and a third, closed position, in which hydraulic fluid from the tractor hydraulic pumps 800 does not flow into the respective one of the hydraulic actuators 241, 510, 684, 686, 700 to maintain a hydraulic pressure within the respective one of the hydraulic actuators 241, 510, 684, 686, 700 and actuators associated with the bale accumulator wings 506.1, 506.2.

Generally, the controller 804 (or multiple controllers) may be provided, for control of various aspects of the operation of the baler 10, in general. The controller 804 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 804 may be configured to execute various computational and control functionality with respect to the baler 10 (or other machinery). In some embodiments, the controller 804 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 804 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 804 may be in electronic, hydraulic, mechanical, or other communication with various other systems or devices of the baler 10, such as the ECU of the baler 10, the bale recompression system 600 and the tractor 12 (or other machinery). For example, the controller 804 may be in electronic or hydraulic communication with various actuators, sensors, and other devices within (or outside of) the baler 10, the ECU of the baler 10, the bale recompression system 600 and the tractor 12 including various devices associated with the pumps 800, control valves 802, and so on. The controller 804 may communicate with other systems or devices (including other controllers) in various known ways, including via a CAN bus (not shown) of the baler 10 or the tractor 12, via wireless or hydraulic communication means, or otherwise. In this example, the controller 804 is associated with the baler 10, however, it will be understood that the controller 804 may be associated with the tractor 12, the bale recompression system 600, or may be associated with a remote device, such as a portable electronic device.

In some embodiments, the controller 804 may be configured to receive input commands and to interface with an operator via the human-machine interface or operator interface 806, which may be disposed inside a cab 12.1 of the tractor 12 for easy access by the operator. The operator interface 806 may be configured in a variety of ways. In some embodiments, the operator interface 806 may include one or more joysticks, various switches or levers, one or more buttons, a touchscreen interface that may be overlaid on a display, a keyboard, a speaker, a microphone associated with a speech recognition system, or various other human-machine interface devices.

Various sensors 808 may also be provided to observe various conditions associated with the baler 10 and bale recompression system 600. In some embodiments, various sensors (e.g., pressure, flow or other sensors) may be disposed near the pumps 800 and control valves 802, or elsewhere on the baler 10 and bale recompression system 600. For example, sensor 808.1 may include one or more flow sensors, such as volumetric flow sensors, that observe a volumetric flow rate associated with the hydraulic circuit and generate sensor signals based thereon, such as a volumetric flow rate associated with the pusher hydraulic actuator 241. Based on the volumetric flow rate associated with the pusher hydraulic actuator 241, an amount of time the control valve 802 associated with the pusher hydraulic actuator 241 is in the first, open position (which may be observed by the sensors 808.1 or another module associated with the controller 804), and a known bore diameter of a cylinder of the pusher hydraulic actuator 241 (which may be stored in a memory associated with the controller 804), the controller 804 determines how far the cylinder extends outward (an extended length of the cylinder). Based on how far the cylinder extends (the extended length of the cylinder) and a known geometry of pusher hydraulic actuator 241 relative to the pusher 202 (which may be stored in a memory associated with the controller 804), the controller 804 determines a position of the pusher 202 relative to the bottom platen 612. This enables the controller 804 to determine whether the bale has been moved into one of the bale accumulator wings 506.

In various embodiments, a position sensor 808.2 is coupled to the movable platen 614 and observes a position of the movable platen 614. In one example, the position sensor 808.2 is a linear position sensor, which observes a position of the movable platen 614 and generates sensor signals based thereon. Based on the linear position of the movable platen 614 observed by the position sensor 808.2, the controller determines a current position of the movable platen 614. It should be noted that other techniques may be used to determine a position of the movable platen 614. For example, one or more sensors (e.g., pressure, flow or other sensors) may be coupled to one or more of the actuators 700 to observe a volumetric flow rate associated with the actuators 700. In this example, based on the volumetric flow rate associated with the actuators 700, an amount of time the control valve(s) 802 associated with the actuators 700 is in the first, open position (which may be observed by the sensors 808.2 or another module associated with the controller 804), and a known bore diameter of each cylinder of the actuators 700 (which may be stored in a memory associated with the controller 804), the controller 804 determines how far each of the cylinders extends outward (a length of each of the cylinders). Based on how far each of the cylinders extends (the length of each of the cylinders) and a known geometry of the linkage 692, 694 (which may be stored in a memory associated with the controller 804), the controller 804 determines a position of the movable platen 614 relative to the bottom platen 612.

Various sensors 808.3 may also be disposed on or near the baler 10 in order to measure parameters, such as a diameter of a bale within the bale forming chamber 22, and so on. In some embodiments, the sensors 808.3 may include a bale diameter sensor, which observes a diameter of the bale within the bale forming chamber 22 and generates sensor signals based thereon. In various embodiments, the bale diameter sensor may comprise one or more pressure sensors, potentiometers, rotary encoders, etc.

The various components noted above (or others) may be utilized by the controller 804 to determine whether to move the movable platen 614 when the bale recompression system 600 is being used as a bale accumulator and not for the recompression of a round bale into a square bale. Accordingly, these components may be viewed as forming part of the bale accumulator control system 606 for the bale recompression system 600. Each of the control valves 802, the operator interface 806 and the sensors 808 are in communication with the controller 804 via a suitable communication architecture, such as a CAN bus associated with the baler 10.

Figure 29:
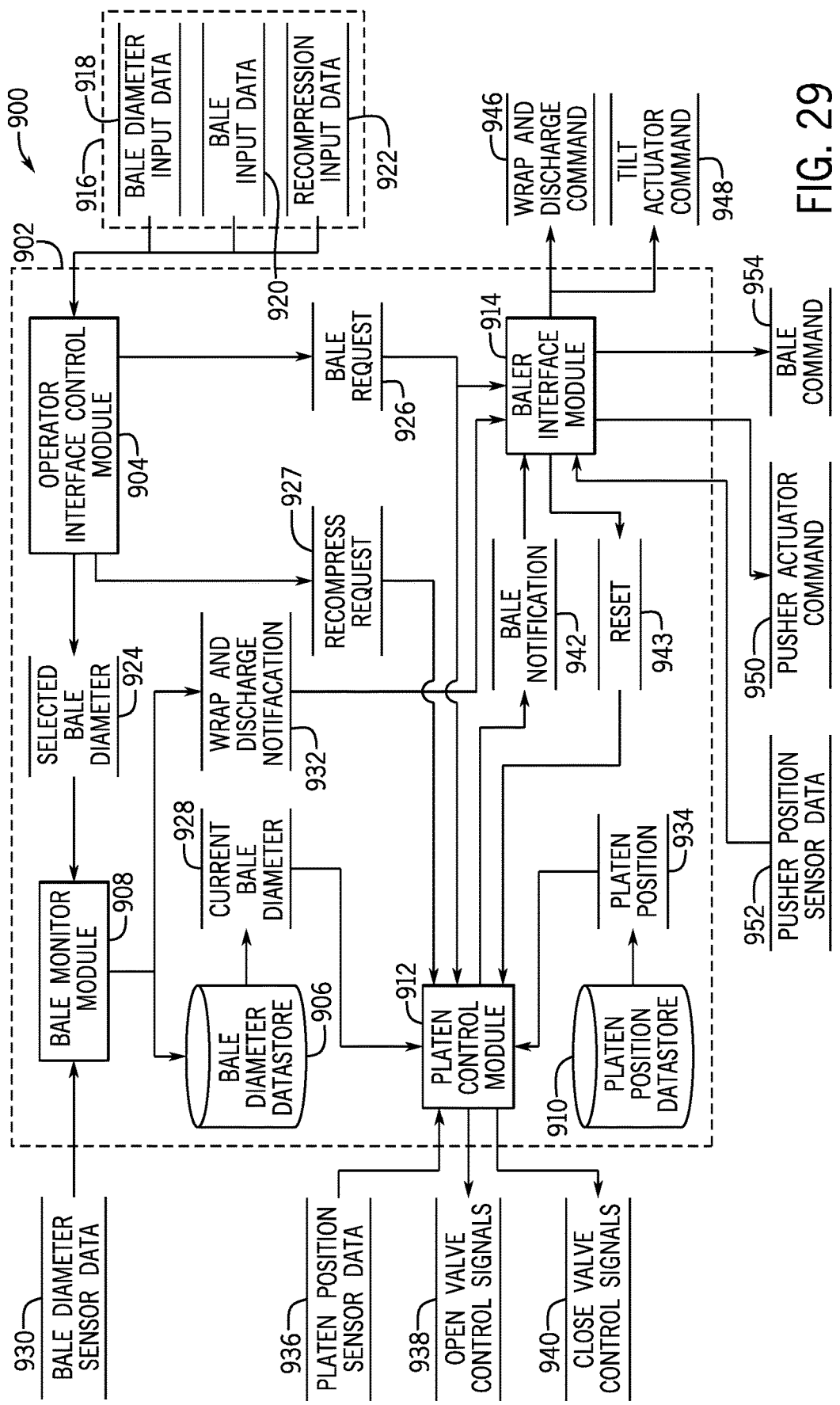
FIG. 29 is a dataflow diagram illustrating the bale accumulator system of the baler and bale recompression system of FIG. 28, in accordance with various embodiments.

Referring now also to FIG. 29, a dataflow diagram illustrates various embodiments of an accumulation system 900 of the bale accumulator control system 606 for the bale recompression system 600, which may be embedded within a control module 902 associated with the controller 804. Various embodiments of the accumulation system 900 according to the present disclosure can include any number of sub-modules embedded within the control module 902. As can be appreciated, the sub-modules shown in FIG. 29 can be combined and/or further partitioned to similarly output one or more control signals to the control valves 802, the pusher hydraulic actuator 241, the ECU of the baler 10 and the actuator 510. Inputs to the accumulation system 900 are received from the sensors 808 (FIG. 28), received from the operator interface 806 (FIG. 28), received from other control modules (not shown) associated with the baler 10 and/or recompression system 600, and/or determined/modeled by other sub-modules (not shown) within the controller 804. In various embodiments, the control module 902 includes an operator interface control module 904, a bale diameter datastore 906, a bale monitor module 908, a platen position datastore 910, a platen control module 912 and a baler interface module 914.

The operator interface control module 904 receives input data 916 from an operator's manipulation of the operator interface 806. In one example, the operator interface control module 904 receives bale diameter input data 918, bale input data 920 and recompression input data 922. The bale diameter input data 918 comprises input received from the operator interface 806 that indicates an operator's selected diameter for a round bale to be formed in the bale forming chamber 22 of the baler 10. The operator interface control module 904 interprets the bale diameter input data 918 and sets selected bale diameter 924 for the bale monitor module 908. The selected bale diameter data 924 is the operator's desired diameter for the round bale.

The bale input data 920 comprises input received from the operator interface 806 that indicates an operator's desire to form a bale of crop with the baler 10. The recompression input data 922 comprises input received from the operator interface 806 that indicates an operator's desire to recompress the round bale formed by the baler 10 into a square bale. The operator interface control module 904 interprets the bale input data 920 and the recompression input data 922. If the bale input data 920 indicates that the operator desires to bale crop, and the recompression input data 922 indicates that the operator does not wish to recompress the round bale into a square bale, the operator interface control module 904 sets bale request 926 for the platen control module 912. The bale request 926 is a notification that the operator is operating the baler 10 for baling crop and desires to accumulate the crop on the bale recompression system 600 instead of recompressing the round bale. Stated another way, the bale request 926 is a notification that the bale recompression system 600 is not being used to recompress round bales formed by the baler 10, but rather, the bale recompression system 600 is being used to accumulate the round bales prior to depositing the formed round bales on the ground.

If however, the recompression input data 922 indicates that the operator selects to recompress the round bales formed by the baler 10 into square bales, the operator interface control module 904 sets recompress request 927 for the platen control module 912.

The bale diameter datastore 906 stores data that indicates a current bale diameter 928. In one example, the bale diameter datastore 906 is populated by the bale monitor module 908 during the formation of a round bale by the baler 10. The current bale diameter 928 retrieved from the bale diameter datastore 906 provides a diameter of the bale formed by the baler 10.

The bale monitor module 908 receives as input bale diameter sensor data 930. The bale diameter sensor data 930 comprises sensor signals or sensor data received from the sensor 808.3. The bale monitor module 908 processes the sensor signals from the sensor 808.3 and determines a diameter of the bale in the bale forming chamber 22.

The bale monitor module 908 also receives as input the selected bale diameter 924. The bale monitor module 908 compares the diameter of the bale (observed by the sensor 808.3) to the selected bale diameter 924. If the diameter of the bale is greater than the selected bale diameter 924, the bale monitor module 908 stores the diameter of the bale as the current bale diameter 928 in the bale diameter datastore 906. If the diameter of the bale is greater than the selected bale diameter 924, the bale monitor module 908 also sets a wrap and discharge notification 932 for the baler interface module 914. The wrap and discharge notification 932 indicates that the bale in the bale forming chamber 22 has reached the desired diameter, and is to be wrapped and discharged.

The platen position datastore 910 stores a table of correlation data, which correlates a position of the movable platen 614 to the current diameter of the bale formed in the bale forming chamber 22. Thus, the platen position datastore 910 stores one or more lookup tables, which provide a platen position 934 that corresponds with the current bale diameter 928. The platen positions 934 stored in the platen position datastore 910 are each predefined, and in one example, a platen position 934 is predefined for each available bale diameter selection. Stated another way, each of the bale diameters from which the operator may select through the operator interface 806 has a corresponding associated pre-defined platen position 934.

The platen control module 912 receives as input the bale request 926. Based on the bale request 926, the platen control module 912 queries the bale diameter datastore 906 and retrieves the current bale diameter 928. Based on the current bale diameter 928, the platen control module 912 queries the platen position datastore 910 and retrieves the platen position 934 associated with the current bale diameter 928. The platen control module 912 sets the platen position 934 as a desired position for the movable platen 614. The platen control module 912 also receives as input platen position sensor data 936. The platen position sensor data 936 comprises sensor signals or sensor data received from the sensor 808.2. The platen control module 912 processes the sensor signals from the sensor 808.2 and determines a current position of the movable platen 614. In the example in which the sensors 808.2 observe a volumetric flow rate, the platen control module 912 may determine the position of the movable platen 614 based on calculating the volume of hydraulic fluid that flows into the cylinders of each of the actuators 700 by solving equation (1) for each actuator 700:

$$\text{Vol (gal)} = \text{Hyd flow rate (gal/sec)} * \text{valve open time (sec)} \quad (1)$$

Wherein the Hyd flow rate (gal/sec) is the measured flow rate observed by the sensors 808.2 and the valve open time (sec) is the amount of time the control valve 802 associated with the actuators 700 is in the first, open position. Once the platen control module 912 determines Vol, the platen control module 912 solves the following equation for L:

$$\text{Vol} = (\pi/4) * D^2 * L \quad (2)$$

Wherein D is the bore diameter of the cylinder of the respective actuator 700, L is how far the cylinder extends (the extended length of the cylinder) and Vol is from equation (1). Once the platen control module 912 has solved for L, the platen control module 912 retrieves the known or pre-defined geometry of the linkage 692, 694 (from a memory associated with the controller 804), and determines the position of the movable platen 614 based on how far the actuators 700 are extended.

In various embodiments, the platen control module 912 compares the desired position to the current position, and if the current position is not equal to the desired position, the platen control module 912 outputs open valve control signals 938. In other embodiments, the platen control module 912 assumes that the movable platen 614 is in the first position, and outputs the open valve control signals 938 upon retrieval of a platen position 934 that is not equal to the first position. The open valve control signals 938 comprise one or more control signals for the control valves 802 to open to the first, open position to drive the actuators 700.1, 700.2 to move the movable platen 614.

Based on the outputting of the open valve control signals 938, the platen control module 912 receives as input or resamples the platen position sensor data 936. Based on the platen position sensor data 936, the platen control module 912 determines a current position of the movable platen 614. If the current position of the movable platen 614 is not equal to the desired position (set based on the platen position 934), the platen control module 912 continues to monitor or determine the current position of the movable platen 614 until the current position of the movable platen 614 is substantially equal to the desired position (set based on the platen position 934).

Once the current position of the movable platen 614 is substantially equal to the desired position, the platen control module 912 outputs close valve control signals 940. The close valve control signals 940 comprise one or more control signals for the control valves 802 to move to the third, close position to close to maintain the position of the movable platen 614. Once the current position of the movable platen 614 is substantially equal to the desired position, the platen control module 912 also sets a bale notification 942 for the baler interface module 914. The bale notification 942 indicates that the movable platen 614 is in a position to receive a round bale from the baler 10 such that the received round bale is substantially centered with the pusher 202.

The platen control module 912 also receives as input reset 943. The reset 943 is a command to move the movable platen 316 to the first position. Based on the receipt of the reset 943, the platen control module 912 outputs the one or more open valve control signals 938 to move the movable platen 614 to the first position. In this example, the open valve control signals 938 comprise the one or more control signals for the control valves 802 to move to the second, open position to release the hydraulic pressure within the actuators 700. In various embodiments, the platen control module 912 may receive as input the platen position sensor data 936, may process the platen position sensor data 936 to determine whether the movable platen 614 has returned to the first position, and may output the close valve control signals 940 once the current position of the movable platen 614 is equal to a known first position of the movable platen 614 (which may be stored in a memory associated with the controller 804). In the example where the sensors 808.2 observe a volumetric flow rate, the controller 804 may utilize equations (1) and (2), but may subtract an area of the rod of the cylinder associated with the actuators 700 to determine if the movable platen 614 has returned to the first position.

The platen control module 912 also receives as input the recompress request 927. Based on the recompress request 927, the platen control module 912 receives as input the platen position sensor data 936 and determines whether the movable platen 614 is in the first position (by comparing the determined current position of the movable platen 614 to a known or predefined position value for the first position of the movable platen 614). If the movable platen 614 is not at the first position, the platen control module 912 outputs the one or more open valve control signals 938 to move the movable platen 614 to the first position. In this example, the open valve control signals 938 comprise the one or more control signals for the control valves 802 to move to the second, open position to release the hydraulic pressure within the actuators 700. In various embodiments, the platen control module 912 may receive as input the platen position sensor data 936, may process the platen position sensor data 936 to determine whether the movable platen 614 has returned to the first position, and may output the close valve control signals 940 once the current position of the movable platen 614 is equal to a known first position of the movable platen 614.

Figure 30A:
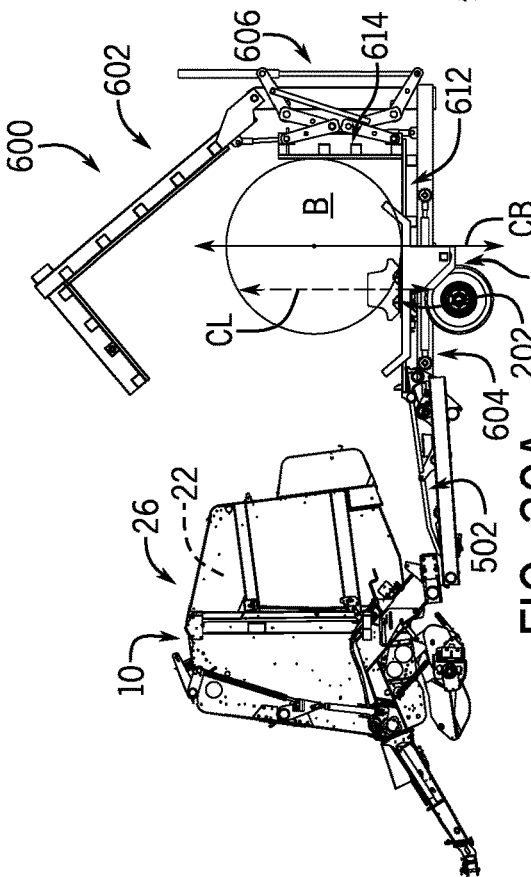
FIGS. 30A-30D illustrate the bale accumulator system of the baler and bale recompression system of FIG. 28 controlling a position of the movable platen to operate the bale recompression system as a bale accumulator.

For example, with reference to FIG. 30A, the bale recompression system 600 is shown coupled to the baler 10. In this example, the operator has selected to bale crop in the bale forming chamber 22, but not to recompress the round bales formed in the bale forming chamber 22. As shown, with the movable platen 614 in the first position, the round bale B received from the baler 10 (via the transfer table 502) is not aligned with a centerline CL of the pusher 202. Rather, a central radial axis CB of the round bale B is offset from the centerline CL of the pusher 202. In certain instances, when the round bale B is not aligned with the centerline CL of the pusher 202, the pusher 202 may be unable to move the round bale B into the respective one of the bale accumulator wings 506, and may be unable to move the round bale B off the bottom platen 612.

Figure 30B:
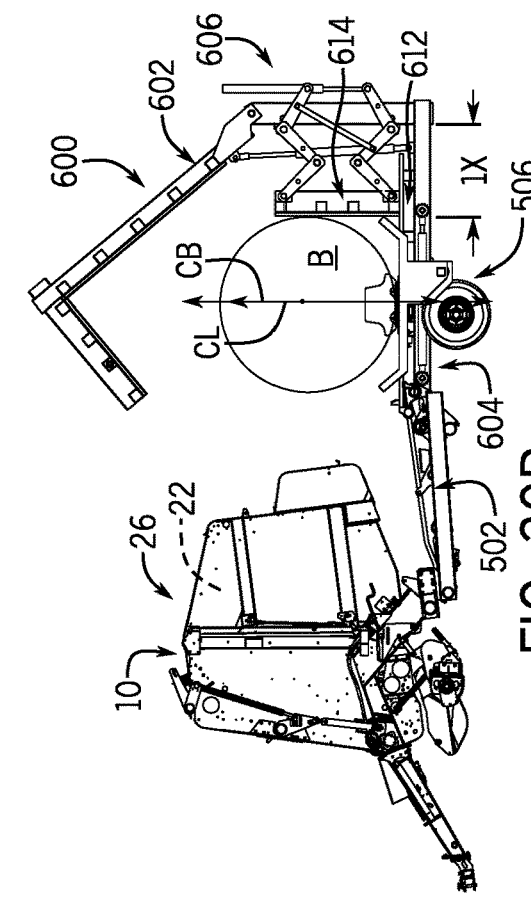

With reference to FIG. 30B, in this example, the platen control module 912 of the control module 902 has output the one or more control signals to the control valves 802 to move the movable platen 614 a distance 1X. The distance 1X is the platen position 934 retrieved from the platen position datastore 910, which corresponds to the diameter of the round bale B. As shown in FIG. 30B, the central radial axis CB of the round bale B is aligned with the centerline CL of the pusher 202, which enables the pusher 202 to move the round bale B into the respective one of the bale accumulator wings 506.

Figure 30C:
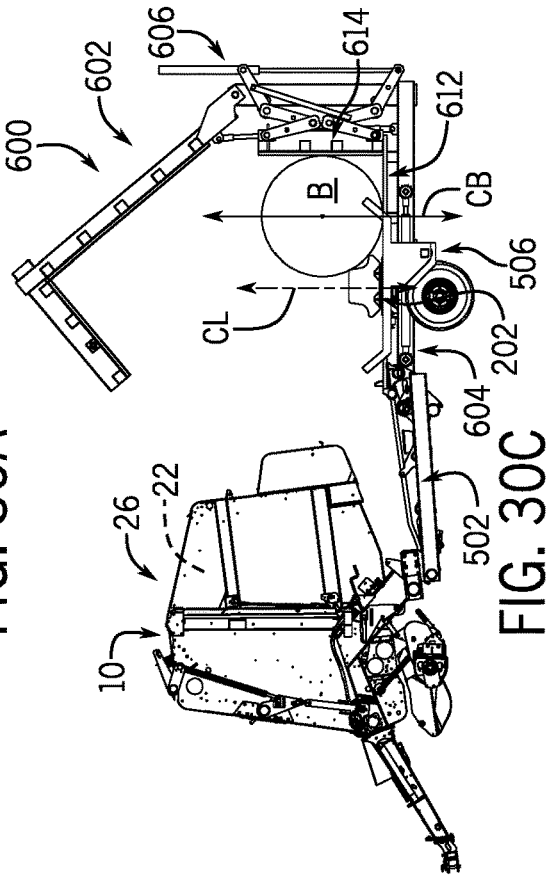

For example, with reference to FIG. 30C, the bale recompression system 600 is shown coupled to the baler 10. In this example, the operator has selected to bale crop in the bale forming chamber 22, but not to recompress the round bales formed in the bale forming chamber 22. As shown, with the movable platen 614 in the first position, the round bale B received from the baler 10 (via the transfer table 502) is not aligned with a centerline CL of the pusher 202. Rather, a central radial axis CB of the round bale B is offset from the centerline CL of the pusher 202. In certain instances, when the round bale B is not aligned with the centerline CL of the pusher 202, the pusher 202 may be unable to move the round bale B into the respective one of the bale accumulator wings 506, and may be unable to move the round bale B off the bottom platen 612.

Figure 30D:
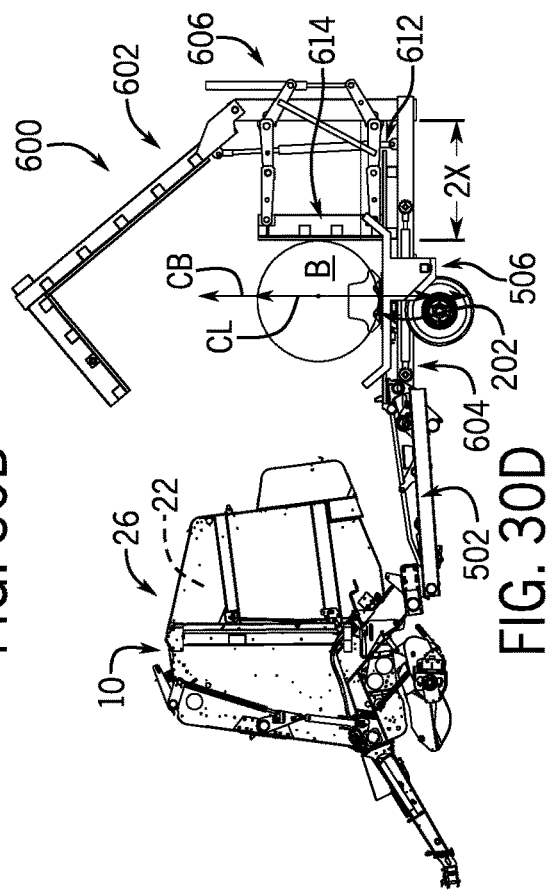

With reference to FIG. 30D, in this example, the platen control module 912 of the control module 902 has output the one or more control signals to the control valves 802 to move the movable platen 614 a distance 2X. The distance 2X is the platen position 934 retrieved from the platen position datastore 910, which corresponds to the diameter of the round bale B. As shown in FIG. 30D, the central radial axis CB of the round bale B is aligned with the centerline CL of the pusher 202, which enables the pusher 202 to move the round bale B into the respective one of the bale accumulator wings 506.

The baler interface module 914 receives as input the wrap and discharge notification 932. Based on the wrap and discharge notification 932, the baler interface module 914 determines whether the bale notification 942 has been received that indicates that the movable platen 614 is in the desired position. If true, the baler interface module 914 outputs a wrap and discharge command 946. The wrap and discharge command 946 is a command that is output to the ECU of the baler 10 to command the baler 10 to activate the wrap feed and cut-off system of the baler 10 to apply the wrap material 198 about the round bale in the bale forming chamber 22. The baler interface module 914 also outputs tilt actuator command 948. The tilt actuator command 948 is a command that is output to the ECU of the baler 10 to command the baler 10 to actuate the actuator 510 of the transfer table 502 to move the round bale into the first platen system 602.

The baler interface module 914 also outputs pusher actuator command 950. The pusher actuator command 950 is a command that is output to the ECU of the baler 10 to command the baler 10 to actuate the pusher hydraulic actuator 241 to move the round bale from the bottom platen 612 to one of the bale accumulator wings 506. The baler interface module 914 also receives as input pusher position sensor data 952. The pusher position sensor data 952 comprises sensor signals or sensor data received from the sensor 808.1. The baler interface module 914 processes the sensor signals from the sensor 808.1 and determines a position of the pusher 202. In one example, based on the volumetric flow rate of the hydraulic fluid into the pusher hydraulic actuator 241 (as observed by the sensor 808.1), an amount of time the control valve 802 associated with the pusher hydraulic actuator 241 is in the first, open position (which may also be observed by the sensors 808.1 or determined by a module associated with the controller 804), and a known bore diameter of a cylinder of the pusher hydraulic actuator 241, the baler interface module 914 determines how far the cylinder extends outward (an extended length of the cylinder). Based on how far the cylinder extends (the extended length of the cylinder) and a known or pre-defined geometry of the pusher hydraulic actuator 241 relative to the pusher 202 (which may be stored in a memory associated with the baler interface module 914), the baler interface module 914 determines a position of the pusher 202 relative to the bottom platen 612.

In one example, the baler interface module 914 calculates the volume of hydraulic fluid that flows into the cylinder of the pusher hydraulic actuator 241 by solving the equation:

$$\text{Vol (gal)} = \text{Hyd flow rate (gal/sec)} \ast \text{valve open time (sec)} \quad (1)$$

Wherein the hyd flow rate (gal/sec) is the measured flow rate observed by the sensors 808.1 and the valve open time (sec) is the amount of time the control valve 802 associated with the pusher hydraulic actuator 241 is in the first, open position. Once the baler interface module 914 determines Vol, the baler interface module 914 solves the following equation for L:

$$\text{Vol} = (\pi/4) \ast D^2 \ast L \quad (2)$$

Wherein D is the bore diameter of the cylinder of the pusher hydraulic actuator 241, L is how far the cylinder of the pusher hydraulic actuator 241 extends (the extended length of the cylinder) and Vol is from equation (1). Once the baler interface module 914 has solved for L, the baler interface module 914 retrieves the known or pre-defined geometry of a linkage or other arrangement that connects the pusher hydraulic actuator 241 and the pusher 202 (from a memory associated with the controller 804), and determines the position of the pusher 202 based on how far the pusher hydraulic actuator 241 is extended.

Based on the position of the pusher 202, the baler interface module 914 determines whether the round bale has been moved onto one of the bale accumulator wings 506. If true, the baler interface module 914 sets the reset 943 for the platen control module 912.

The baler interface module 914 also receives as input the bale request 926. Based on the bale request 926, the baler interface module 914 outputs a bale command 954. The bale command 954 is a command that is output to the ECU of the baler 10 to start a baling operation.

Figure 31:
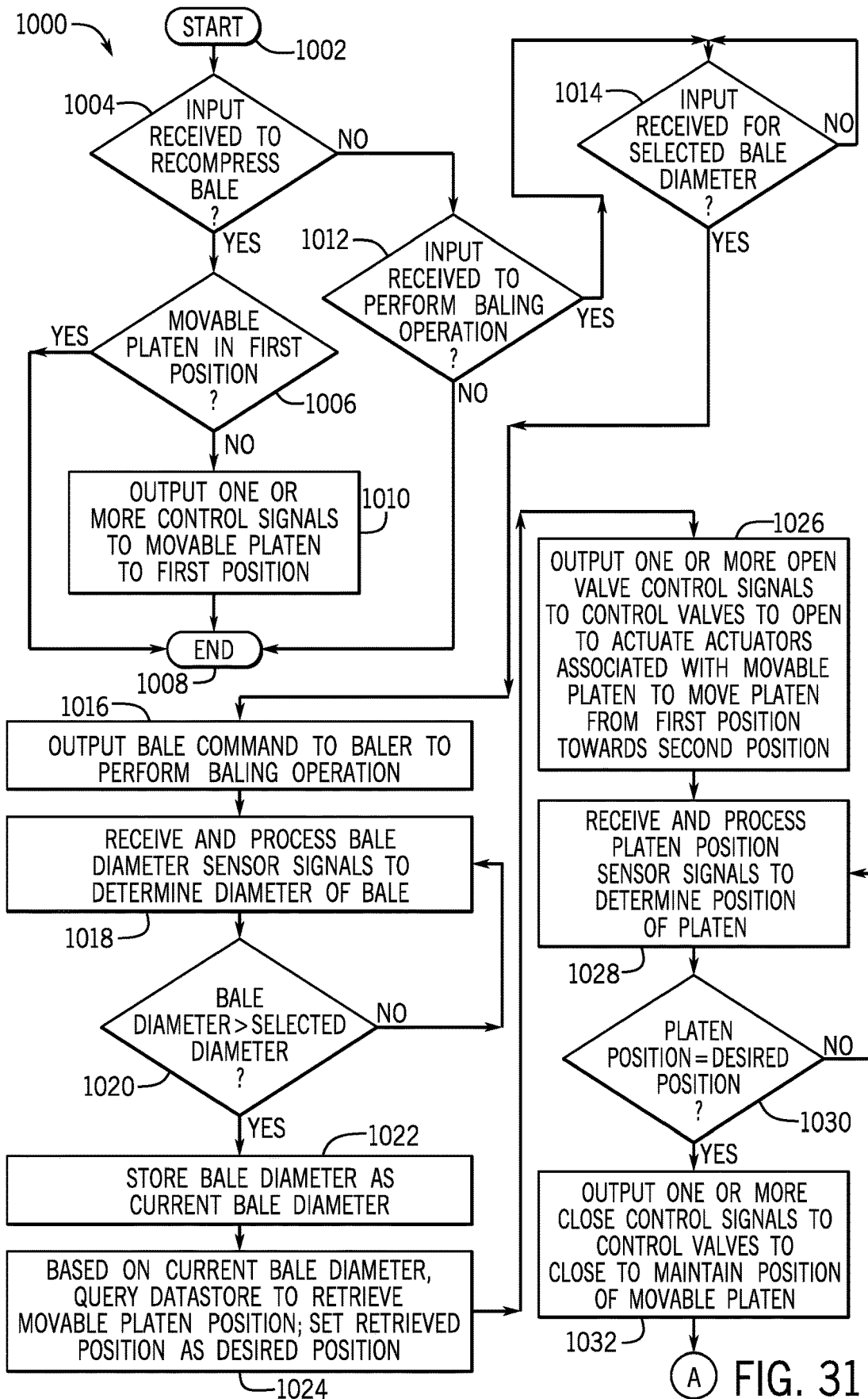
FIG. 31 is a flowchart illustrating a control method that may be performed by the bale accumulator system of the baler and bale recompression system of FIG. 28, in accordance with various embodiments.

Referring now also to FIG. 31, a flowchart illustrates a method 1000 that may be performed by the control module 902 of the controller 804 of FIGS. 28-29 in accordance with the present disclosure. As can be appreciated in light of the disclosure, the order of operation within the method is not limited to the sequential execution as illustrated in FIG. 31, but may be performed in one or more varying orders as applicable and in accordance with the present disclosure. In various embodiments, the method 1000 may be scheduled to run based on predetermined events, and/or can run continuously during operation of the baler 10.

In one example, the method begins at 1002. At 1004, the method determines whether recompression input data 922 has been received, via the operator's manipulation of the operator interface 806. If true, the method proceeds to 1006, and determines whether the movable platen 614 is in the first position (by processing the platen position sensor data 936). If true, the method ends at 1008. Otherwise, at 1010, the method outputs the one or more open valve control signals 938 to move the movable platen 614 to the first position. The method ends at 1008.

At 1004, if the method determines that input has not been received to recompress the bale, at 1012, the method determines whether input has been received, via the operator's manipulation of the operator interface 806, to perform a baling operation (i.e. the bale input data 920). If true, the method proceeds to 1012. Otherwise, the method ends at 1008.

At 1014, the method determines whether input has been received, via the operator's manipulation of the operator interface 806, to select a diameter for the round bale formed during the baling operation (i.e. the bale diameter input data 918). If true, The method proceeds to 1016. Otherwise, the method loops until input is received.

At 1016, the method outputs the bale command 954 to the baler 10 to start a baling operation. At 1018, the method receives and processes the bale diameter sensor data 930 and determines a current diameter of the round bale in the bale forming chamber 22. At 1020, the method determines whether the current diameter of the round bale in the bale forming chamber 22 is greater than the selected bale diameter received from the operator interface 806 (i.e. whether the current bale diameter 928 is greater than the selected bale diameter 924). If true, the method proceeds to 1022. If false, the method loops to 1018.

At 1022, the method stores the diameter of the round bale as the current bale diameter 928. At 1024, based on the current bale diameter 928, the method queries the platen position datastore 910 and retrieves the platen position 934 associated with the current bale diameter 928. The method also sets the retrieved platen position 934 as the desired position for the movable platen 614.

At 1026, the method outputs the one or more open valve control signals 938 to the control valves 802 to open the control valves 802 to actuate the actuators 700.1, 700.2 associated with the movable platen 614 to move the movable platen 614 from the first position toward the second position. At 1028, the method receives and processes the platen position sensor data 936 and determines a current position of the movable platen 614. At 1030, the method determines whether the current position of the movable platen 614 is substantially equal to the desired position for the movable platen 614 retrieved from the platen position datastore 910. If true, the method proceeds to 1032. Otherwise, the method loops to 1028.

At 1032, the method outputs the one or more close valve control signals 940 to the control valves 802 to close the control valves 802 to maintain the position of the movable platen 614. The method proceeds to A on FIG. 32.

Figure 32:
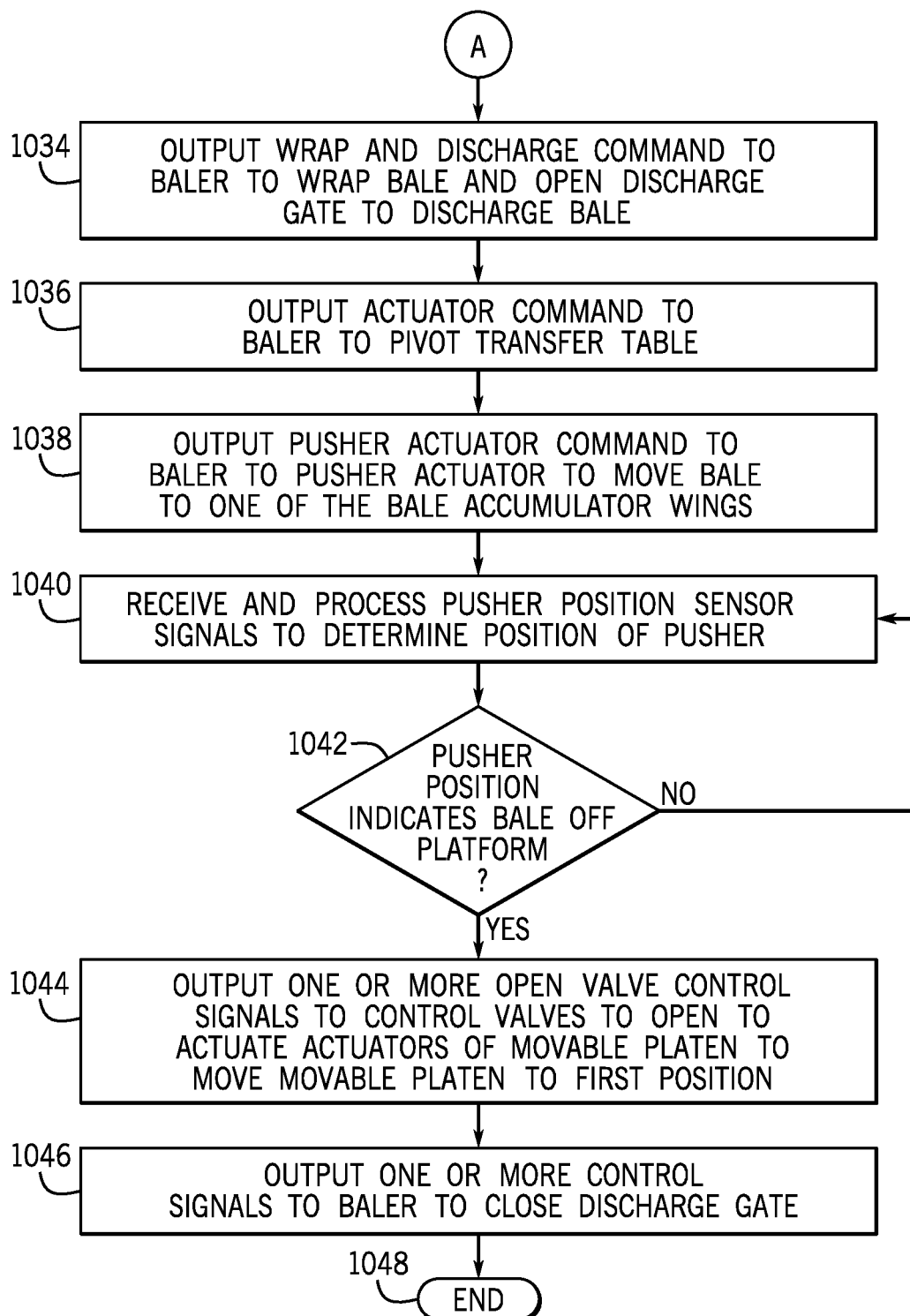
FIG. 32 is a continuation of the flowchart of FIG. 31.

From A on FIG. 32, the method at 1034 outputs the wrap and discharge command 946 to the ECU of the baler 10 to wrap the bale in the bale forming chamber 22 and to discharge the bale through the discharge gate 26. At 1036, the method outputs the tilt actuator command 948 to the ECU of the baler 10 to actuate the actuator 510 to pivot the transfer table 502. At 1038, the method outputs the pusher actuator command 950 to the ECU of the baler 10 to actuate the pusher hydraulic actuator 241 to push the round bale off the bottom platen 612. At 1040, the method receives and processes the pusher position sensor data 952 and determines a current position of the pusher 202. At 1042, the method determines whether the current position of the pusher 202 indicates that the round bale is off of the bottom platen 612. If true, the method proceeds to 1044. Otherwise, the method loops to 1040.

At 1044, method outputs the one or more open valve control signals 938 to the control valves 802 to open the control valves 802 to actuate the actuators 700.1, 700.2 associated with the movable platen 614 to move the movable platen 614 to the first position. Optionally, at 1046, the method outputs a discharge close command to the ECU of the baler 10 to close the discharge gate 26. The method ends at 1048. It should be noted, however, that block 1044 may be optional, as alternatively, the movable platen 614 may remain in the desired position until another bale diameter input data 918 is received. Thus, in certain embodiments, the method may perform block 1046 and loop to block 1014 to await another selected bale diameter. As a further alternative, the method may loop to 1014 once block 1042 is true. As a further alternative, the method may not end at 1048, but may loop to 1004 so long as the baler 10 is operating.

It should be noted that while the bale recompression system 600 is described herein as including the first platen system 602 having the upper platen 610, the bottom platen 612 and the movable platen 614, it should be understood that the bale recompression system 600 may be configured in a variety of ways. For example, with reference to FIG. 33A, a bale recompression system 1100 is shown. As the bale recompression system 1100 is similar to the bale recompression system 600 discussed with regard to FIGS. 17-32 and the bale recompression system 100' discussed with regard to FIG. 13, the same reference numerals will be used to denote the same or substantially similar components. The bale recompression system 1100 includes a transfer table 1102, a first platen system 1104 and the bale accumulator 604.

The bale recompression system 1100 is coupled to the baler 10 for movement with the baler 10 as the baler 10 is towed by the tractor 12. As will be discussed, the bale recompression system 1100 receives the round bale B that is discharged by the discharge gate 26, and recompresses the round bale B into a square bale. In this example, the first platen system 1104 is towed substantially directly behind the tractor 12. The transfer table 1102 guides the round bale B from the discharge gate 26 of the baler 10 into the first platen system 1104 and cooperates with the first platen system 1102 to recompress the round bale B into a square bale.

The transfer table 1102 interconnects the baler 10 and the first platen system 1104. In various embodiments, the transfer table 1102 is coupled to the baler 10 so as to be in a position for the round bale B to be dropped on a surface 1102.1 of the transfer table 1102 when the discharge gate 26 opens. The transfer table 1102, which is pivotable relative to a support structure 1112, receives the round bale B. When the discharge gate 26 opens, the transfer table 1102 tilts and/or lifts the round bale B in a generally aft direction (indicated by arrow 1108) to move the round bale B onto the first platen system 1104. Thus, the transfer table 1102 is movable between a first position (in which the transfer table 1102 is substantially parallel to a ground surface G) and a second position (in which the transfer table 1102 is pivoted in the aft direction).

Figure 33B:
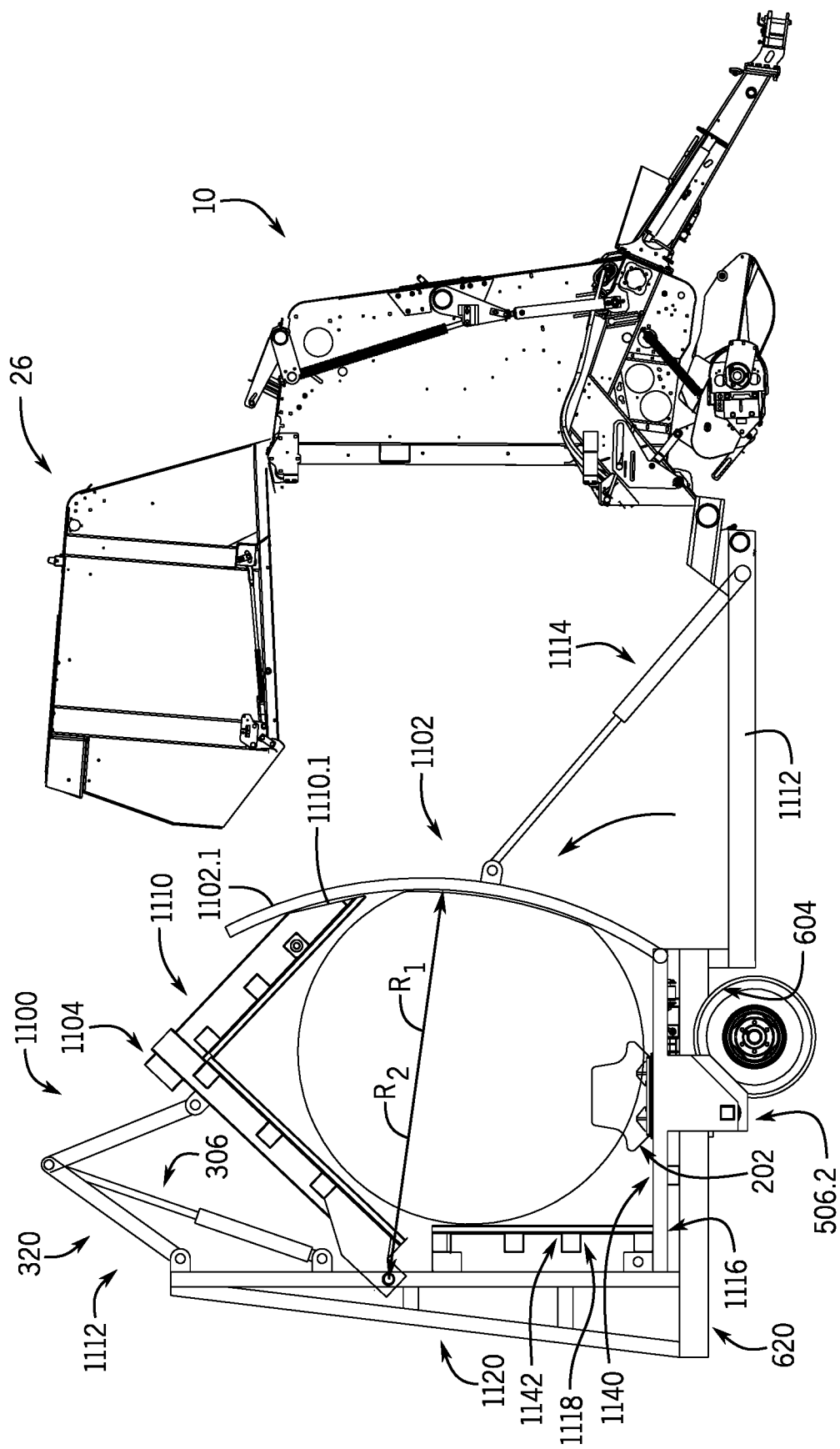
FIG. 33B is a side view of the bale recompression system of FIG. 33A, with the upper platen of the first platen system in the first position and the transfer table moved from the first position to a second position.
Figure 33C:
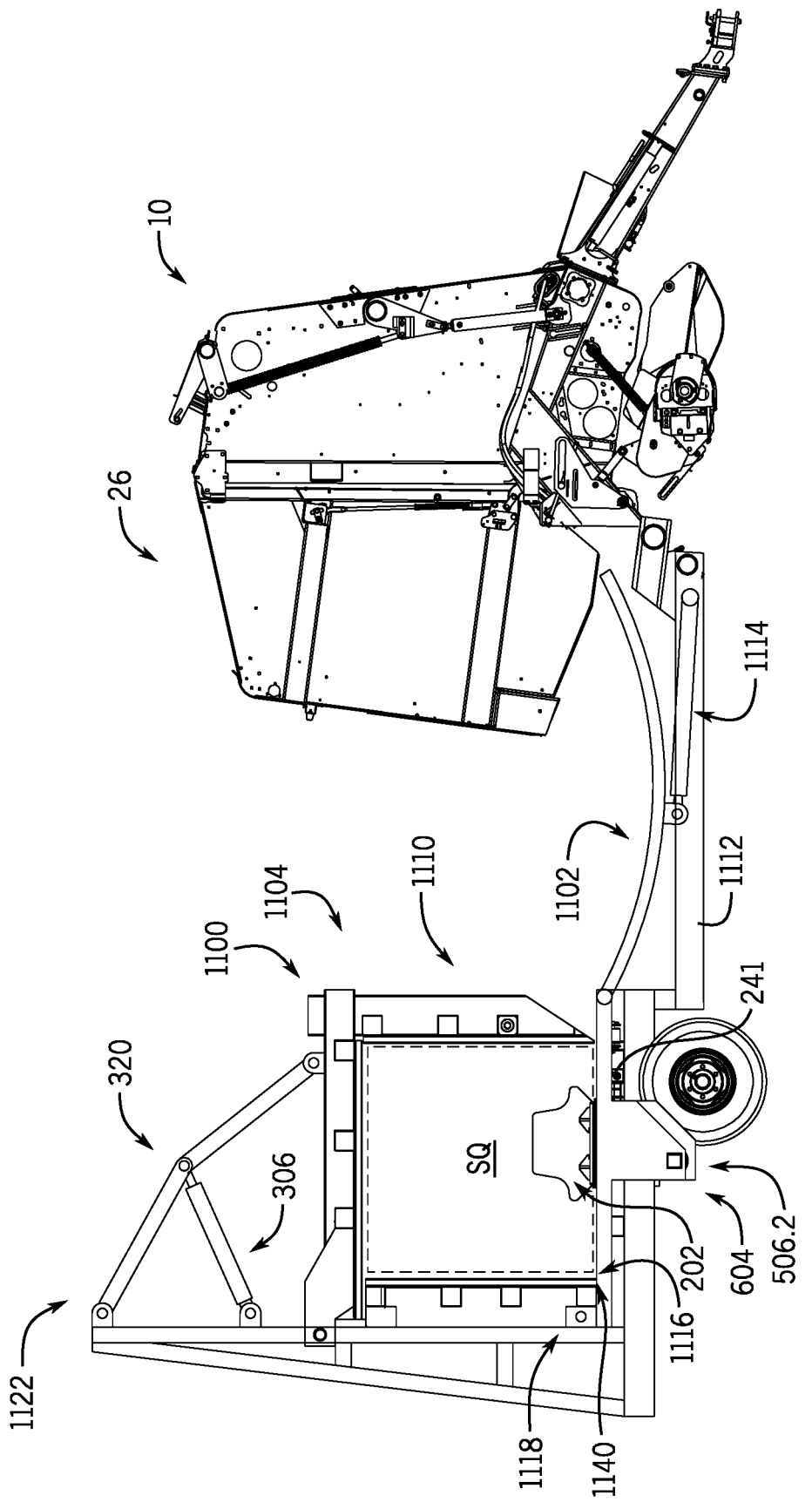
FIG. 33C is a side view of the bale recompression system of FIG. 33A, with the upper platen of the first platen system moved from the first position to a second position, and the transfer table moved from the second position to the first position.

The transfer table 1102 includes the surface 1102.1, which is opposite a second surface 1102.2. The transfer table 1102 also includes a first end 1102.3 opposite a second end 1102.4. The transfer table 1102 is composed of a metal or metal alloy, and formed via casting, forging, stamping, etc. In this example, the transfer table 1102 is generally arcuate or curved between the first end 1102.3 and the second end 1102.4. In this example, the surface 1102.1 of the transfer table 1102 is substantially concave; however, the surface 1102.1 may have any desired curvature. Moreover, while surface 1102.1 is shown to have a uniform radius of curvature TR, it should be noted that the surface 1102.1 may include a region of localized curvature, if desired. In one example, the radius of curvature R1 of the surface 1102.1 is substantially the same as a radius of curvature R2 (FIG. 33B) that a leading edge 1110.1 of an upper platen 1110 of the first platen system 1104 follows as the upper platen 1110 moves from a first position (FIG. 33A) to a second position (FIG. 33C). The first end 1102.3 is adjacent to the baler 10 for receiving the round bale B, and the second end 1102.4 is pivotally coupled to the first platen system 1104.

Generally, the transfer table 1102 is supported on the support structure 1112 and is movable between the first position and the second position by an actuator 1114. The actuator 1114 has a first end 1114.1 coupled to the second surface 1102.2 of the transfer table 1102, and a second end 1114.2 coupled to the support structure 1112. In one example, the actuator 1114 is a hydraulic actuator, which is fluidly coupled to the hydraulic system of the baler 10. For example, the actuator 1114 may include one or more hydraulic lines that connect the actuator 1114 with the hydraulic supply associated with the tractor 12. One or more electro-hydraulic control valves of the hydraulic system of the baler 10 may be in fluid communication with the actuator 1114 and electrically activated according to signals from the ECU to control the flow of hydraulic fluid between the hydraulic supply associated with the tractor 12 and the actuator 1114. The actuator 1114 is responsive to the hydraulic fluid received from the hydraulic system to move the transfer table 1102 between the first position (FIG. 33A) and the second position (FIG. 33C) and vice versa.

The first platen system 1102 includes the first, upper platen 1110, a second, bottom platen 1116, a third platen 1118, a frame 1120, the banding unit 114 and an actuation system 1122. The actuation system 1122 is operable to move the upper platen 1110 to recompress the round bale B into a square bale SQ. The first platen system 1102 is supported on the frame 1120, which may include one or more ground wheels 618, the plurality of interconnecting frame members 620, the first frame member 310, a second frame member 1124 and the one or more interconnecting members 314. The second frame member 1124 is composed of a metal or metal alloy, and may be stamped, forged, cast, etc. The first frame member 310 has the first end 310.1 coupled to the interconnecting frame members 620 and the second end 310.2 coupled to the second frame member 1124. The second frame member 1124 has a first end 1124.1 coupled to the interconnecting frame members 620 and the second end 1124.2 coupled to the first frame member 310. The first end 1124.1 of the second frame member 1124 is spaced apart from the first end 1124.1 of the first frame member 310. Generally, the second frame member 1124 extends along an axis that is substantially perpendicular to a longitudinal axis of the support beam 308. The second frame member 1124 includes the first bracket 324 and the second bracket 330 for coupling the actuation system 1122 to the frame 1120. The second frame member 1124 also includes a bore 1126. The bore 1126 is defined through the second frame member 1124 between one of the interconnecting members 314 and the second bracket 330. The bore 1126 receives a pivot pin 1128 to pivotally couple the upper platen 1110 to the frame 1120. The interconnecting members 314 couple or connect the first frame member 310 to the second frame member 1124.

Generally, the upper platen 1110 is rotatably coupled to the frame 1120, and is rotatable by the actuation system 1122 between a first position in which the upper platen 1110 is spaced apart from the bottom platen 1116 to define an opening 1129 for receiving the round bale B from the transfer table 1102; and a second position, in which the upper platen 1110 cooperates with the bottom platen 1116 and the transfer table 1102 to recompress the round bale B into a square bale. The bottom platen 1116 and the third platen 1118 remain stationary during the recompression of the round bales B.

In one example, the upper platen 1110 includes a first plate member 1132, the second plate member 628 and the leading edge 1110.1. The first plate member 1132 may be composed of a metal or metal alloy, and formed via casting, forging, stamping, etc. The first plate member 1132 and the second plate member 628 may be integrally formed, or may be discretely formed and coupled together via a suitable technique, such as welding, mechanical fasteners, etc. The first plate member 1132 may include one or more cross-beams 630 and vertical reinforcement beams 632 to provide structural rigidity to the respective first plate member 626. In one example, the leading edge 1110.1 is chamfered. By chamfering the leading edge 1110.1, the leading edge 1110.1 of the upper platen 1110 contacts the surface 1102.1 of the transfer table 1102 during the movement of the upper platen 1110 from the first position (FIG. 33A) to the second position (FIG. 33C). In this example, as the leading edge 1110.1 of the upper platen 1110 contacts the surface 1102.1 of the transfer table 1102, the leading edge 1110.1 inhibits crop from hairpinning around the leading edge 1110.1 of the upper platen 1110 as the crop is compressed.

The first plate member 1132 is rotatably coupled to the second frame member 1124. The first plate member 1132 is substantially planar and includes a first plate end 1134 opposite the second plate end 636. The first plate end 1134 includes a pair of hinge brackets 1136. One of the hinge brackets 1136 is coupled to a first side 1132.1 of the first plate member 1132, and one of the hinge brackets 1136 is coupled to a second side 1132.2 (not shown) of the first plate member 1132. The pair of hinge brackets 1136 extend from the first plate member 1132 to pivotally couple the first plate member 1132 to the second frame member 1124. In one example, the pair of hinge brackets 1136 each include a bore 1138, which is defined along a pivot axis P8. The pivot pin 1128 is received through the bores 1126 of the pair of hinge brackets 1136 and the bore 1126 of the second frame member 1124. The pivot pin 1128 enables the upper platen 1110 to rotate relative to the second frame member 1124, and thus, the third platen 1118 and the bottom platen 1116. The first plate member 1132 also includes the plurality of first banding channels 132 (not shown), which are defined through the first plate member 1132 from the first plate end 1134 to the second plate end 636. The second plate end 636 is coupled to the second plate member 628.

The second plate member 628 cooperates with the bottom platen 612 to secure the bale within the first platen system 602 during recompression. The second plate member 628 includes the leading edge 1110.1 that contacts the transfer table 1102 during the recompression of the round bale. While not illustrated herein, the one or more support plates 160 may be coupled to the first plate member 626 and the second plate member 628, if desired.

The bottom platen 1116 includes a plate member 1140. The plate member 1140 may be composed of a metal or metal alloy, and formed via casting, forging, stamping, etc. The plate member 1140 is substantially planar, and includes a first end 1140.1 opposite a second end 1140.2. The first end 1140.1 is coupled to the frame 1120 near or adjacent to the first end 620.1 of the support structure formed by the interconnecting frame members 620. The second end 1140.2 is coupled to the frame 1120 so as to be adjacent to the bale accumulator 604. The plate member 1140 also includes the plurality of banding channels 654 (not shown).

The third platen 1118 cooperates with the upper platen 1110 to recompress the round bale B. Generally, the third platen 1118 is fixed or stationary, and is coupled to the second frame member 1124 so as to be adjacent to the first end 1140.1 of the bottom platen 1116 for recompressing the round bale B. The third platen 1118 includes a plate member 1142 and the one or more cross-beams 662. The plate member 1142 may be composed of a metal or metal alloy, and formed via casting, forging, stamping, etc.

The plate member 1142 is substantially planar, and includes a first end 1142.1 opposite a second end 1142.2 and the plurality of banding channels 668 (not shown). The first end 1142.1 contacts the first plate end 1134 of the first plate member 1132 when the upper platen 1110 is in the first position, and the second end 1142.2 is contacts a surface 1140.3 of the plate member 1140.

In this example, the actuation system 1122 includes the linkage 304 and the actuator 306. The linkage 304 is the scissors linkage, having the first link 320 and the second link 322. The first end 320.1 is pivotally coupled to the first bracket 324 of the second frame member 1124 via the first pin 326. The second end 320.2 is coupled to the second link 322 via the second pin 328. The second end 322.2 is coupled to the first plate member 1132 of the upper platen 1110. In one example, the first plate member 1132 of the upper platen 1110 has the second bracket 330, and the second end 322.2 is coupled to the second bracket 330 via the third pin 332.

The actuator 306 rotates the upper platen 1110 between the first position and the second position. The actuator 306 is responsive to hydraulic fluid received from the tractor 12 to rotate the upper platen 1110 relative to the bottom platen 1116.

The bale accumulator 604 is coupled to the bottom platen 1116. The accumulator 604 includes the pusher 202 and the one or more optional bale accumulator wings 506. In this example, the pusher 202 is integrated into the bottom platen 1116 for moving a formed square bale to either one of the optional bale accumulator wings 506, or for moving the formed square bale off either side of the plate member 1140. In one example, the plate member 1140 is coupled to the first rail 750 (not shown), and the second rail 752 (not shown) and the slot 754 (not shown) are coupled to the frame 608. Generally, first rail 750 is opposite the second rail 752, and each of the rails 750, 752 extend along the plate member 1140 from a first plate side 1140.3 to a second plate side 1140.4 (not shown). The rails 750, 752 guide the pusher 202 as the pusher 202 moves between the first plate side 1140.3 and the second plate side 1140.4 (not shown). The slot 754 receives a portion of the pusher 202 to drive the pusher 202 between the first plate side 1140.3 to the second plate side 1140.4 along each of the rails 750, 752.

The pusher 202 is coupled to the pusher hydraulic actuator 241, which is fluidly coupled to the hydraulic system of the baler 10. For example, the pusher hydraulic actuator 241 may include one or more hydraulic lines that connect the pusher hydraulic actuator 241 with the hydraulic supply associated with the tractor 12. The pusher hydraulic actuator 241 is responsive to the hydraulic fluid received from the hydraulic system to move the pusher 202 from the first plate side 1140.3 to the second plate side 1140.4 (not shown) between each of the rails 750, 752 and vice versa. Generally, the pusher 202 contacts a square bale recompressed by the upper platen 1110, bottom platen 1116 and the third platen 1118, and moves the square bale to the respective one of the bale accumulator wings 506 or off the plate member 1140 onto a ground surface.

As the assembly of the first platen system 1102 is similar to the assembly of the first platen system 602, the assembly of the first platen system 1102 will not be discussed in detail herein. Moreover, as the assembly of the actuation system 1122 is similar to the assembly of the actuation system 300, the assembly of the actuation system 1122 will not be discussed in detail herein. Briefly, with the transfer table 1102 and actuator 1114 assembled and coupled to the support structure 1112, the support structure 1112, including the transfer table 1102, is coupled to the frame 608. With the bale recompression system 1100 assembled, the respective pivot arms and actuators are coupled to the respective one of the bale accumulator wings 506.1, 506.2 and to the support structure 1112. The respective actuators 241, 1114, 306 and actuators associated with the bale accumulator wings 506.1, 506.2 are each coupled to the hydraulic system of the baler 10 so as to be fluidly coupled to the hydraulic supply of the tractor 12.

Once the round bale B is formed in the bale forming chamber 22 of the baler 10, the discharge gate 26 moves to the open discharge position to release the formed round bale B. The formed round bale B contacts the transfer table 1102 and the transfer table 1102 is actuated by the actuator 1114 to pivot from the first position (FIG. 33A) to the second position (FIG. 33B). As the transfer table 1102 moves to the second position, the round bale B is received within the first platen system 1104. Generally, with reference to FIG. 33B, the round bale B rolls from the transfer table 1102 onto the plate member 1140 and continues to roll until the round bale B contacts the plate member 1142.

Once the round bale B is received within the first platen system 1104, the transfer table 1102 cooperates with the leading edge 1110.1 of the upper platen 1110 to retain the round bale B within the first platen system 1102 during recompression. In this regard, the actuator 1114 of the transfer table 1102 may be timed to move from the second position to the first position at a rate that corresponds with a rate of a rotational movement of the upper platen 1110 by the actuator 306 such that contact is maintained between the leading edge 1110.1 and the surface 1102.1. This coordinated movement enables the leading edge 1110.1 to slide along the surface 1102.1 of the transfer table 1102, while containing the round bale B during recompression. Generally, as the radius of curvature R1 of the surface 1102.1 of the transfer table 1102 is substantially the same as the radius of curvature R2 of the rotation of the upper platen 1110, the leading edge 1110.1 and the transfer table 1102 cooperate during the recompression of the round bale. Generally, the leading edge 1110.1 slides along the surface 1102.1 of the transfer table 1102, the "sliding action" between these two surfaces 1110.1 and 1102.1, which are smooth, inhibits crop hair pinning or pinching as the round bale B is reshaped into the square bale B. Thus, the bale recompression system 1100, with the cooperating surfaces 1110.1, 1102.1 enables the recompression of the round bale B while inhibiting the pinching of crop material between cooperating surfaces of the bale recompression system 1100. The actuator 1114 and 306 are each actuated based on hydraulic fluid received from the hydraulic supply of the tractor 12 through the hydraulic system of the baler 10, for example.

With reference to FIG. 33C, with the upper platen 1110 in the second position, the round bale B is recompressed into a substantially square shape to form the square bale SQ. The banding unit 114 of the first platen system 1104 may be activated to apply wrap material to the square bale SQ. The wrap material 198 passes through the first banding channels 132, the second banding channels 154, the banding channels 654 and the banding channels 668 to surround the square bale SQ.

With the square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into one of the bale accumulator wings 506.1, 506.2.

With the square bale SQ on one of the bale accumulator wings 506.1, 506.2, the hydraulic pressure is supplied to the actuators 1114 and 306, which causes the transfer table 1102 to move to the first position, and the upper platen 1110 to move to the first position. With the upper platen 1110 and the transfer table 1102 in the first position, the bale recompression system 1100 is ready to accept another round bale B from the baler 10 for recompression.

With the first square bale SQ formed, the discharge gate 26 may move to the open discharge position to release a second round bale. Once the second round bale is received on the transfer table 1102, the transfer table 1102 is actuated by the actuator 1114 to pivot to the second position. As the transfer table 1102 moves to the second position, the round bale B is received within the first platen system 1104. Once the round bale B is received within the first platen system 1104, the transfer table 1102 cooperates with the leading edge 1110.1 of the upper platen 1110 to retain the round bale B within the first platen system 1102 during recompression by the coordinated movement between the upper platen 1110 and the transfer table 1102.

With reference to FIG. 33C, with the upper platen 1110 in the second position, the round bale B is recompressed into a substantially square shape to form a second square bale SQ. The banding unit 114 of the first platen system 1104 may be activated to apply wrap material to the second square bale SQ. The wrap material 198 passes through the first banding channels 132, the second banding channels 154, the banding channels 654 and the banding channels 668 to surround the second square bale SQ.

With the second square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into the other one of the bale accumulator wings 506.1, 506.2.

With the second square bale SQ on the other one of the bale accumulator wings 506.1, 506.2, the hydraulic pressure is supplied to the actuators 1114 and 306, which causes the transfer table 1102 to move to the first position, and the upper platen 1110 to move to the first position. With the upper platen 1110 and the transfer table 1102 in the first position, the bale recompression system 1100 is ready to accept another round bale B from the baler 10 for recompression.

Further, with square bales on both of the bale accumulator wings 506.1, 506.2 and the upper platen 1110 of the first platen system 1104 in the first position, the actuators (not shown) associated with the bale accumulator wings 506.1, 506.2 may be actuated, based on hydraulic fluid received from the hydraulic supply of the tractor 12 through the hydraulic system of the baler 10, for example. The actuation of these actuators moves the respective pivot arms, and thus, the respective bale accumulator wings 506.1, 506.2 to deposit the square bales on a virtual trip line. As the depositing of the bales on a virtual trip line is known from commonly assigned U.S. Pat. No. 9,578,811 to Kraus et al., titled "Variable Rate Discharge System for Crop Accumulator," which is incorporated herein by reference, the depositing of the square bales will not be discussed in detail herein.

Alternatively, in certain embodiments, when the bale accumulator wings 506.1, 506.2 are not employed, the pusher 202 may be actuated to eject the square bale from the plate member 1140 of the first platen system 1102.

Figure 34A:
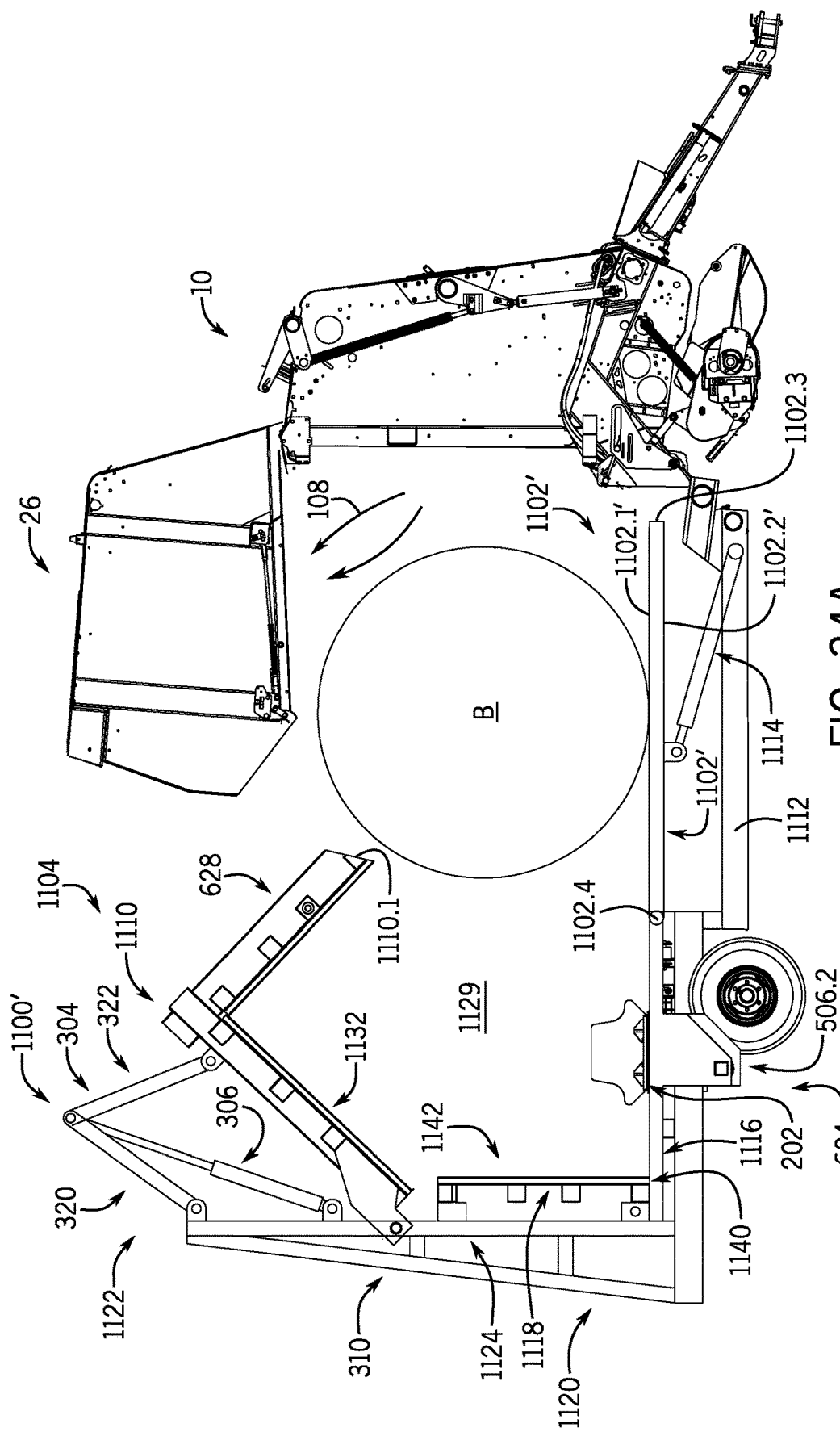
FIG. 34A is a side view of an example crop-packaging device, such as a baler, having a bale recompression system with a planar transfer table according to various embodiments of this disclosure, with an upper platen of a first platen system in a first position and the transfer table in a first position.

It should be noted that while the bale recompression system 1100 is described herein as including the transfer table 1102 with the arcuate or curved surface 1102.1, it should be understood that the bale recompression system 1100 may be configured in a variety of ways. For example, with reference to FIG. 34A, a bale recompression system 1100' is shown. As the bale recompression system 1100' is similar to the bale recompression system 1100 discussed with regard to FIGS. 33A-33C, the same reference numerals will be used to denote the same or substantially similar components. The bale recompression system 1100' includes a transfer table 1102', the first platen system 1104 and the bale accumulator 604.

The bale recompression system 1100' is coupled to the baler 10 for movement with the baler 10 as the baler 10 is towed by the tractor 12. As will be discussed, the bale recompression system 1100' receives the round bale B that is discharged by the discharge gate 26, and recompresses the round bale B into a square bale. In this example, the transfer table 1102' guides the round bale B from the discharge gate 26 of the baler 10 into the first platen system 1104 and cooperates with the first platen system 1104 to recompress the round bale B into a square bale.

The transfer table 1102' interconnects the baler 10 and the first platen system 1104. In various embodiments, the transfer table 1102' is coupled to the baler 10 so as to be in a position for the round bale B to be dropped on a surface 1102.1' of the transfer table 1102' when the discharge gate 26 opens. The transfer table 1102', which is pivotable relative to the support structure 1112, receives the round bale B and when the discharge gate 26 opens, the transfer table 1102' tilts and/or lifts the round bale B in a generally aft direction (indicated by arrow 1108) to move the round bale B onto the first platen system 1104. Thus, the transfer table 1102' is movable between a first position (in which the transfer table 1102' is substantially parallel to a ground surface G) and a second position (in which the transfer table 1102' is pivoted in the aft direction).

Figure 34B:
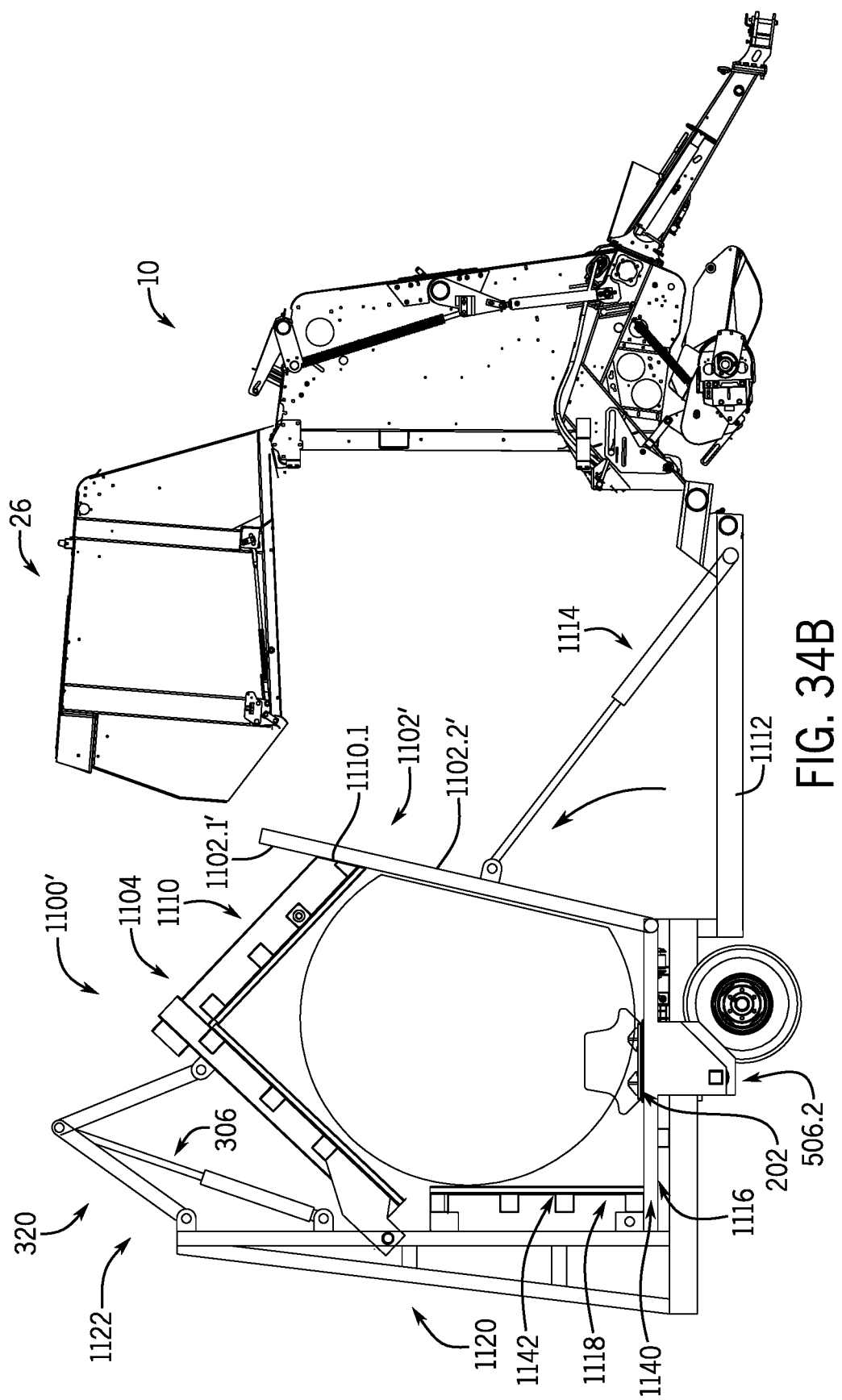
FIG. 34B is a side view of the bale recompression system of FIG. 34A, with the upper platen of the first platen system in the first position and the transfer table moved from the first position to a second position.
Figure 34C:
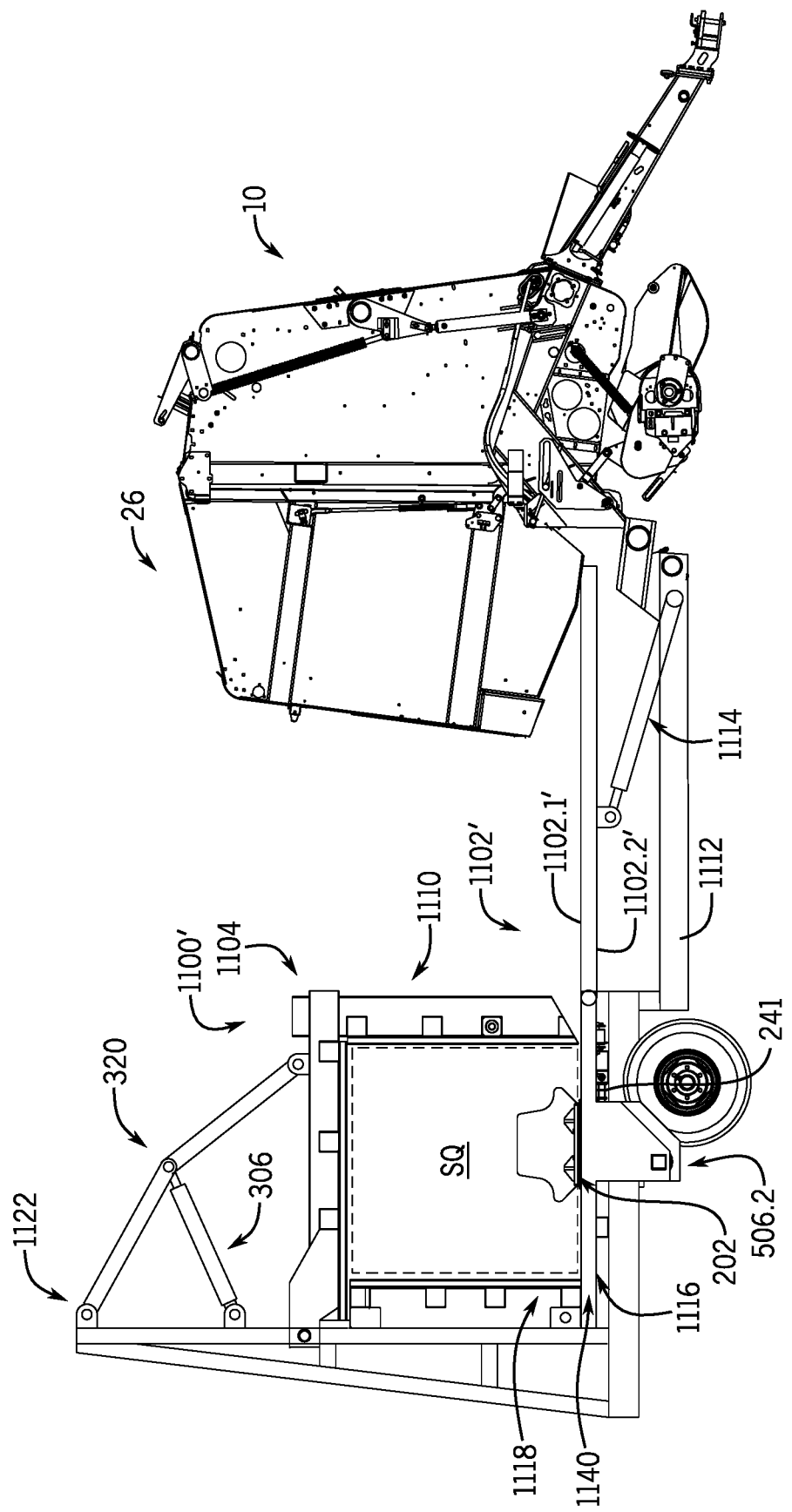
FIG. 34C is a side view of the bale recompression system of FIG. 34A, with the upper platen of the first platen system moved from the first position to a second position, and the transfer table moved from the second position to the first position.

The transfer table 1102' includes the surface 1102.1', which is opposite a second surface 1102.2'. The transfer table 1102' also includes the first end 1102.3 opposite the second end 1102.4. The transfer table 1102' is composed of a metal or metal alloy, and formed via casting, forging, stamping, etc. In this example, the transfer table 1102' is generally flat or planar between the first end 1102.3 and the second end 1102.4. The surface 1102.1' cooperates with the leading edge 1110.1 of the upper platen 1110 as the upper platen 1110 moves from a first position (FIG. 34A) to a second position (FIG. 34C). As discussed previously, the leading edge 1110.1 is chamfered. By chamfering the leading edge 1110.1, the leading edge 1110.1 of the upper platen 1110 contacts the surface 1102.1' of the transfer table 1102' during the movement of the upper platen 1110 from the first position (FIG. 34A) to the second position (FIG. 34C). In this example, as the leading edge 1110.1 of the upper platen 1110 contacts the surface 1102.1' of the transfer table 1102', the leading edge 1110.1 inhibits crop from hairpinning around the leading edge 1110.1 of the upper platen 1110 as the crop is compressed.

The transfer table 1102' is supported on the support structure 1112 and is movable between the first position and the second position by the actuator 1114. The actuator 1114 is responsive to the hydraulic fluid received from the hydraulic system to move the transfer table 1102 between the first position (FIG. 34A) and the second position (FIG. 34C) and vice versa.

As the assembly of the bale recompression system 1100' is similar to the assembly of the recompression system 1100, the assembly of the bale recompression system 1100' will not be discussed in detail herein. Briefly, with the transfer table 1102' and actuator 1114 assembled and coupled to the support structure 1112, the support structure 1112, including the transfer table 1102', is coupled to the frame 608. With the bale recompression system 1100' assembled, the respective pivot arms and actuators are coupled to the respective one of the bale accumulator wings 506.1, 506.2 and to the support structure 1112. The respective actuators 241, 1114, 306 and actuators associated with the bale accumulator wings 506.1, 506.2 are each coupled to the hydraulic system of the baler 10 so as to be fluidly coupled to the hydraulic supply of the tractor 12.

Once the round bale B is formed in the bale forming chamber 22 of the baler 10, the discharge gate 26 moves to the open discharge position to release the formed round bale B. The formed round bale B contacts the transfer table 1102' and the transfer table 1102 is actuated by the actuator 1114 to pivot from the first position (FIG. 34A) to the second position (FIG. 34B). As the transfer table 1102' moves to the second position, the round bale B is received within the first platen system 1104. Generally, with reference to FIG. 34B, the round bale B rolls from the transfer table 1102' onto the plate member 1140 and continues to roll until the round bale B contacts the plate member 1142.

Once the round bale B is received within the first platen system 1104, the transfer table 1102' cooperates with the leading edge 1110.1 of the upper platen 1110 to retain the round bale B within the first platen system 1104 during recompression. In this regard, the actuator 1114 of the transfer table 1102' may be timed to move from the second position to the first position at a rate that corresponds with a rate of a rotational movement of the upper platen 1110 by the actuator 306 such that contact is maintained between the leading edge 1110.1 and the surface 1102.1'. This coordinated movement enables the leading edge 1110.1 to slide along the surface 1102.1' of the transfer table 1102', while containing the round bale B during recompression. Generally, the leading edge 1110.1 slides along the surface 1102.1' of the transfer table 1102', the "sliding action" between these two surfaces 1110.1 and 1102.1', which are smooth, inhibits crop hair pinning or pinching as the round bale B is reshaped into the square bale B. Thus, the bale recompression system 1100', with the cooperating surfaces 1110.1, 1102.1' enables the recompression of the round bale B while inhibiting the pinching of crop material between cooperating surfaces of the bale recompression system 1100'. The actuator 1114 and 306 are each actuated based on hydraulic fluid received from the hydraulic supply of the tractor 12 through the hydraulic system of the baler 10, for example.

With reference to FIG. 34C, with the upper platen 1110 in the second position, the round bale B is recompressed into a substantially square shape to form the square bale SQ. The banding unit 114 of the first platen system 1104 may be activated to apply wrap material to the square bale SQ. The wrap material 198 passes through the first banding channels 132, the second banding channels 154, the banding channels 654 and the banding channels 668 to surround the square bale SQ.

With the square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into one of the bale accumulator wings 506.1, 506.2.

With the square bale SQ on one of the bale accumulator wings 506.1, 506.2, the hydraulic pressure is supplied to the actuators 1114 and 306, which causes the transfer table 1102' to move to the first position, and the upper platen 1110 to move to the first position. With the upper platen 1110 and the transfer table 1102' in the first position, the bale recompression system 1100 is ready to accept another round bale B from the baler 10 for recompression.

With the first square bale SQ formed, the discharge gate 26 may move to the open discharge position to release a second round bale. Once the second round bale is received on the transfer table 1102', the transfer table 1102' is actuated by the actuator 1114 to pivot to the second position. As the transfer table 1102' moves to the second position, the round bale B is received within the first platen system 1104. Once the round bale B is received within the first platen system 1104, the transfer table 1102' cooperates with the leading edge 1110.1 of the upper platen 1110 to retain the round bale B within the first platen system 1104 during recompression by the coordinated movement between the upper platen 1110 and the transfer table 1102'.

With reference to FIG. 33C, with the upper platen 1110 in the second position, the round bale B is recompressed into a substantially square shape to form a second square bale SQ. The banding unit 114 of the first platen system 1104 may be activated to apply wrap material to the second square bale SQ. The wrap material 198 passes through the first banding channels 132, the second banding channels 154, the banding channels 654 and the banding channels 668 to surround the second square bale SQ.

With the second square bale SQ formed, the pusher hydraulic actuator 241 is actuated based on hydraulic fluid received from the hydraulic supply of the tractor 12 through the hydraulic system of the baler 10, for example. The actuation of the pusher hydraulic actuator 241 drives the pusher 202 to move the square bale into the other one of the bale accumulator wings 506.1, 506.2.

With the second square bale SQ on the other one of the bale accumulator wings 506.1, 506.2, the hydraulic pressure is supplied to the actuators 1114 and 306, which causes the transfer table 1102' to move to the first position, and the upper platen 1110 to move to the first position. With the upper platen 1110 and the transfer table 1102' in the first position, the bale recompression system 1100 is ready to accept another round bale B from the baler 10 for recompression.

Further, with square bales on both of the bale accumulator wings 506.1, 506.2 and the upper platen 1110 of the first platen system 1104 in the first position, the actuators (not shown) associated with the bale accumulator wings 506.1, 506.2 may be actuated, based on hydraulic fluid received from the hydraulic supply of the tractor 12 through the hydraulic system of the baler 10, for example. The actuation of these actuators moves the respective pivot arms, and thus, the respective bale accumulator wings 506.1, 506.2 to deposit the square bales on a virtual trip line. As the depositing of the bales on a virtual trip line is known from commonly assigned U.S. Pat. No. 9,578,811 to Kraus et al., titled "Variable Rate Discharge System for Crop Accumulator," which is incorporated herein by reference, the depositing of the square bales will not be discussed in detail herein.

Alternatively, in certain embodiments, when the bale accumulator wings 506.1, 506.2 are not employed, the pusher 202 may be actuated to eject the square bale from the plate member 1140 of the first platen system 1104. Moreover, it will be noted that while the transfer tables 1102, 1102' are illustrated herein as comprising a single elongated transfer table 1102, 1102', it will be understood that the transfer tables 1102, 1102' may comprise a plurality of table members coupled together, or may comprise a shorter transfer table, if desired, based on a position and range of motion of the discharge gate 26 of the baler 10. Further, the leading edge 1110.1 may include a polymeric member, coating or covering to reduce friction as the leading edge 1110.1 moves along the respective surface 1102.1, 1102.1'. In addition, while the leading edge 1110.1 is shown and described herein as being chamfered, the leading edge 1110.1 need not include a chamfer, or may include an additional member that cooperates with the respective surface 1102.1, 1102.1' to recompress the round bale B via sliding action. Alternatively or in addition, the surface 1102.1, 1102.1' may include a coating, which reduces friction on the surface 1102.1, 1102.1'. Further, it should be noted that any one of the actuation systems 300, 350, 400, 616, 1122 may be employed with any one of the bale recompression systems 100, 100', 100", 100''', 500, 600, 1100, 1100' described herein. Moreover, the position of the banding unit 114 illustrated herein is merely an example, as the banding unit 114 may be positioned at any selected location in proximity to the respective upper platen 110, 610, 1110 and bottom platen 112, 612, 1116 to dispense wrap material 198 about a formed square bale. Thus, generally, the bottom platen 112, 612, 1116 and the upper platen 110, 610, 1110 have a plurality of banding channels, and the banding unit 114 is coupled in proximity to at least one of the bottom platen 112, 612, 1116 and the upper platen 110, 610, 1110 to dispense a plurality of banding straps around the square bale.

Further, it should be understood that while in certain embodiments, the upper platen 110, 610, 1110 is described herein as rotating relative to the bottom platen 112, 612, 1116, the upper platen 110, 610, 1110 may translate linearly relative to the bottom platen 112, 612, 1116, if desired, to recompress a round bale into a square bale. Thus, generally, a system for recompressing a round bale into a square bale comprises a bottom platen to receive the round bale, and an upper platen coupled to the bottom platen, the upper platen being movable between a first position to receive the round bale between the bottom platen and the upper platen, and a second position in which the upper platen cooperates with the bottom platen to recompress the round bale into the square bale.

Figure 35:
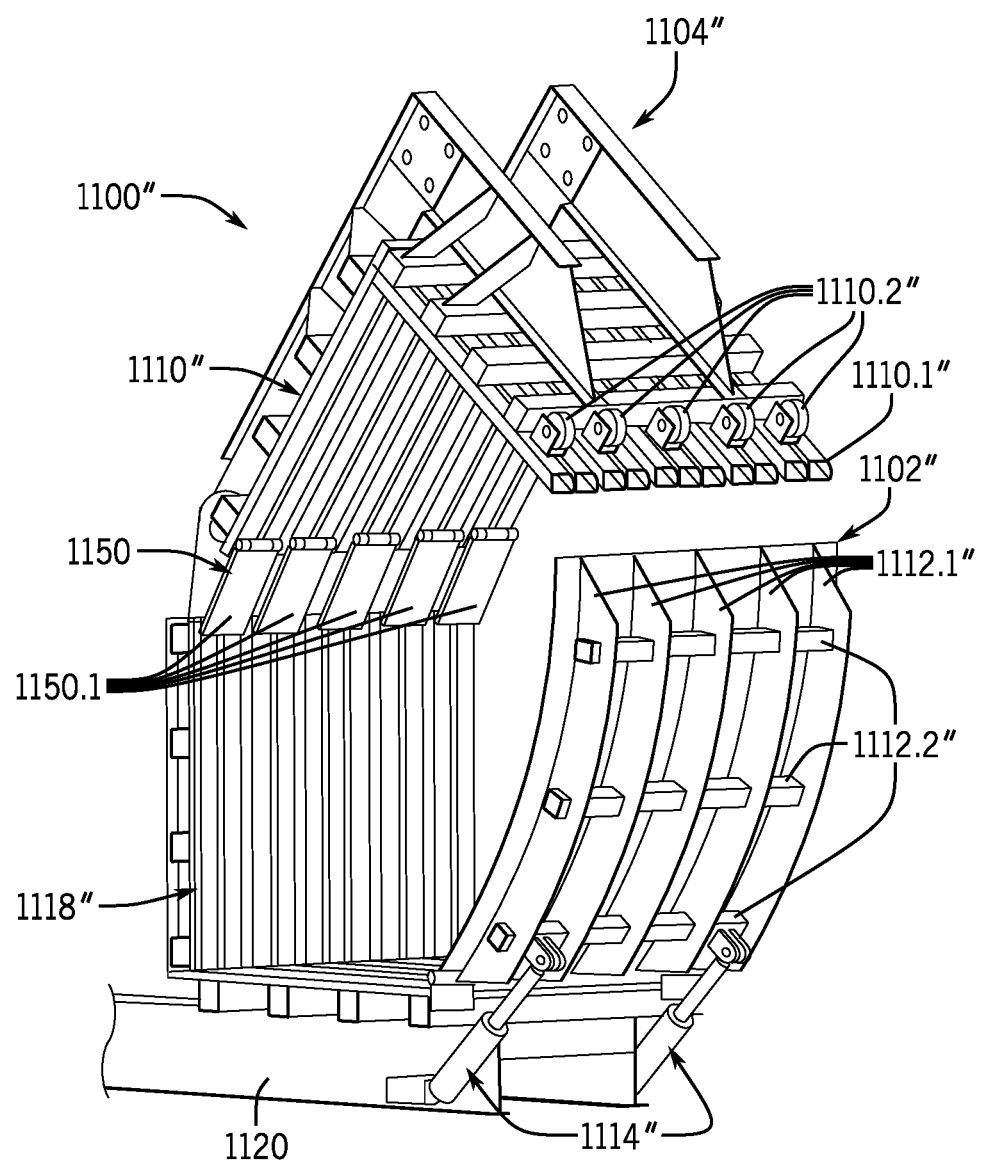
FIG. 35 is a perspective of another example embodiment of a bale recompression system according to this disclosure.
Figure 36A:
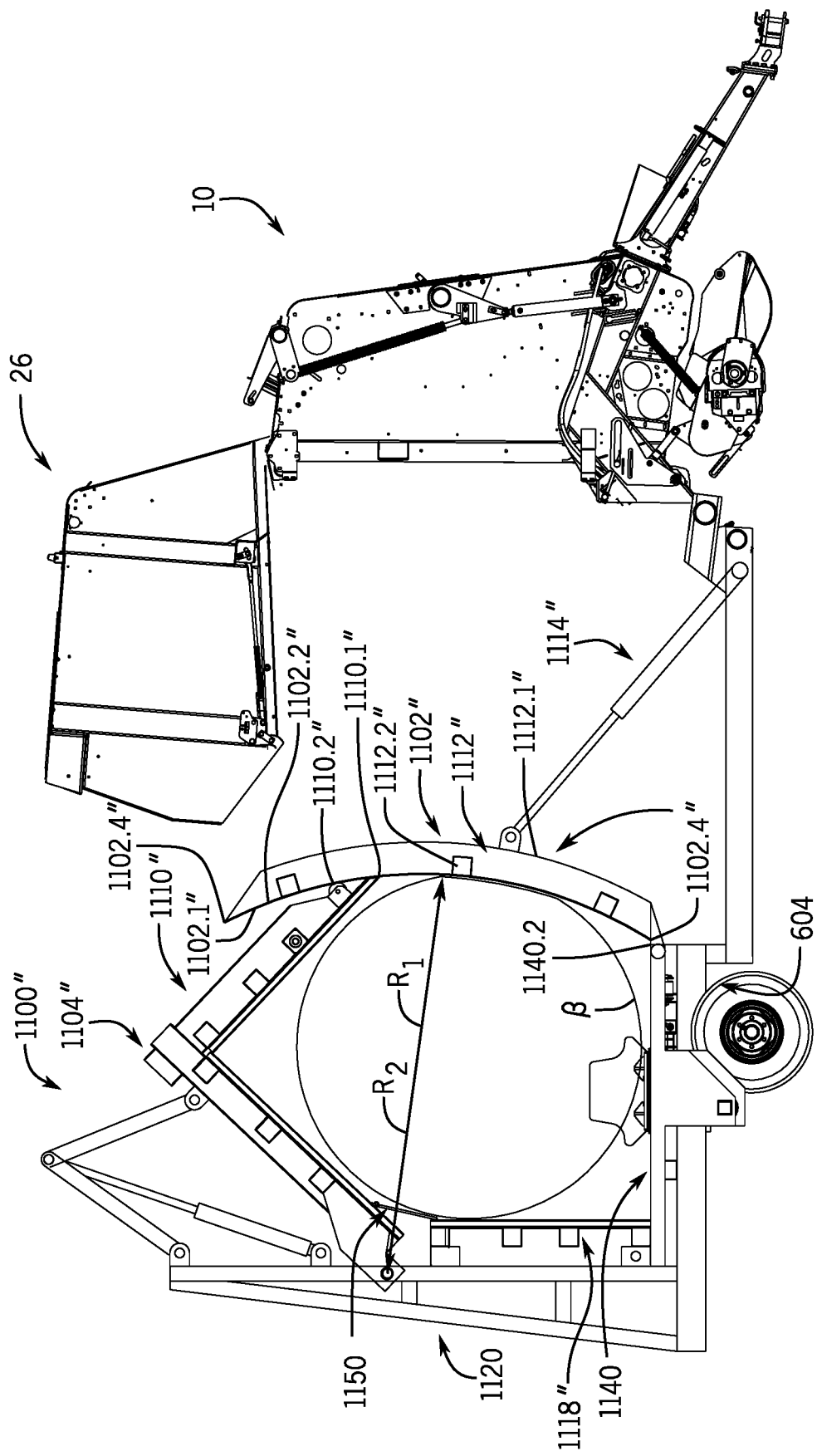
FIGS. 36A and 36B are side views of an example crop-packaging device, such as a baler, having a bale recompression system as shown in FIG. 35 with a load-bearing arcuate transfer table according to various embodiments of this disclosure, with an upper platen of a first platen system in different positions.
Figure 36B:
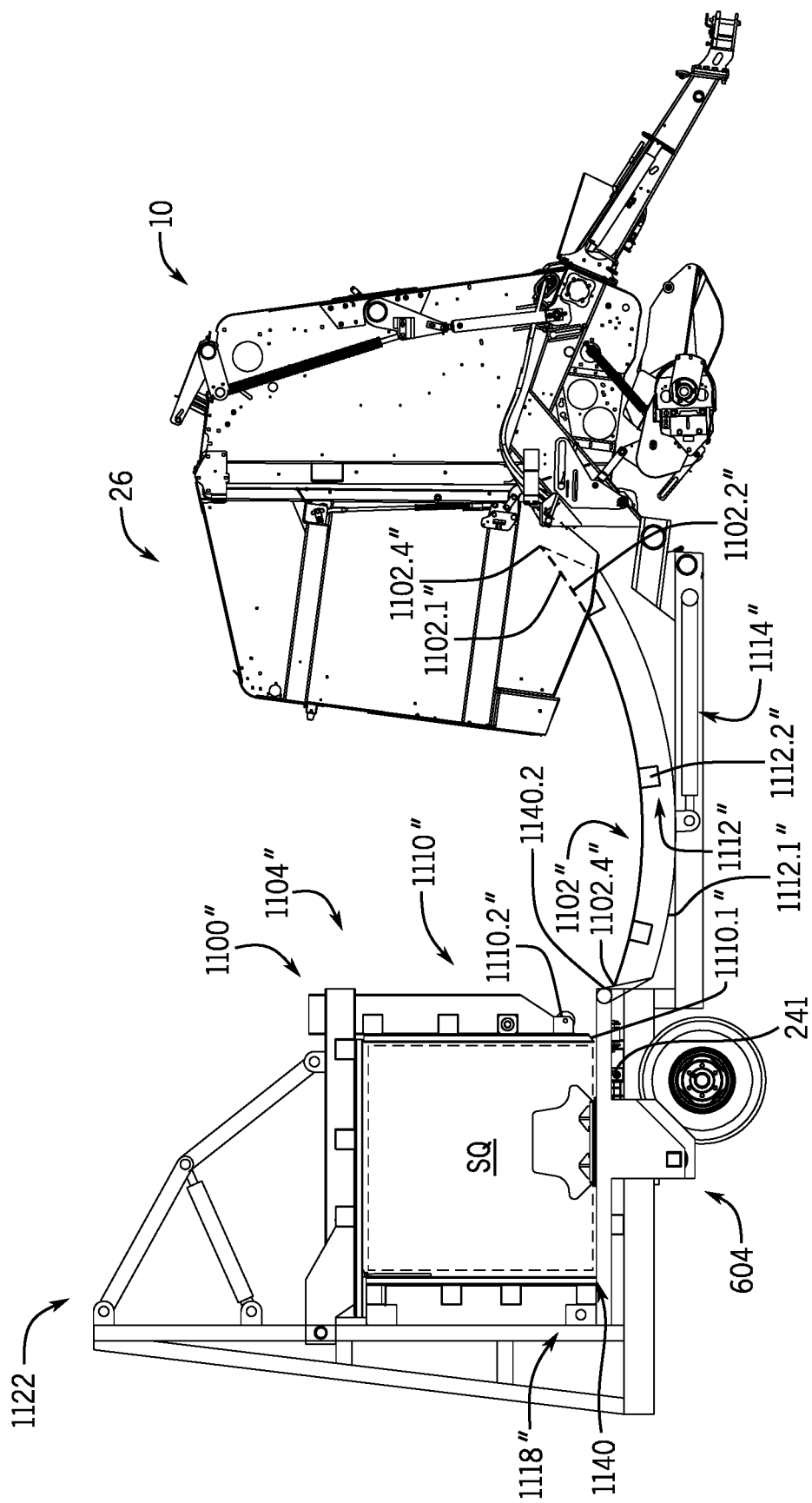

Alternatively, in certain embodiments, the bale recompression system 1100 may have additional features or refinements. For example, with reference to FIGS. 35 and 36A-36B, a bale recompression system 1100" is shown. As the bale recompression system 1100" is similar to the bale recompression system 1100 discussed with regard to FIGS. 33A-33C, the same reference numerals will be used to denote the same or substantially similar components. The bale recompression system 1100" includes a transfer table 1102", a first platen system 1104" and the bale accumulator 604.

The bale recompression system 1100" is coupled to the baler 10 for movement with the baler 10 as the baler 10 is towed by the tractor. As will be discussed, the bale recompression system 1100" receives the round bale B that is discharged by the discharge gate 26, and recompresses the round bale B into a square bale. In this example, the transfer table 1102" guides the round bale B from the discharge gate 26 of the baler 10 into the first platen system 1104" and cooperates with the first platen system 1104" to recompress the round bale B into a square bale.

The transfer table 1102" interconnects the baler 10 and the first platen system 1104". In various embodiments, the transfer table 1102" is coupled to the baler 10 to be in a position for the round bale B to be dropped on a surface 1102.1" of the transfer table 1102" when the discharge gate 26 opens. The transfer table 1102" receives the round bale B and when the discharge gate 26 opens, the transfer table 1102" tilts and/or lifts the round bale B in a generally aft direction to move the round bale B onto the first platen system 1104". Thus, the transfer table 1102" is movable between a first position (in which the transfer table 1102" is substantially parallel to a ground surface) and a second position (in which the transfer table 1102" is pivoted in the aft direction).

The transfer table 1102" includes the surface 1102.1", which is opposite a second surface 1102.2" and includes the first end 1102.3" opposite the second end 1102.4". The transfer table 1102" is composed of a metal or metal alloy, and formed via casting, forging, stamping, etc. In this example, the transfer table 1102" is mounted fixedly to the support structure 1112" at the second surface 1102.2" such that the transfer table 1102", with its support structure 1112", is a structural assembly capable of taking on loads from the first platen system 1104". The transfer table assembly thus includes the relatively thin plate or sheet transfer table 1102" structure defining the surfaces 1102.1" and 1102.2" as well as the support structure 1112", which in the illustrated example includes structural braces 1112.1". In the illustrated example, there are four braces 1112.1" spaced apart from one another across the width of the transfer table 1102". The braces 1112.1" may be any suitable supporting structure of any suitable cross-section (e.g., various rib, plate or beam configurations), and the braces 1112.1" may be mounted separately or tied together by one or more cross-members 1112.2", as shown. In this example, the transfer table 1102" is arcuate, and the braces 1112.1" have a similar arcuate contour. As noted above, the transfer table 1102" may take other configurations (e.g., flat) in which case the braces 1112.1" may be shaped accordingly (e.g., straight). The transfer table assembly (i.e., the transfer table 1102" and support structure 1112") is pivotally coupled to first platen system 1104". In the illustrated example, the end 1102.4" of the transfer table 1102" is hinged to the end 1140.2 of the bottom plate member 1140. Opposite ends of one or more actuators 1114" mount to the frame 1120 and to the transfer table assembly, for example, at one or more of the braces 1112.2", to pivot the transfer table assembly about the hinge line. The actuator(s) 1114" are responsive to the hydraulic fluid received from the hydraulic system to move the transfer table assembly between the position in FIGS. 36A and 36B.

Furthermore, in one or more additional or alternative embodiments, the surface 1102.1" of the transfer table 1102" does not cooperate with the leading edge 1110.1" of the upper platen 1110" directly as the upper platen 1110". Rather, a bearing member 1110.2" is mounted to the upper platen 1110" to transfer loads from the upper platen 1110" to the transfer table assembly. Like other embodiments, the leading edge 1110.1" of the upper platen 1110" is chamfered. By chamfering the leading edge 1110.1", the bearing member 1110.2" may be a flat bearing member or skid pad mounted to the leading edge 1110.1" to contact the surface 1102.1" of the transfer table 1102" to ease sliding friction during the movement of the upper platen 1110" between the positions shown in FIGS. 36A and 36B. In the illustrated example, however, the bearing member 1110.2" is one or more rollers mounted to the leading edge 1110.1" of the upper platen 1110" to engage the surface 1102.1" of the transfer table 1102" in rolling contact. In this way, load is transferred with even less friction through rolling contact rather than sliding contact. The bearing member 1110.2" and chamfered leading edge 1110.1" together inhibit crop from hairpinning around the upper platen 1110" as the crop is compressed. After the round bale B is received within the first platen system 1104", the transfer table 1102" cooperates with the roller bearing member 1110.2" at the leading edge 1110.1" of the upper platen 1110 to retain the round bale B within the first platen system 1104" and to share in and thereby support the load acting on the upper platen 1110" during recompression. The actuator 1114" may be controlled to move from the second position to the first position at a rate that corresponds with a rate of a rotational movement of the upper platen 1110" by the actuator 306 such that contact is maintained between the roller bearing member 1110.2" and the surface 1102.1". This coordinated movement enables the roller bearing member 1110.2" to roll along the surface 1102.1" of the transfer table 1102", while containing the round bale B during recompression. Thus, the bale recompression system 1100" enables the recompression of the round bale B while lessening the loading acting on the upper platen 1110" during recompression. This reduces localized stress concentrations in the upper platen 1110", thereby reducing fatigue or failure and allowing for reduced structure (and thereby weight) requirements of the upper platen 1110" and the first platen system 1104" overall.

Figure 37:
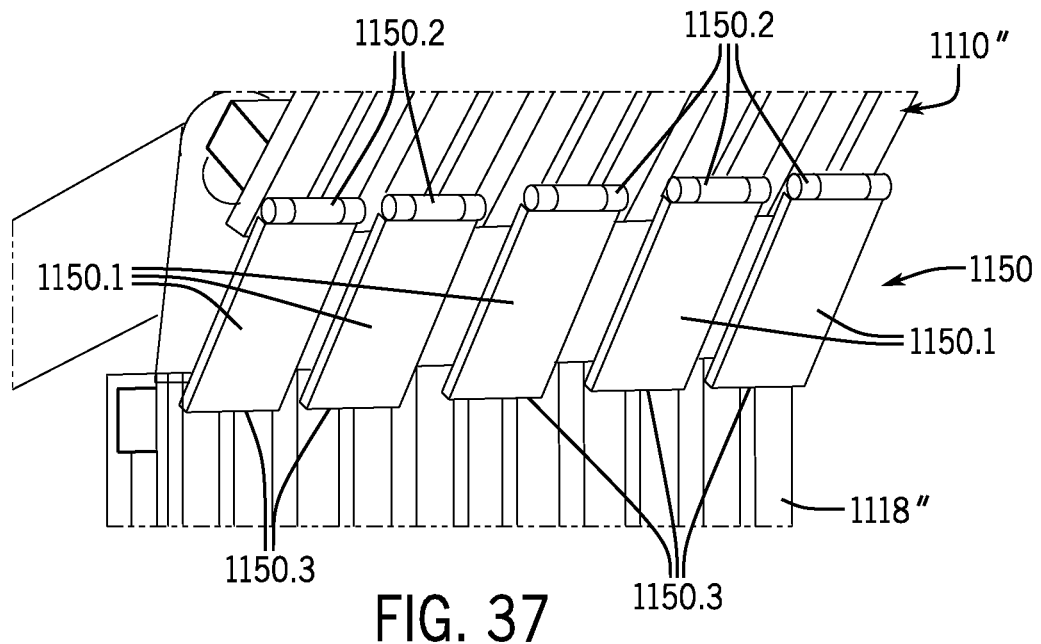
FIGS. 37 and 38 are partial perspective and side views, respectively, showing a crop shield arrangement.
Figure 38:
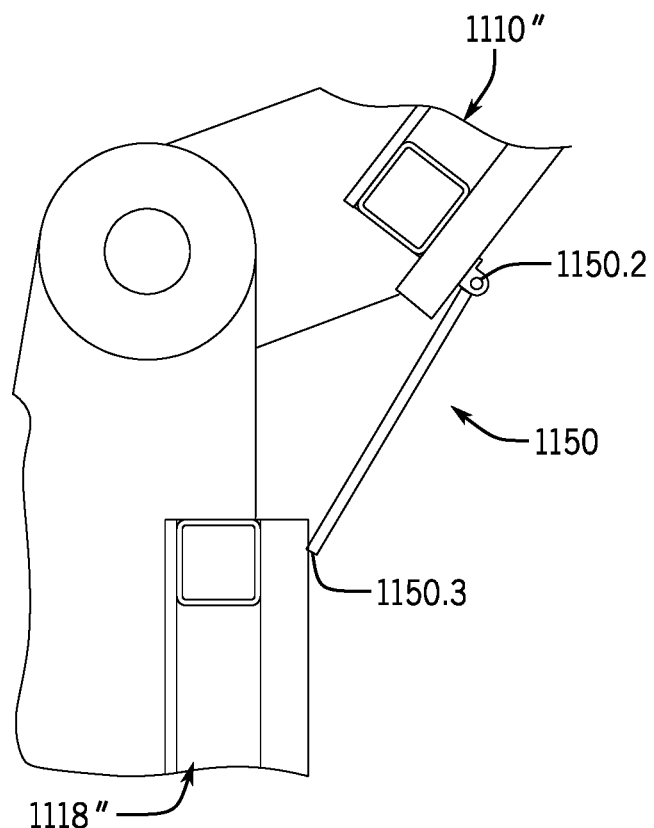

In still other additional or alternate embodiments, the first platen system 1104" may include one or more blocking features or crop shields 1150 at the joint between the upper platen 1110" and the middle (or third) platen 1118". While the crop shields 1150 are shown and described herein with respect to the bale recompression system 1100", they could be used with any of previously described (and other) such systems. Referring also to FIGS. 37 and 38, the crop shields 1150 are configured and arranged in the first platen system 1104" so as to allow for full functional movement of the upper platen 1110" for bale recompression as well as to block the passage of compressed crop from entering and being pinched in the joint between the third platen 1118" and the upper platen 1110" during recompression, which may otherwise block or interfere with the band strap or straps placed around the recompressed bale.

In the illustrated example, the crop shields 1150 are a series of individual flaps or panels 1150.1 connected to the upper platen 1110" and having a length sufficient to bridge the open gap between the platens 1110", 1118". The crop shields 1150 may instead be mounted to the third platen 1118" in certain embodiments, and a single, full-width flap or panel may be used instead, however, multiple panels allow for open spacing to accommodate passage of band straps onto the recompressed bale. As illustrated, each of the crop shield panels 1150.1 is hinged to the upper platen 1110" along a common hinge line. The hinges 1150.2 may be free rotating and a free edge 1150.3 of the panel may slide along in contact with the third platen 1118" during movement of the upper platen 1110" during bale recompression being biased by the crop. In other embodiments, the hinge may be biased by a biasing member (e.g., spring) to keep the crop shields 1150 orientated across the open gap between the platens 1110", 1118". Also, in the illustrated example, the panels 1150.1 are rigid to withstand the force acting on them by the crop during recompression without bending. However, in other embodiments, the panels 1150.1 may be flexible members. Moreover, the panels 1150.1 may have two ends coupled to the platens 1110", 1118", rather than one end being free or uncoupled. Unjointed, rigid panels, for example, could have one end connected to one of the platens 1110", 1118" at a movable hinged or slotted connection to allow the range of pivotal motion required of the upper platen 1110" during recompression. Flexible panels, or jointed, rigid panels, may have both ends fixed relative to the associate platen 1110", 1118".

In various other embodiments, with square bales on both bale accumulator wings 506.1, 506.2 and the upper platen 1110 of the first platen system 1104 in the first position, the actuators (not shown) associated with the bale accumulator wings 506.1, 506.2 may be actuated, based on hydraulic fluid received from the hydraulic supply of the tractor 12 through the hydraulic system of the baler 10, for example. The actuation of these actuators moves the respective pivot arms, and thus, the respective bale accumulator wings 506.1, 506.2 to deposit the square bales on a virtual trip line. As the depositing of the bales on a virtual trip line is known from commonly assigned U.S. Pat. No. 9,578,811 to Kraus et al., titled "Variable Rate Discharge System for Crop Accumulator," which is incorporated herein by reference, the depositing of the square bales will not be discussed in detail herein.

Alternatively, in certain embodiments, when the bale accumulator wings 506.1, 506.2 are not employed, the pusher 202 may be actuated to eject the square bale from the plate member 1140 of the first platen system 1104. Moreover, it will be noted that while the transfer tables 1102, 1102', 1102" are illustrated herein as comprising a single elongated transfer table 1102, 1102', it will be understood that the transfer tables 1102, 1102', 1102" may comprise a plurality of table members coupled together, or may comprise a shorter transfer table, if desired, based on a position and range of motion of the discharge gate 26 of the baler 10. Further, the leading edge 1110.1 may include a polymeric member, coating or covering to reduce friction as the leading edge 1110.1 moves along the respective surface 1102.1, 1102.1'. Similarly, bearing members (skid pads, rollers, etc.) may be mounted to the surface 1102.01" to facilitate the load transfer to the transfer table assembly via rolling friction. In addition, while the leading edge 1110.1 is shown and described herein as being chamfered. Alternatively, or in addition, the surface 1102.1, 1102.1', 1102.1" may include a coating, which reduces friction on the surface 1102.1, 1102.1', 1102.1". Further, it should be noted that any one of the actuation systems 300, 350, 400, 616, 1122 may be employed with any one of the bale recompression systems 100, 100', 100", 100''', 500, 600, 1100, 1100' described herein. Moreover, the position of the banding unit 114 illustrated herein is merely an example, as the banding unit 114 may be positioned at any selected location in proximity to the respective upper platen 110, 610, 1110 and bottom platen 112, 612, 1116 to dispense wrap material 198 about a formed square bale. Thus, generally, the bottom platen 112, 612, 1116 and the upper platen 110, 610, 1110 have a plurality of banding channels, and the banding unit 114 is coupled in proximity to at least one of the bottom platen 112, 612, 1116 and the upper platen 110, 610, 1110 to dispense a plurality of banding straps around the square bale.

Further, it should be understood that while in certain embodiments, the upper platen is described herein as rotating relative to the bottom platen, the upper platen may translate linearly relative to the bottom platen, if desired, to recompress a round bale into a square bale. Thus, generally, a system for recompressing a round bale into a square bale comprises a bottom platen to receive the round bale, and an upper platen coupled to the bottom platen, the upper platen being movable between a first position to receive the round bale between the bottom platen and the upper platen, and a second position in which the upper platen cooperates with the bottom platen to recompress the round bale into the square bale.

In various embodiments, a round baler equipped with a pickup, bale formation chamber and bale binding system is provided. A formed round bale is bound and the bale forming chamber is opened and the formed bound bale is transferred to a bale recompression chamber located in-line and behind said round bale forming chamber. The bale recompression chamber comprises four sides and two movable platens. The first side of the chamber is stationary, and the first platen comprises the second and third sides of the chamber. The second and third sides are generally or substantially perpendicular to each other and at least a portion of the first platen moves toward the first side thereby reshaping and partially compressing the formerly formed round bale. The second platen comprises the fourth side of the chamber and the fourth side moves toward one side of the first platen further reshaping and compressing the formerly formed round bale and the recompression chamber is equipped with a binding system to bind the reshaped bale and the reshaped bale is ejected out the side of the recompression chamber. In various embodiments, the reshaped bales are placed on at least one carriage located adjacent to the bale recompression chamber.

In various embodiments, a system for reshaping a round bale is provided. The system includes a first platen to receive the bale and at least a second platen coupled to the first platen. At least one of the first or second platens are movable between a first position to receive the round bale between the first platen and the second platen, and a second position in which the second platen cooperates with the first platen to reshape the round bale.

Also, the following examples are provided, which are numbered for easier reference.

1. An actuation system for moving a movable platen of a bale recompression system, the actuation system including: one or more actuators; a first scissors linkage having a first link end coupled to a frame of the bale recompression system and having a second link end coupled to the movable platen; a second scissors linkage having a third link end coupled to the frame and having a fourth link end coupled to the movable platen; and a cross-member that interconnects the first scissors linkage and the second scissors linkage; wherein actuation of the one or more actuator pivots the first link end of the first scissors linkage and the third link end of the second scissors linkage relative to the frame and translates the movable platen from a first position to a second position; and wherein the first scissors linkage and the second scissors linkage are configured to maintain a fixed orientation of the movable platen in the first position and in the second position.

2. The actuation system of example 1, wherein the first scissors linkage includes: a pair of first links that each define the first link end and are coupled to a first actuator of the one or more actuators, and the pair of first links is coupled to the frame; a pair of second links coupled to the pair of first links, and the pair of second links is coupled to the cross-member and to a connector link; a pair of third links coupled to the pair of second links, and each of the pair of third links is coupled to the movable platen; a pair of fourth links that each define the first link end and is coupled to the first actuator, and the pair of fourth links is coupled to the connector link and to a second cross-member; a pair of fifth links coupled to the pair of fourth links; and a pair of sixth links coupled to the pair of fifth links, and each of the pair of sixth links is coupled to the movable platen.

3. The actuation system of example 2, wherein the second scissors linkage includes: a pair of first links that each define the third link end and is coupled to a second actuator of the one or more actuators, and the pair of first links of the second scissors linkage is coupled to the frame; a pair of second links coupled to the pair of first links of the second scissors linkage, and the pair of second links of the second linkage is coupled to the cross-member and to a second connector link; a pair of third links coupled to the pair of second links of the second scissors linkage, and each of the pair of third links of the second linkage is coupled to the movable platen; a pair of fourth links that each define the third link end and is coupled to the second actuator, and the pair of fourth links of the second scissors linkage is coupled to the second connector link and to the second cross-member; a pair of fifth links coupled to the pair of fourth links of the second scissors linkage; and a pair of sixth links coupled to the pair of fifth links of the second scissors linkage, and each of the pair of sixth links of the second linkage is coupled to the movable platen.

4. The actuation system of example 3, wherein the first actuator and the second actuators are hydraulic cylinders; wherein the pair of first links of the first scissors linkage is coupled to a first piston of the first actuator and the pair of first links of the second scissors linkage is coupled to a second piston of the second actuator; and wherein the pair of fourth links of the first scissors linkage is coupled to a first cylinder of the first actuator and the pair of fourth links of the second scissors linkage is coupled to a second cylinder of the second actuator.

5. The actuation system of example 4, wherein the first actuator and the second actuator pivot the pairs of first links and fourth links of the first scissors linkage and the second scissors linkage relative to the frame.

6. The actuation system of example 3, wherein the pairs of third links of the first scissors linkage and the second linkage are coupled to the movable platen at a first pair of laterally spaced apart pivotal mounting locations; and wherein the pairs of sixth links of the first scissors linkage and the second scissors linkage are coupled to the movable platen at a second pair of laterally spaced apart pivotally mounting locations.

7. The actuation system of example 6, wherein the first pair of laterally spaced apart pivotal mounting locations and the second pair of laterally spaced apart pivotal mounting locations are fixed in position relative to the movable platen; and wherein the first pair of laterally spaced apart pivotal mounting locations is at a different height than the second pair of laterally spaced apart pivotal mounting locations.

8. The actuation system of example 7, wherein the first pair of laterally spaced apart pivotal mounting locations is at a lower area of the movable platen and the second pair of laterally spaced apart pivotal mounting locations is at an upper area of the movable platen.

9. The actuation system of claim example 1, further comprising: a round baler coupled to the bale recompression system and having a baling chamber to form the round bale; and a transfer table coupled to the bale recompression system and configured to transfer the round bale to the bale recompression system.

10. A method for moving a movable platen of a bale recompression system, including: actuating, by a first actuator, a first scissors linkage to translate a side of the movable platen; and actuating, by a second actuator, a second scissors linkage to translate a second side of the movable platen, the first scissors linkage and the second scissors linkage interconnected by a cross-member such that the side and the second side translate substantially in unison to maintain a fixed orientation of the movable platen at a first position and a second position.

11. The method of example 10, wherein the first scissors linkage includes a first linkage and a second linkage coupled to the first actuator, and the actuating, by the first actuator further comprises: actuating, by the first actuator, the first linkage and the second linkage to move the side of the movable platen, the first linkage interconnected to the second linkage by a connector link.

12. The method of example 10, wherein the second scissors linkage includes a third linkage and a fourth linkage coupled to the second actuator, and the actuating, by the second actuator further comprises: actuating, by the second actuator, the third linkage and the fourth linkage to move the second side of the movable platen, the third linkage interconnected to the fourth linkage by a second connector link.

13. The method of example 10, wherein the actuating, by the first actuator and the actuating by the second actuator further comprises: retracting the first actuator to extend the first scissors linkage to move the side of the movable platen from the first position to the second position; and retracting the second actuator to extend the second scissors linkage to move the second side of the movable platen from the first position to the second position.

14. The method of example 10, wherein the actuating, by the first actuator and the actuating by the second actuator further comprises: extending the first actuator to retract the first scissors linkage to move the side of the movable platen from the second position to the first position; and extending the second actuator to retract the second scissors linkage to move the second side of the movable platen from the second position to the first position.

15. A round baler, including: a baling chamber that forms a round bale; and a bale recompression system to receive the round bale and to recompress the round bale into a square bale, the bale recompression system including an upper platen, a movable platen and a bottom platen that cooperate to recompress the round bale, and the bale recompression system includes an actuation system for moving the platen to recompress the round bale, the actuation system including: one or more actuators; a first scissors linkage having a first link end coupled to a frame of the bale recompression system and having a second link end coupled to the movable platen; a second scissors linkage having a third link end coupled to the frame and having a fourth link end coupled to the movable platen; and a cross-member that interconnects the first scissors linkage and the second scissors linkage; wherein actuation of the one or more actuator pivots the first link end of the first scissors linkage and the third link end of the second scissors linkage relative to the frame and translates the movable platen from a first position to a second position; and wherein the first scissors linkage and the second scissors linkage are configured to maintain a fixed orientation of the movable platen in the first position and in the second position.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Certain terminology may be used in the following description for the purpose of reference only, and thus are not intended to be limiting. For example, terms such as "top", "bottom", "upper", "lower", "above", and "below" could be used to refer to directions in the drawings to which reference is made. Terms such as "front", "back", "rear", "side", "outboard", and "inboard" could be used to describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An actuation system for moving a movable platen of a bale recompression system, the actuation system comprising:
    one or more actuators;
    a first scissors linkage having a first link end coupled to a frame of the bale recompression system and having a second link end coupled to the movable platen;
    a second scissors linkage having a third link end coupled to the frame and having a fourth link end coupled to the movable platen; and
    a cross-member that interconnects the first scissors linkage and the second scissors linkage;
    wherein actuation of the one or more actuator pivots the first link end of the first scissors linkage and the third link end of the second scissors linkage relative to the frame and translates the movable platen from a first position to a second position;

wherein the first scissors linkage and the second scissors linkage are configured to maintain a fixed orientation of the movable platen in the first position and in the second position; and wherein the first scissors linkage includes:
- a pair of first links that each define the first link end and are coupled to a first actuator of the one or more actuators, and the pair of first links is coupled to the frame;
- a pair of second links coupled to the pair of first links, and the pair of second links is coupled to the cross-member and to a connector link;
- a pair of third links coupled to the pair of second links, and each of the pair of third links is coupled to the movable platen;
- a pair of fourth links that each define the first link end and is coupled to the first actuator, and the pair of fourth links is coupled to the connector link and to a second cross-member;
- a pair of fifth links coupled to the pair of fourth links; and
- a pair of sixth links coupled to the pair of fifth links, and each of the pair of sixth links is coupled to the movable platen.

2. The actuation system of claim 1, wherein the second scissors linkage includes:
- a pair of first links that each define the third link end and is coupled to a second actuator of the one or more actuators, and the pair of first links of the second scissors linkage is coupled to the frame;
- a pair of second links coupled to the pair of first links of the second scissors linkage, and the pair of second links of the second linkage is coupled to the cross-member and to a second connector link;
- a pair of third links coupled to the pair of second links of the second scissors linkage, and each of the pair of third links of the second linkage is coupled to the movable platen;
- a pair of fourth links that each define the third link end and is coupled to the second actuator, and the pair of fourth links of the second scissors linkage is coupled to the second connector link and to the second cross-member;
- a pair of fifth links coupled to the pair of fourth links of the second scissors linkage; and
- a pair of sixth links coupled to the pair of fifth links of the second scissors linkage, and each of the pair of sixth links of the second linkage is coupled to the movable platen.

3. The actuation system of claim 2, wherein the first actuator and the second actuators are hydraulic cylinders;
wherein the pair of first links of the first scissors linkage is coupled to a first piston of the first actuator and the pair of first links of the second scissors linkage is coupled to a second piston of the second actuator; and
wherein the pair of fourth links of the first scissors linkage is coupled to a first cylinder of the first actuator and the pair of fourth links of the second scissors linkage is coupled to a second cylinder of the second actuator.

4. The actuation system of claim 3, wherein the first actuator and the second actuator pivot the pairs of first links and fourth links of the first scissors linkage and the second scissors linkage relative to the frame.

5. The actuation system of claim 2, wherein the pairs of third links of the first scissors linkage and the second scissors linkage are coupled to the movable platen at a first pair of laterally spaced apart pivotal mounting locations; and wherein the pairs of sixth links of the first scissors linkage and the second scissors linkage are coupled to the movable platen at a second pair of laterally spaced apart pivotally mounting locations.

6. The actuation system of claim 5, wherein the first pair of laterally spaced apart pivotal mounting locations and the second pair of laterally spaced apart pivotal mounting locations are fixed in position relative to the movable platen; and
wherein the first pair of laterally spaced apart pivotal mounting locations is at a different height than the second pair of laterally spaced apart pivotal mounting locations.

7. The actuation system of claim 6, wherein the first pair of laterally spaced apart pivotal mounting locations is at a lower area of the movable platen and the second pair of laterally spaced apart pivotal mounting locations is at an upper area of the movable platen.

8. A round baler, comprising:
- a baling chamber for forming a round bale;
- a bale recompression system to receive the round bale and to recompress the round bale into a square bale, the bale recompression system includes an actuation system for moving the movable platen to recompress the round bale; and
- a transfer table coupled to the bale recompression system and configured to transfer the round bale to the bale recompression system;

wherein the actuation system includes:
- one or more actuators;
- a first scissors linkage having a first link end coupled to a frame of the bale recompression system and having a second link end coupled to the movable platen;
- a second scissors linkage having a third link end coupled to the frame and having a fourth link end coupled to the movable platen; and
- a cross-member that interconnects the first scissors linkage and the second scissors linkage;

wherein actuation of the one or more actuators pivots the first link end of the first scissors linkage and the third link end of the second scissors linkage relative to the frame and translates the movable platen from a first position to a second position; and wherein the first scissors linkage and the second scissors linkage are configured to maintain a fixed orientation of the movable platen in the first position and in the second position.

9. A method for moving a movable platen of a bale recompression system of a round baler having a baling chamber that forms a round bale, the bale recompression system configured to receive the round bale and to recompress the round bale into a square bale, the bale recompression system including an upper platen, the movable platen and a bottom platen that cooperate to recompress the round bale, and the bale recompression system includes an actuation system for moving the movable platen to recompress the round bale, the method comprising:

actuating, by a first actuator, a first scissors linkage to translate a second link end coupled to a side of the movable platen relative to a first link end coupled to a frame of the bale recompression system; and actuating, by a second actuator, a second scissors linkage to translate a fourth link end coupled to a second side of the movable platen relative to a third link end coupled to the frame of the bale recompression system;

wherein actuating the first actuator pivots the first link end of the first scissors linkage relative to the frame and actuating the second actuator pivots the third link end of the second scissors linkage relative to the frame and translates the movable platen from a first position to a second position; and wherein the first scissors linkage and the second scissors linkage are interconnected by a cross-member such that the side and the second side of the moveable platen translate substantially in unison to maintain a fixed orientation of the movable platen at the first position and the second position.

10. The method of claim 9, wherein the first scissors linkage includes a first linkage and a second linkage coupled to the first actuator, and the actuating, by the first actuator further comprises:

actuating, by the first actuator, the first linkage and the second linkage to move the side of the movable platen, the first linkage interconnected to the second linkage by a connector link.

11. The method of claim 9, wherein the second scissors linkage includes a third linkage and a fourth linkage coupled to the second actuator, and the actuating, by the second actuator further comprises:

actuating, by the second actuator, the third linkage and the fourth linkage to move the second side of the movable platen, the third linkage interconnected to the fourth linkage by a second connector link.

12. The method of claim 9, wherein the actuating, by the first actuator and the actuating by the second actuator further comprises:

retracting the first actuator to extend the first scissors linkage to move the side of the movable platen from the first position to the second position; and retracting the second actuator to extend the second scissors linkage to move the second side of the movable platen from the first position to the second position.

13. The method of claim 9, wherein the actuating, by the first actuator and the actuating by the second actuator further comprises:

extending the first actuator to retract the first scissors linkage to move the side of the movable platen from the second position to the first position; and extending the second actuator to retract the second scissors linkage to move the second side of the movable platen from the second position to the first position.

14. A round baler, comprising:

a baling chamber that forms a round bale; and a bale recompression system to receive the round bale and to recompress the round bale into a square bale, the bale recompression system including an upper platen, a movable platen and a bottom platen that cooperate to recompress the round bale, and the bale recompression system includes an actuation system for moving the movable platen to recompress the round bale, the actuation system including:

one or more actuators;

a first scissors linkage having a first link end coupled to a frame of the bale recompression system and having a second link end coupled to the movable platen;

a second scissors linkage having a third link end coupled to the frame and having a fourth link end coupled to the movable platen; and a cross-member that interconnects the first scissors linkage and the second scissors linkage;

wherein actuation of the one or more actuator pivots the first link end of the first scissors linkage and the third link end of the second scissors linkage relative to the frame and translates the movable platen from a first position to a second position; and wherein the first scissors linkage and the second scissors linkage are configured to maintain a fixed orientation of the movable platen in the first position and in the second position.

15. The round baler of claim 14, wherein the first scissors linkage includes a pair of first links that each define the first link end and are coupled to a first actuator of the one or more actuators, and the pair of first links are coupled to the frame.

16. The round baler of claim 15, wherein the first scissors linkage includes a pair of second links and a pair of third links, the pair of second links coupled to the pair of first links, the pair of second links coupled to the cross-member and to a connector link, and each of the pair of third links are coupled to the movable platen.

17. The round baler of claim 16, wherein the first scissors linkage includes a pair of fourth links that each define the first link end and are coupled to the first actuator, and the pair of fourth links are coupled to the connector link and to the cross-member.

18. The round baler of claim 17, wherein the first scissors linkage includes a pair of fifth links and a pair of sixth links, the pair of fifth links coupled to the pair of fourth links and the pair of sixth links, and each of the pair of sixth links are coupled to the movable platen.

* * * * *